US012557828B2

(12) United States Patent　　　　(10) Patent No.:　US 12,557,828 B2
Nielsen et al.　　　　　　　　　　　　(45) Date of Patent:　　Feb. 24, 2026

(54) METHOD OF PRODUCING DENSE WHEY PROTEIN NANOGELS, THE RESULTING WHEY PROTEIN NANOGELS OR NANOGEL COMPOSITIONS, AND FOOD PRODUCTS CONTAINING SUCH WHEY PROTEIN NANOGELS OR NANOGEL COMPOSITIONS

(71) Applicant: Arla Foods Amba, Viby (DK)

(72) Inventors: Søren Bang Nielsen, Viby (DK); Tanja Christine Jæger, Viby (DK); Linda Bonde Jensen, Viby (DK); Behnaz Razi Parjikolaei, Viby (DK)

(73) Assignee: Arla Foods Amba, Viby J (DK)

( * ) Notice: Subject to any disclaimer, the term of this patent is extended or adjusted under 35 U.S.C. 154(b) by 476 days.

(21) Appl. No.: 17/789,599

(22) PCT Filed: Dec. 29, 2020

(86) PCT No.: PCT/EP2020/087988
§ 371 (c)(1),
(2) Date: Jun. 28, 2022

(87) PCT Pub. No.: WO2021/136785
PCT Pub. Date: Jul. 8, 2021

(65) Prior Publication Data
US 2023/0051969 A1　　　Feb. 16, 2023

(30) Foreign Application Priority Data
Dec. 30, 2019　　(EP) ..................................... 19220144

(51) Int. Cl.
*A23J 3/08*　　　　(2006.01)
*A23J 1/20*　　　　(2006.01)
(Continued)

(52) U.S. Cl.
CPC ................. *A23J 3/08* (2013.01); *A23J 1/205* (2013.01); *A23L 2/66* (2013.01); *A23L 33/19* (2016.08); *A23V 2002/00* (2013.01)

(58) Field of Classification Search
CPC ...... A23V 2250/54252; A23V 2200/25; A23V 2250/54244; A23V 2250/5424;
(Continued)

(56) References Cited

U.S. PATENT DOCUMENTS

| | | |
|---|---|---|
| 6,605,311 B2 | 8/2003 | Villagran et al. |
| 6,998,259 B1 | 2/2006 | Davis et al. |

(Continued)

FOREIGN PATENT DOCUMENTS

| | | |
|---|---|---|
| CN | 101031208 A | 9/2007 |
| CN | 104082521 A | 10/2014 |

(Continued)

OTHER PUBLICATIONS

Bourbon et al. PT107059, English Machine Translation, Jan. 12, 2015, pp. 1-6 (Year: 2015).*

(Continued)

*Primary Examiner* — Hong T Yoo
(74) *Attorney, Agent, or Firm* — Lisa Mueller; Tristan A. Fuierer; Casimir Jones SC

(57) ABSTRACT

The present invention pertains to production of special whey protein nanogels by denaturation of whey protein and furthermore to the resulting whey protein nanogels, and their use in food products, such as beverages. The present whey protein nanogels contribute with an extraordinarily low viscosity contribution when used in high concentration in beverage and liquid products which is a clear indication of their uniqueness.

8 Claims, 3 Drawing Sheets

(51) Int. Cl.
    *A23L 2/66*         (2006.01)
    *A23L 33/19*      (2016.01)

(58) Field of Classification Search
    CPC .... A23L 33/19; A23L 2/66; A23L 2/39; A23J
                          1/205; A23J 3/08
    USPC ..................... 424/489; 514/5.6, 1.1; 426/573
    See application file for complete search history.

(56)            References Cited

U.S. PATENT DOCUMENTS

| | | | | |
|---|---|---|---|---|
| 8,399,043 | B2 * | 3/2013 | Bovetto ............... | A23C 21/026 |
| | | | | 530/833 |
| 9,661,870 | B2 * | 5/2017 | Ding .................. | A61K 31/4415 |
| 2009/0004333 | A1 | 1/2009 | Nakhasi et al. | |
| 2011/0038942 | A1 | 2/2011 | Livney | |
| 2015/0182472 | A1 | 7/2015 | Livney et al. | |
| 2017/0238583 | A1 | 8/2017 | Patel et al. | |

FOREIGN PATENT DOCUMENTS

| | | | | | |
|---|---|---|---|---|---|
| CN | 105542195 | A | | 5/2016 | |
| CN | 105792659 | A | | 7/2016 | |
| CN | 106581587 | A | | 4/2017 | |
| CN | 106798345 | A | | 6/2017 | |
| CN | 107105691 | A | | 8/2017 | |
| CN | 109843072 | A | | 6/2019 | |
| CN | 110381745 | A | | 10/2019 | |
| CN | 110621164 | A | | 12/2019 | |
| EP | 0126290 | A1 | | 11/1984 | |
| JP | 2016533726 | A | | 11/2016 | |
| PT | 107059 | A | * | 1/2015 | ............. A61K 47/42 |
| WO | 2006034857 | A2 | | 4/2006 | |
| WO | 2007110411 | A2 | | 10/2007 | |
| WO | 2007110421 | A2 | | 10/2007 | |
| WO | 2009038746 | A1 | | 3/2009 | |
| WO | 2011112695 | A1 | | 9/2011 | |
| WO | 2017211856 | A1 | | 12/2017 | |
| WO | 2018115520 | A1 | | 6/2018 | |
| WO | 2020002426 | A1 | | 1/2020 | |
| WO | 2020002435 | A1 | | 1/2020 | |

OTHER PUBLICATIONS

Agropur, Components of whey proteins and their benefits, relieved online Mar. 6, 2025. pp. 1-4. https://www.agropur.com/us/news/components-of-whey-proteins-and-their-benefits (Year: 2025).*
AM. Joyce, et al., "Controlling denaturation and aggregation of whey proteins during thermal processing by modifying temperature and calcium concentration", Int. .J. Dairy Technol 2018, 71, 2, 446-453, (https://doi.org/IO. 1111/1471-0307,12507).
T Phan-Xuan, et al.,"Heat induced formation of beta-lactoglobulin microgels driven by addition of calcium ions", Food Hydrocoll. 2014, 34, 227-235, (http://dx doi orq/l 0,1016/i.foodhvd.2012.09. 008).
T. Phan-Xuan, et al., "Tuning the Structure of Protein Particles and Gels with Calcium or Sodium Ions", Biomacromol. 2013, 14, 1980-1989, (https://dx.doi.orq/10.102 1/bm400347d).
NMKL, Newsletter for the Nordic Committee on Food Analysis, NMKL Nord Vai International, No. 60, 2005; ISSN: 1100-5386.
Malvern Instruments Ltd., "Zetasizer Nano User Manual MAN0485", Issue 1.1, Apr. 2013.
BY. Qin, et al., "Functional implications of structural differences between variants A and B of bovine B-lactoglobulin", Prot. Sci. 1999, 8, 75-83, (https://doi.org/10.1110/ps.8.1.75 ), Cambridge University Press.
T. Nicolai, "Formation and functionality of self-assembled whey protein microgels", Colloids Surf B Biointerfaces 2016, 137, 32-38, (http://dx.doi.org/10.1016/jcolsurfb.2015.05.055).
A. Kharlamova, et al., "The effect of aggregation into fractals or microgels on the charge density and the isoionic point of globular proteins", Food Hydrocoll 2016, 60, 470-475, (https://doi/org/10. 1016/j.foodhyd 2016.04.013).

T Phan-Xuan, et al., "On the Crucial Importance of the pH for the Formation and Self-Stabilization of Protein Microgels and Strands", Langmuir 2011, 27, 15092-15101, (https://dx.doi.orq/10.1021/ la203357p), published Nov. 4, 2011.
O. G. Jones, et al., "Comparison of protein-polysaccharide nanoparticle fabrication methods: Impact of biopolymer complexation before or after particle formation", J. Colloid Interface Sci. 2010. 344, 21-29, (https://doi.org/10.1016/j.jcis.2009.12.017), Dec. 16, 2009.
Y. Guo, PhD thesis entitled "Production of nanoparticles with Beta lactoglobulin and whey proteins for the encapsulation of food ingredients", University of Reading (UK), 2017, (available via https//centaur.reading.ac.uk/75632/).
Y Guo, et al., "Characterisation of B-lactoglobulin nanoparticles and their binding to caffeine", Food Hydrocoll. 2017, 71, 85-93, (https://doi org/10.1016/j.foodhyd 2017.04.027).
Y L. Xiong, et al., "Thermal aggregation of B-lactoglobulin: Effect of the pH, Ionic Environment,and Thiol Reagent", J. Diary Sci. 1993, 76, 70-77, (https://doi.org/10.3168/jds.S0022-0302(93)77324- 5).
N. Matsudomi, et al., "Gelation of Bovine Serum Albumin and B-Lactoglobulin; Effects of pH, Salts and Thiol Reagents", FoodChem. 1991, 40, 55-69, (https://doi org/10.1016/0308-8146(91)90019-K).
R. Santipanichwong, et al., "Core-Shell Biopolymer Nanoparticles Produced by Electrostatic Deposition of Beet Pectin onto Heat-Denatured B-Lactoglobulin Aggregates", J. Food Sci. 2008, 73, N23-N30, (https://doi.orq/10.1111/i.1750-3841.2008.0080. x).
A. Ye, et al., "Interactions between whey proteins and salivary proteins as related to astringency of whey protein beverages at low pH", J. Dairy Sci. 2011, 94, 5842-5850.
C. Schmitt, et al.,"Internal structure and colloidal behaviour of covalent whey protein microgels obtained by heat treatment", Soft Matter 2010, 6, 4876-4884, (https ://doi.org/10,1039/COSM00220H).
A. Sarkar, et al., "Aqueous Lubrication, Structure and Rheological Properties of Whey Protein Microgel Particles", Langmuir 2017, 33, 14699-14708, (https://doi.orq/10.1021/acs.lanqmuir.7b03627).
Zimmermann & Partner Patentanwälte mbB, "Grounds of Opposition against EP 4 084 623 B1," Jan. 31, 2024.
Li Tiehong, et al., Dairy Industry, Functional Whey Protein Research and Application of Thermal Modification Technology—China Academic Journal Electronic Publishing House, 2009; DOI:10.16172/ j.cnki.114768.2009.01.002.
Phan-Xuan, Tuan, et al. "Heat induced formation of beta-lactoglobulin microgels driven by addition of calcium ions" Food Hydrocolloids (2012), Sep. 19, 2012.
Phan-Xuan, Tuan, et al. "Tuning the Structure of Protein Particles and Gels with Calcium or Sodium Ions" ACS Publications, 2013 American Chemical Society, Apr. 25, 2013.
Saglam, Dilek, et al. "Relation between Gelation Conditions and the Physical Properties of Whey Protein Particles" Langmuir—ACS Pblications, 2012 American Chemical Society; published Apr. 3, 2012.
Taheri, Afsaneh, et al. "Rheological Characteristics of Soluble Cress Seed Mucilage and beta-Lactoglobulin Complexes with Salts Addition: Rheological Evidence of Structural Rearrangement" Gels 2023, 9, 485; published Jun. 13, 2023.
Xiu, Xiuling, et al. Aggregation Characteristics of beta-Lactoglobulin: a Review. China Academic Journal Electronic Publishing House, Jul. 28, 2014—translated Abstract.
Abd El-Salam MH, et al. Glycation of whey proteins: Technological and nutritional implications. Int J Biol Macromol. Jun. 2018;112:83- 92. doi: 10.1016/j.ijbiomac.2018.01.114. Epub Jan. 31, 2018.
Database Compendex (Online) Engineering Information, Inc., Araiza-Calahorra A et al: "Designing biopolymer-coated Pickering emulsions to modulate: In vitro gastric digestion: A static model study", Sep. 1, 2019, Food and Function, Royal Society of Chemistry, GBR. XP002799535 abstract.
De Jongh et al "Mild Isolation Procedure Discloses New Protein Structural Properties of beta-Lactoglobulin," J Dairy Sci. vol. 84(3), 2001, pp. 562-571.
Nicolai, Taco, et al "Beta-Lactoglobulin and WPI aggregates: Formation, structure and applications", Food Hydrocolloids, 25 (2011)—1945-1962.

(56) References Cited

OTHER PUBLICATIONS

Schmitt, Christophe, et al., "Whey Protein Soluble Aggregates from Heating with NaCl: Physicochemical, Interfacial, and Foaming Properties", Langmuir 2007, 23, 4155-4166, Nov. 7, 2006.

Shewan, Heather M., et al. "Review of techniques to manufacture micro-hydrogel particles for the food industry and their applications," Journal of Food Engineering 119 (2013) 781-792, Mar. 22, 2013.

Gill et al, "Calculation of protein extinction coefficients from amino acid sequence data". Anal Biochem. Nov. 1, 1989;182(2):319-26.

European Patent Office / Guardian IP Consulting I/S, Reply to the Communication pursuant to Rule 79(1) EPC dated Feb. 18, 2025 and comments to the Notice of Opposition against European patent 4084623 dated Jun. 18, 2025.

* cited by examiner cross: native BLG  ;  dot = nanogel composition

1

METHOD OF PRODUCING DENSE WHEY PROTEIN NANOGELS, THE RESULTING WHEY PROTEIN NANOGELS OR NANOGEL COMPOSITIONS, AND FOOD PRODUCTS CONTAINING SUCH WHEY PROTEIN NANOGELS OR NANOGEL COMPOSITIONS

CROSS REFERENCE TO RELATED APPLICATIONS

This application is a national stage application of PCT/EP2020/087988 filed Dec. 29, 2020, which claims priority to European Application No. 19220144.0 filed Dec. 30, 2019, each of which are hereby incorporated by reference in their entirety.

FIELD OF THE INVENTION

The present invention pertains to production of special whey protein nanogels by denaturation of whey protein and furthermore to the resulting whey protein nanogels, and their use in food products, such as beverages. The present whey protein nanogels contribute with an extraordinarily low viscosity contribution when used in high concentration in beverage and liquid products which is a clear indication of their uniqueness.

BACKGROUND

The formation of micro or nanoparticles of denatured whey protein has been described previously and is known as a way of modifying the functionality of whey proteins.

U.S. Pat. No. 6,605,311 B2 discloses insoluble, denatured, heat-stable protein particles having a mean diameter of 0.1-3 microns when in a hydrated state, which are dispersible in aqueous solutions and are used in food and beverage products.

WO2007/110421 A2 discloses the preparation of nano-sized whey protein micelles by heat-denaturation of whey protein. Example 11 describes the formation of a whey protein micelle concentrate having a protein content of 20% w/w. The concentrate is described as having "a creamy, semi-solid texture" on page 28, $2^{nd}$ section of WO2007/110421A2 which clearly indicates a high viscosity.

CN105542195 A discloses nanogels formed by conjugation of polysaccharide and whey protein and subsequent heat-treatment and furthermore discloses the use of these nanogels in food products.

SUMMARY OF THE INVENTION

The present inventors have discovered that special process conditions make it possible to produce nanogels of denatured whey protein in a solution having a surprisingly high concentration of protein, and particularly having a surprisingly high concentration of native beta-lactoglobulin (BLG) which is the primary protein in whey and the driving force in thermal aggregating of whey proteins. The ability to form nanogels at a high protein concentration is highly advantageous as it reduces the energy consumption per kg protein during processing, as less solution has to be heated and subsequently cooled per kg protein. It furthermore reduces the costs for transporting the nanogel product in liquid form as less water has to be transported, and it reduces the costs of converting the nanogel suspension to a powder as less water has to be removed.

Thus, an aspect of the invention pertains to a method of producing a whey protein nanogel composition, the method comprising:
  a) providing a whey protein solution having:
    a content of native BLG in an amount of at least 3% w/w,
    a pH in the range of 5.8-7.5, preferably 5.8-6.5,
    a weight ratio between the total amount of calcium and native BLG which is at most 0.010, and
    a total concentration of monovalent metal cations of
      at most 25 mM if the content of native BLG of the whey protein solution is less than 10% w/w, or
      at most 20 mM if the content of native BLG of the whey protein solution is at least 10% w/w,
  b) heating the whey protein solution to a temperature of at least 68 degrees C. for a duration sufficient to form a suspension of whey protein nanogels,
  c) optionally, concentrating the suspension of whey protein nanogels to obtain a concentrated suspension of whey protein nanogels,
  d) optionally, drying a dryer feed comprising whey protein nanogels derived from step b) or c).

Another aspect of the invention pertains to a method of producing a whey protein nanogel composition, the method comprising:
  a) providing a whey protein solution having:
    a content of native BLG in an amount of at least 3% w/w,
    a pH in the range of 5.8-7.5, preferably 5.8-6.5,
    a weight ratio between the total amount of calcium and native BLG which is
    at most 0.0041*pH-0.0209, and
    at least 0.0037*pH-0.0234 but larger than zero, and
    a total concentration of monovalent metal cations of
      at most 25 mM if the content of native BLG of the whey protein solution is less than 10% w/w, or
      at most 20 mM if the content of native BLG of the whey protein solution is at least 10% w/w,
  b) heating the whey protein solution to a temperature of at least 68 degrees C. for a duration sufficient to form a suspension of whey protein nanogels,
  c) optionally, concentrating the suspension of whey protein nanogels to obtain a concentrated suspension of whey protein nanogels,
  d) optionally, drying a dryer feed comprising whey protein nanogels derived from step b) or c).

In addition to the above-mentioned advantages the inventors have observed that the nanogels of the present invention provide a surprisingly low viscosity when present in liquids at high protein concentrations of e.g. 20% w/w protein or even 30% w/w and are at the same time stable to heat-treatment, an even sterilising heat-treatment at such protein concentrations.

Prior art particles of denatured whey protein provide a much higher viscosity at increasing protein concentrations and may not even be able to reach a protein concentration of 20% w/w in a liquid solution.

Thus, another aspect of the invention pertains to a whey protein nanogel composition comprising whey protein nanogels in an amount of at least 30% relative to total protein and a total amount of protein of at least 30% w/w relative to total solids.

In some preferred embodiments of the present invention the whey protein nanogel composition is a whey protein nanogel composition in the form of a powder comprising:
    whey protein nanogels in an amount of at least 90% w/w relative to total protein,

3 soluble whey protein aggregates in an amount of most 5% w/w relative to total protein, total BLG in an amount of at least 90% w/w relative to total protein, and a total amount of protein of at least 30% relative to total solids.

The low viscosity and extraordinary heat-stability of the present nanogels makes them highly suitable for high protein beverages and enables the production of high protein, heat-sterilised beverage products that have a low viscosity and therefore are pleasant to drink.

Thus, another aspect of the invention pertains to a packaged, heat-treated beverage has a pH in the range of 3-8 and comprises whey protein nanogels in an amount of at least 1% w/w. A further aspect pertains to a process of producing the packaged, heat-treated beverage.

Thus, another aspect of the invention pertains to a process of producing an acidic, thickened food product comprising the steps of:

preparing a liquid food base having a pH of at least 5.7 which liquid food base comprises sufficient whey protein nanogel composition to provide protein in an amount of 4-20% w/w, the whey protein nanogel composition, preferably as defined herein, comprising:

soluble whey protein aggregates in an amount of at 15-70% w/w relative to total protein, whey protein nanogels in an amount of at least 30-85% relative to total protein, heat-treating the liquid food base at at least 70 degrees C. for a duration sufficient to at least pasteurise the liquid food base, optionally, homogenizing the heat-treated liquid food base, acidifying the heat-treated, liquid food base to a pH of at most 5.4, optionally homogenizing the acidified food base wherein the acidic, thickened food product is the acidified food base or a mixture of the acidified liquid food base and further ingredients such as e.g. sweeteners and/or flavours.

A further aspect pertains to the acidic, thickened food product obtainable by the process.

Yet an aspect of the invention pertains to the use of a whey protein nanogel composition as defined herein and/or a plurality of whey protein nanogels as defined herein for one or more of the following:

as an food ingredient, as a food ingredient for producing a sterile beverage containing at least 10% protein and even more preferred at least 21% protein, as a food ingredient for producing an acidic, thickened food product having a pH of less than 5.5 and a viscosity of at more than 200 cP measured at 20 degrees C. and a shear rate of 300 s$^{-1}$, and as a whitening agent, e.g. in coffee whiteners.

A further aspect of the invention pertains to the use of whey protein nanogels and/or whey protein nanogel composition as protein source for reducing the astringency and/or sourness of a heat-treated protein beverage having a pH of 3.0-5.0, most preferably 3.5-4.6, preferably wherein whey protein nanogels contribute with at least 50% w/w of the total protein of the heat-treated beverage, more preferably at least 70% w/w, even more preferably at least 80% w/w, and most preferably at least 90% w/w of the total protein of the heat-treated beverage; and preferably wherein the heat-treated beverage contains total protein in an amount of 2-35% w/w, more preferably 4-30% w/w, even more preferably 6-25% w/w and more preferably 8-20% w/w.

DETAILED DESCRIPTION

Figure 1:
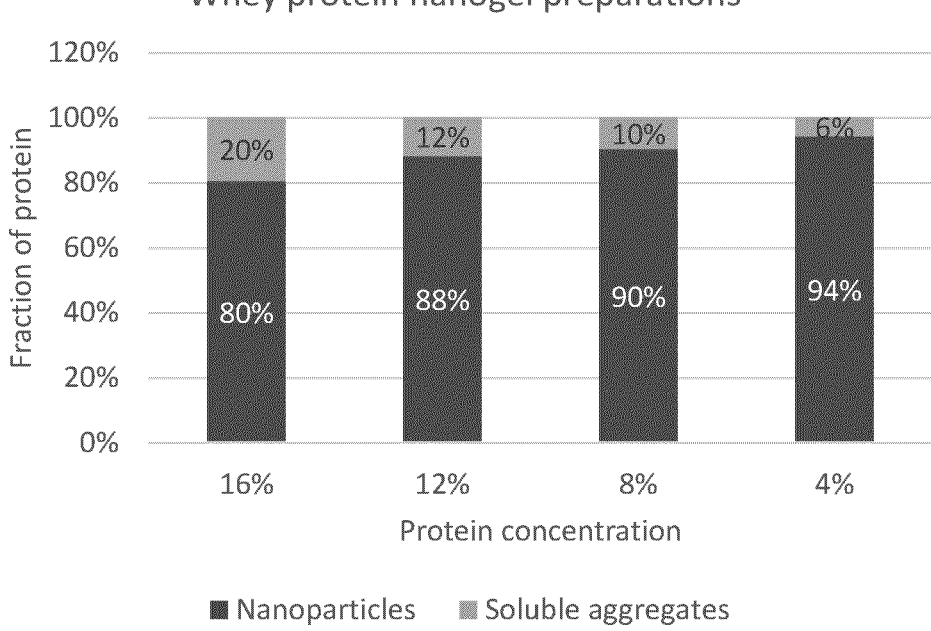
FIG. 1 shows the distribution of whey protein nanogels and soluble aggregates relative to total protein after thermal treatment of whey protein solutions containing 4-16% native BLG protein pH 5.9 at 90 degrees C. for 14 minutes.

BLG is the most predominant protein in bovine whey and milk serum and exists in several genetic variants, the main ones in cow milk being labelled A and B. BLG is a lipocalin protein and can bind many hydrophobic molecules, suggesting a role in their transport. BLG has also been shown to be able to bind iron via siderophores and might have a role in combating pathogens. A homologue of BLG is lacking in human breast milk.

Bovine BLG is a relatively small protein of approx. 162 amino acid residues with a molecular weight of approx. 18.3-18.4 kDa. Under physiological conditions, it is predominantly dimeric, but dissociates to a monomer below about pH 3, preserving its native state as determined using Nuclear Magnetic Resonance spectroscopy. Conversely, BLG also occurs in tetrameric, octameric and other multimeric aggregation forms under a variety of natural conditions.

In the context of the present invention the term "native BLG" pertains to undenatured BLG molecules as found in e.g. raw milk or whey or in low heat BLG isolates prepared by e.g. BLG crystallisation, chromatography or filtration. Native BLG in crystal form is therefore still native BLG. The amount of native BLG is quantified according to Analysis 6.

In the context of the present invention the term "total BLG" pertains to the sum of native, denatured and aggregated BLG. The amount of total BLG is quantified according to Analysis 17.

In the context of the present invention, the term "crystal" pertains to a solid material whose constituents (such as atoms, molecules or ions) are arranged in a highly ordered microscopic structure, forming a crystal lattice that extends in all directions.

In the context of the present invention, the term "BLG crystal" pertains to protein crystals that primarily contain non-aggregated and preferably native BLG arranged in a highly ordered microscopic structure, forming a crystal lattice that extends in all directions. The BLG crystals may e.g. be monolithic or polycrystalline and may e.g. be intact crystals, fragments of crystals, or a combination thereof.

Fragments of crystal are e.g. formed when intact crystals are subjected to mechanical shear during processing. Fragments of crystals also have the highly ordered microscopic structure of crystal but may lack the even surface and/or even edges or corners of an intact crystal. In both cases, the BLG crystal or crystal fragments can be identified visually as well-defined, compact and coherent structures using light microscopy. BLG crystal or crystal fragments are often at least partially transparent. Protein crystals are furthermore known to be birefringent and this optical property can be used to identify unknown particles having a crystal structure.

In the context of the present invention, the term "edible composition" pertains to a composition that is safe for human consumption and use as a food ingredient and that does not contain problematic amounts of toxic components, such as toluene or other unwanted organic solvents. The whey protein nanogel compositions and food products of the present invention are preferably edible food products.

In the context of the present invention, the term "ALA" or "alpha-lactalbumin" pertains to alpha-lactalbumin from mammal species, e.g. in native and/or glycosylated forms and includes the naturally occurring genetic variants. The term furthermore includes aggregated ALA and precipitated BLG. When referring to the amount of ALA reference is made to the total amount of ALA including e.g. aggregated ALA. The total amount of ALA is determined according to Example 1.31. The term "aggregated ALA" pertains to ALA which typically is at least partially unfolded and which has furthermore aggregated with other denatured ALA molecules and/or other denatured whey proteins, typically by means of hydrophobic interactions and/or covalent bonds.

In the context of the present invention, the term "caseinomacropeptide" or "CMP" pertains to the hydrophilic peptide, residue 106-169, originated from the hydrolysis of "κ-CN" or "kappa-casein" from mammal species, e.g. in native and/or glycosylated forms and includes the naturally occurring genetic variants, by an aspartic proteinase, e.g. chymosin.

In the context of the present invention, the term "BLG isolate" means a composition that contains BLG in an amount of at least 85% w/w relative to total protein. A BLG isolate preferably has a total protein content of a least 30% w/w, and preferably at least 80% w/w relative to total solids.

The term "whey" pertains to the liquid phase that is left after the casein of milk has been precipitated and removed. Casein precipitation may e.g. be accomplished by acidification of milk and/or by use of rennet enzyme. Several types of whey exist, such as "sweet whey", which is the whey product produced by rennet-based precipitation of casein, and "acid whey" or "sour whey", which is the whey product produced by acid-based precipitation of casein. Acid-based precipitation of casein may e.g. be accomplished by addition of food acids or by means of bacterial cultures.

The term "milk serum" pertains to the liquid which remains when casein and milk fat globules have been removed from milk, e.g. by microfiltration or large pore ultrafiltration. Milk serum is also considered a type of whey and is sometimes referred to as "ideal whey".

The term "milk serum protein" or "serum protein" pertains to the protein which is present in the milk serum.

In the context of the present invention, the term "whey protein" pertains to protein that is found in whey or in milk serum. Whey protein may be a subset of the protein species found in whey or milk serum and even a single whey protein species or it may be the complete set of protein species found in whey or/and in milk serum.

In the context of the present invention, the terms "liquid" and "solution" encompass both liquid compositions that are free of particulate matter and liquid compositions that contain a combination of liquid and solid and/or semi-solid particles, such as e.g. protein crystals or other protein particles. However, "liquid" and "solution" are preferably pumpable.

In the context of the present invention, the terms "whey protein concentrate" (WPC) and "serum protein concentrate" (SPC) pertain to dry or aqueous compositions which contain a total amount of protein of 20-89% w/w relative to total solids.

A WPC or an SPC preferably contains:
20-89% w/w protein relative to total solids,
15-70% w/w BLG relative to total protein,
8-50% w/w ALA relative to total protein, and
0-40% w/w CMP relative to protein.
Alternatively, but also preferred, a WPC or an SPC may contain:
20-89% w/w protein relative to total solids,
15-90% w/w BLG relative to total protein,
4-50% w/w ALA relative to total protein, and
0-40% w/w CMP relative to protein.
Preferably, a WPC or an SPC contains:
20-89% w/w protein relative to total solids,
15-80% w/w BLG relative to total protein,
4-50% w/w ALA relative to total protein, and
0-40% w/w CMP relative to protein.
More preferably a WPC or an SPC contains:
70-89% w/w protein relative to total solids,
30-90% w/w BLG relative to total protein,
4-35% w/w ALA relative to total protein, and
0-25% w/w CMP relative to protein.
SPC typically contains no CMP or only traces of CMP.

The terms "whey protein isolate" (WPI) and "serum protein isolate" (SPI) pertain to dry or aqueous compositions which contain a total amount of protein of 90-100% w/w relative to total solids.

A WPI or an SPI preferably contains:
90-100% w/w protein relative to total solids,
15-70% w/w BLG relative to total protein,
8-50% w/w ALA relative to total protein, and
0-40% w/w CMP relative to total protein.
Alternatively, but also preferred, a WPI or an SPI may contain:
90-100% w/w protein relative to total solids,
30-95% w/w BLG relative to total protein,
4-35% w/w ALA relative to total protein, and
0-25% w/w CMP relative to total protein.
More preferably a WPI or an SPI may contain:
90-100% w/w protein relative to total solids,
30-90% w/w BLG relative to total protein,
4-35% w/w ALA relative to total protein, and
0-25% w/w CMP relative to total protein.
SPI typically contains no CMP or only traces of CMP.

In the context of the present invention the term "whey protein nanogels" pertains to nanosized (typically about 150-1000 nm) particles of denatured whey protein, typically spherical or nearly spherical in shape. Whey protein nanogels have also been referred to as whey protein micelles and are e.g. discussed in WO2007/110421A2 while their micellar nature is questionable. The amount of whey protein nanogels is quantified according to Analysis 3. Protein nanogels have an opaque, milky appearance when suspended and are therefore very well-suited for opaque beverages.

In the context of the present invention the term "soluble whey protein aggregate" pertains to small aggregates of denatured whey proteins which aggregates are capable of forming strong gels (much stronger than native whey protein) during acidification to pH 4.6 and which aggregates typically have linear, worm-like, branched or chain-like shapes and are typically of submicron size. Soluble whey protein aggregates are well-known to the skilled person and are e.g. described in WO2007/110421A2 where they are referred to as linear aggregates. The amount of soluble whey protein aggregate is quantified according to Analysis 3. Soluble whey protein aggregates typically form transparent solutions when dissolved in water and are therefore very well-suited for transparent beverages.

The terms "consists essentially of" and "consisting essentially of" mean that the claim or feature in question encompasses the specified materials or steps and those that do not materially affect the basic and novel characteristic(s) of the claimed invention.

In the context of the present invention, the phrase "Y and/or X" means "Y" or "X" or "Y and X". Along the same line of logic, the phrase "$n_1$, $n_2$, . . . , $n_{i-1}$, and/or $n_i$," means "$n_1$" or "$n_2$" or . . . or "$n_{i-1}$" or "$n_i$" or any combination of the components: $n_1$, $n_2$, . . . $n_{i-1}$, and $n_i$.

In the context of the present invention, the term "dry" or "dried" means that the composition or product in question comprises at most 10% w/w water, preferably at most 6% w/w and more preferably even less.

In the context of the present invention, the weight percentage (% w/w) of a component of a certain composition, product, or material means the weight percentage of that component relative to the weight of the specific composition, product, or material unless another reference (e.g total solids or total protein) is specifically mentioned.

In the context of the present invention, the term "weight ratio" between component X and component Y means the value obtained by the calculation $m_X/m_Y$ wherein $m_X$ is the amount (weight) of components X and $m_Y$ is the amount (weight) of components Y.

In the context of the present invention, the term "at least pasteurisation" pertains to a heat-treatment which has microbial killing effect equal to or higher than a heat-treatment of 70 degrees C. for 10 seconds. The reference for determining the bacteria killing effect is *E. coli* O157:H7.

In the context of the present invention, the term "sterile" means that the sterile composition or product in question does not contain any viable microorganisms and therefore is devoid of microbial growth during storage at room temperature. A composition that has been sterilised is sterile.

When a liquid, such as a beverage, is sterilized and packaged aseptically in a sterile container it typically has a shelf life of at least six months at room temperature. The sterilization treatment kills spores and microorganisms that could cause spoilage of the liquid.

Thus, an aspect of the invention pertains to a method of producing a whey protein nanogel composition, the method comprising:
  a) providing a whey protein solution having:
    a content of native BLG in an amount of at least 3% w/w,
    a pH in the range of 5.8-7.5, preferably 5.8-6.5,
    a weight ratio between the total amount of calcium and native BLG which is at most 0.010, and
    a total concentration of monovalent metal cations of
      at most 25 mM if the content of native BLG of the whey protein solution is less than 10% w/w, or at most 20 mM if the content of native BLG of the whey protein solution is at least 10% w/w,
  b) heating the whey protein solution to a temperature of at least 68 degrees C. for a duration sufficient to form a suspension of whey protein nanogels,
  c) optionally, concentrating the suspension of whey protein nanogels to obtain a concentrated suspension of whey protein nanogels,
  d) optionally, drying a dryer feed comprising whey protein nanogels derived from step b) or c).

Another aspect of the invention pertains to a method of producing a whey protein nanogel composition, the method comprising:
  a) providing a whey protein solution having:
    a content of native BLG in an amount of at least 3% w/w,
    a pH in the range of 5.8-7.5, preferably 5.8-6.5,
    a weight ratio between the total amount of calcium and native BLG which is
      at most 0.0041*pH-0.0209, and
      at least 0.0037*pH-0.0234 but larger than zero, and
    a total concentration of monovalent metal cations of
      at most 25 mM if the content of native BLG of the whey protein solution is less than 10% w/w, or
      at most 20 mM if the content of native BLG of the whey protein solution is at least 10% w/w,
  b) heating the whey protein solution to a temperature of at least 68 degrees C. for a duration sufficient to form a suspension of whey protein nanogels,
  c) optionally, concentrating the suspension of whey protein nanogels to obtain a concentrated suspension of whey protein nanogels,
  d) optionally, drying a dryer feed comprising whey protein nanogels derived from step b) or c).

In some preferred embodiments of the present invention the method provides the whey protein nanogel composition in the form of a powder and comprises steps a), b), c) and d).

In other preferred embodiments of the present invention the method provides the whey protein nanogel composition in the form of a powder and comprises steps a), b) and d), but not step c).

In further preferred embodiments of the present invention the method provides the whey protein nanogel composition in the form of a liquid and comprises steps a), b) and c), but not step d).

In even further preferred embodiments of the present invention the method provides the whey protein nanogel composition in the form of a liquid and comprises steps a), and b), but not steps c) and d).

As mentioned above, step a) provides a whey protein solution which contains native BLG and optionally also other whey proteins. The whey protein solution is an aqueous solution and preferably contains water in an amount of at least 50% w/w. The whey protein solution is preferably edible and suitable as a food product. The whey protein solution may contain suspended particles in addition to dissolved protein.

The whey protein solution has a content of native BLG in an amount of at least 3% w/w.

In some preferred embodiments of the present invention the whey protein solution comprises native BLG in an amount of at least 4% w/w, more preferably at least 6% w/w, even more preferred at least 8% w/w, and most preferably at least 10% w/w.

In other preferred embodiments of the present invention the whey protein solution comprises native BLG in an amount of at least 11% w/w, more preferably at least 16% w/w, even more preferred at least 18% w/w, and most preferably at least 20% w/w.

In further preferred embodiments of the present invention the whey protein solution comprises native BLG in an amount of at least 21% w/w, more preferably at least 23% w/w, even more preferred at least 25% w/w, and most preferably at least 27% w/w.

Preferably the whey protein solution comprises native BLG in an amount of 3-30% w/w, more preferably in an amount of 4-28% w/w, even more preferred in an amount of 6-26% w/w, and most preferably in an amount of 8-24% w/w.

In some preferred embodiments of the present invention the whey protein solution comprises native BLG in an amount of 11-30% w/w, more preferably in an amount of 12-28% w/w, even more preferred in an amount of 14-26% w/w, and most preferably in an amount of 16-24% w/w.

In other preferred embodiments of the present invention the whey protein solution comprises native BLG in an amount of 10-24% w/w, more preferably in an amount of 12-22% w/w, even more preferred in an amount of 14-20% w/w, and most preferably in an amount of 16-18% w/w.

In even further preferred embodiments of the present invention the whey protein solution comprises native BLG in an amount of 21-32% w/w, more preferably in an amount of 22-31% w/w, even more preferred in an amount of 23-30% w/w, and most preferably in an amount of 24-29% w/w.

In some preferred embodiments of the present invention the whey protein solution comprises total protein in an amount of at least 4% w/w, more preferably at least 6% w/w, even more preferred at least 8% w/w, and most preferably at least 10% w/w.

Preferably the whey protein solution comprises total protein in an amount of 1-30% w/w, more preferably in an amount of 4-28% w/w, even more preferred in an amount of 6-26% w/w, and most preferably in an amount of 8-24% w/w.

In some preferred embodiments of the present invention the whey protein solution comprises total protein in an amount of 11-30% w/w, more preferably in an amount of 12-28% w/w, even more preferred in an amount of 14-26% w/w, and most preferably in an amount of 16-24% w/w.

In other preferred embodiments of the present invention the whey protein solution comprises total protein in an amount of 10-24% w/w, more preferably in an amount of 12-22% w/w, even more preferred in an amount of 14-20% w/w, and most preferably in an amount of 16-18% w/w.

In even further preferred embodiments of the present invention the whey protein solution comprises total protein in an amount of 21-32% w/w, more preferably in an amount of 22-31% w/w, even more preferred in an amount of 23-30% w/w, and most preferably in an amount of 24-29% w/w.

In some preferred embodiments of the present invention the whey protein solution comprises total protein in an amount of at least 30% w/w relative to total solids, more preferably at least 60% w/w relative to total solids, even more preferred at least 70% w/w relative to total solids, and most preferred at least 80% w/w relative to total solids.

In other preferred embodiments of the present invention the whey protein solution comprises total protein in an amount at least 85% w/w relative to total solids, more preferably at least 90% w/w relative to total solids, even more preferred at least 92% w/w relative to total solids, and most preferred at least 95% w/w relative to total solids.

In some preferred embodiments of the present invention the whey protein solution comprises native BLG in an amount of at least 50% w/w relative to total protein, more preferably at least 60% w/w relative to total protein, even more preferred at least 70% w/w relative to total protein, and most preferred at least 80% w/w relative to total protein.

In other preferred embodiments of the present invention the whey protein solution comprises native BLG in an amount at least 85% w/w relative to total protein, more preferably at least 90% w/w relative to total protein, even more preferred at least 92% w/w relative to total protein, and most preferred at least 95% w/w relative to total protein. It is often preferred that the whey protein solution comprises native BLG in an amount of at least 97% w/w relative to total protein.

In further preferred embodiments of the present invention the whey protein solution comprises native BLG in an amount in the range of 50-80% w/w relative to total protein, more preferably in the range of 52-75% w/w relative to total protein, even more preferred in the range of 5470% w/w relative to total protein, and most preferred in the range of 55-65% w/w relative to total protein. This is e.g. useful when highly demineralised WPI is used as protein source for the whey protein solution.

The whey protein solution may contain other protein than native BLG and typically contains other whey proteins. In some preferred embodiments of the present invention the whey protein solution only contains proteins derived from mammal whey.

In some preferred embodiments of the present invention the whey protein solution has a degree of protein denaturation of at most 20% w/w relative to total protein, more preferably at most 10% w/w relative to total protein, even more preferred at most 5% w/w relative to total protein, and most preferred at most 2% w/w relative to total protein.

Even lower denaturation may be preferred and in some preferred embodiments of the present invention the whey protein solution has a degree of protein denaturation of at most 1% w/w relative to total protein, more preferably at most 0.5% w/w relative to total protein, even more preferred at most 0.2% w/w relative to total protein, and most preferred at most 0.1% w/w relative to total protein.

The degree of protein denaturation is measured according to Analysis 3.

In some preferred embodiments of the present invention the whey protein solution has a total solids content in an amount of 3-50% w/w, more preferably in an amount of 4-40% w/w, even more preferred in an amount of 6-35% w/w, and most preferably in an amount of 8-30% w/w.

In other preferred embodiments of the present invention the whey protein solution has a total solids content in an amount of 10-50% w/w, more preferably in an amount of 12-40% w/w, even more preferred in an amount of 14-35% w/w, and most preferably in an amount of 16-30% w/w.

In some preferred embodiments of the present invention the whey protein solution has a water content in an amount of 50-97% w/w, more preferably in an amount of 60-96% w/w, even more preferred in an amount of 65-94% w/w, and most preferably in an amount of 70-92% w/w.

The portion of the whey protein solution that is not solids is preferably water.

The whey protein solution has a pH in the range of 5.8-7.5.

In some preferred embodiments of the present invention the whey protein solution has a pH in the range of 5.8-6.5, more preferably 5.9-6.3, and most preferably 5.9-6.2.

In other preferred embodiments of the present invention the whey protein solution has a pH in the range of 5.9-6.5, more preferably 6.0-6.4, and most preferably 6.1-6.3.

In even further preferred embodiments of the present invention the whey protein solution has a pH in the range of 6.5-7.5, more preferably 6.6-7.2, and even more preferably 6.7-7.0.

pH-adjustments are preferably performed using an alkalizing agent that does not increase the content of monovalent metal ions such as $Na^+$ and $K^+$. $Ca(OH)_2$ or amine-based alkalizing agents are presently preferred. Alternatively, but also preferred, is the use of alkalizing agent may contain a combination of one or more bases containing monovalent metal ions and one or more bases containing divalent metal ions. Such a combination is e.g. useful if the use of only $Ca(OH)_2$ for pH adjustment would provide too high a weight ratio between calcium and native BLG and the resulting concentration of monovalent metal ions does exceed the required threshold for efficient formation of nanogels.

In some particularly preferred embodiments of the invention the whey protein solution has a weight ratio between the total amount of calcium and native BLG which is:

at most 0.0041*pH-0.0209, and at least 0.0037*pH-0.0234 but larger than zero.

The term "larger than zero" means that the weight ratio between the total amount of calcium and native BLG will always be larger than absolute zero as the whey protein solution will always contain traces of calcium even though it may be hard to detect. However, the weight ratio can be very close to zero.

It is furthermore preferred that the total weight of other divalent metals of the whey protein solution is lower than the total weight of calcium, more preferably at most 50% of the total weight of calcium, and most preferably at most 20% of the total weight of calcium.

In some preferred embodiments of the present invention the whey protein solution has a weight ratio between the total amount of calcium and native BLG which is at most 0.0041*pH-0.0220, and at least 0.0037*pH-0.0222 but larger than zero.

In other preferred embodiments of the present invention the whey protein solution has a weight ratio between the total amount of calcium and native BLG which is at most, 0.0040*pH-0.0221, and at least 0.0039*pH-0.0221 but larger than zero.

In some preferred embodiments of the present invention the whey protein solution has a weight ratio between the total amount of calcium and native BLG of at most 0.0070, more preferably at most 0.0065, even more preferred at most 0.0060, and most preferred at most 0.0050.

In other preferred embodiments of the present invention the whey protein solution has a weight ratio between the total amount of calcium and native BLG of at most 0.0045, more preferably at most 0.0040, even more preferred at most 0.0035, and most preferred at most 0.0030.

Even lower weight ratios are often preferred and in some preferred embodiments of the present invention the whey protein solution has a weight ratio between the total amount of calcium and native BLG of at most 0.0025, more preferably at most 0.0020, even more preferred at most 0.0015, and most preferred at most 0.0005.

In some preferred embodiments of the present invention the whey protein solution has a weight ratio between the total amount of calcium and native BLG in the range of 0.0005-0.0065, more preferably 0.0010-0.0050, even more preferably 0.0015-0.0040, and most preferably in the range of 0.0015-0.0030, such as preferably 0.0017-0.0027.

The whey protein solution furthermore has a total concentration of monovalent metal cations of at most 25 mM if the content of native BLG of the whey protein solution is less than 10% w/w, or at most 20 mM if the content of native BLG of the whey protein solution is at least 10% w/w.

In some preferred embodiments of the present invention the content of native BLG of the whey protein solution is less than 10% w/w and the whey protein solution has a total concentration of monovalent metal cations of at most 24 mM, more preferably at most 22 mM, even more preferably at most 21 mM, and most preferably at most 20 mM.

In some preferred embodiments of the present invention, irrespective of the content of native BLG, the whey protein solution has a total concentration of monovalent metal cations of at most 19 mM, more preferably at most 17 mM, even more preferably at most 15 mM, and most preferably at most 10 mM. Even lower contents of monovalent metal cations may be preferred and in some preferred embodiments of the present invention the whey protein solution has a total concentration of monovalent metal cations of at most 8 mM, more preferably at most 6 mM, even more preferably at most 4 mM, and most preferably at most 2 mM.

The present method makes is possible to produce whey protein nanogel compositions with a very high yield of whey protein nanogels and a low contents soluble whey protein aggregates and microparticles which are often are not desired. The present method therefore offers an improved and more cost effective way of producing whey protein nanogel compositions having a high purity of whey protein nanogels and enables the production of new whey protein nanogel compositions that are not available in the prior art.

The whey protein solution may comprise other macronutrients than proteins, such as e.g. carbohydrate and/or lipid.

However, it is often preferred that the whey protein solution contains carbohydrate in an amount of at most 15% w/w relative to total solids, more preferably at most 5% w/w relative to total solids, even more preferably at most 1% w/w relative to total solids, and most preferably at most 0.1% w/w relative to total solids.

It is furthermore often preferred that the whey protein solution contains lipid in an amount of at most 8% w/w relative to total solids, more preferably at most 2% w/w relative to total solids, even more preferably at most 0.5% w/w relative to total solids, and most preferably at most 0.1% w/w relative to total solids.

The whey protein solution may comprise other macronutrients and ingredients than proteins. The embodiments and preferences described below in the context of the packaged, heat-treated beverage and pertaining to macronutrients and additional ingredients equally apply to the whey protein solution and we refer to those embodiments instead of repeating them here.

In some particularly preferred embodiments of the invention the whey protein solution has the same chemical composition as that of the packaged, heat-treated beverage except that the protein is in native form.

In other particularly preferred embodiments of the invention the whey protein solution has the same chemical composition as that of the packaged, heat-treated beverage.

The protein source for the whey protein solution may be any source that provides native BLG and optionally also minerals. The whey protein source may for example be a whey protein isolate, a milk serum protein isolate, a milk serum protein concentrate, or a combination thereof. Whey protein isolates and/or milk serum protein isolates are particularly preferred. The whey protein source preferably has a very low mineral content.

A presently preferred source of whey protein is a BLG isolate obtainable by crystallisation and recovery of BLG crystals as outlined in WO 2018/115520 A1, i.e. by crystallisation of BLG in salting in mode from an aqueous solution containing whey protein and having a pH 5-6. The protein source may e.g. be the wet crystal slurry obtained by a process according to WO 2018/115520 A1 or a spray-dried crystal slurry obtained according to WO 2018/115520 A1. Alternatively, but also preferred, the protein source may be a BLG isolate according to PCT/EP2019/066998 and preferably obtainable by a process outlined in PCT/EP2019/066998. WO 2018/115520 A1 and PCT/EP2019/066998 are incorporated herein by reference for all purposes.

Alternatively, but also preferred, the protein source may be a BLG isolate obtainable according to de Jongh et al (Mild Isolation Procedure Discloses New Protein Structural Properties of beta-Lactoglobulin, J Dairy Sci., vol. 84(3), 2001, pages 562-571) and subsequently subjected to further demineralisation by dialysis.

Alternatively, but also preferred, the protein source may be a commercially available high quality WPI which is subjected to demineralisation by dialysis prior to use.

The whey protein used in the whey protein solution is whey protein from mammal milk, such as e.g. milk from cow, goat, mare, sheep, camel, and/or buffalo. Bovine whey protein is particularly preferred.

The protein of the various compositions described herein is preferably edible protein and may contain other edible proteins in addition to BLG. It is particularly preferred that the protein of the present invention is derived from mammal milk, e.g. protein provided by separating and/or modifying one or more protein specie form mammal milk. It is most preferred that the protein of the present invention is whey protein or protein material derived from whey protein, preferably by heat-denaturation. It is however envisioned and often preferred that the food products containing the whey protein nanogels or whey protein nanogel compositions of the present invention may contain non-milk protein in addition to protein species from milk.

Ideally the whey protein solution is provided by dissolving the whey protein source in demineralised water and optionally adjusting the pH. It may furthermore be necessary to modify the mineral composition to arrive at a useful whey protein solution as described herein.

Step b) involves heating the whey protein solution to a temperature of at least 68 degrees C. for a duration sufficient to form a suspension of whey protein nanogels. Step b) may furthermore involve cooling the suspension to end the heat-treatment unless the suspension is to be used warm, e.g. for direct spray-drying or for production of a food product.

If step b) involves a cooling the suspension is typically cooled to a temperature of at most 50 degrees C., more preferably at most 40 degree C., even more preferably at most 20 degrees C. and more preferably at most 10 degrees C.

In some preferred embodiments of the present invention the heating of step b) heats the whey protein solution to a temperature of at least 70 degrees C., more preferably at least 75 degrees C., even more preferably at least 80 degrees C., and most preferably at least 85 degrees C. Even higher temperatures have been demonstrated to be useful and in some preferred embodiments of the present invention the heating of step b) heats the whey protein solution to a temperature of at least 90 degrees C., more preferably at least 95 degrees C., even more preferably at least 100 degrees C., and most preferably at least 120 degrees C.

In some preferred embodiments of the present invention the heating of step b) heats the whey protein solution to a temperature in the range of 68-160 degrees C., more preferably 75-150 degrees C., even more preferably 80-120 degrees C. and most preferably 85-100 degrees C.

It is particularly preferred that heating of step b) heats the whey protein solution to a temperature in the range of 80-95 degrees C., more preferably 82-92 degrees C., even more preferably 84-90 degrees C. and most preferably 85-89 degrees C.

The duration of the heat treatment of step b) should be sufficient to form a considerable amount of nanogels. The duration is preferably at least 500 milliseconds and often much longer. The duration is preferably chosen to denature a substantial amount of the native BLG of the whey protein solution.

In some preferred embodiments of the present invention the heating of step b) is performed for a duration sufficient to denature at least 50% w/w of the native BLG, more preferably at least 80% w/w of the native BLG, even more preferably at least 90% of the native BLG and most preferably at least 95% w/w of the native BLG. Even higher levels of BLG denaturation may be preferred and in some preferred embodiments of the present invention the heating of step b) is performed for a duration sufficient to denature at least 96% w/w of the native BLG, more preferably at least 97% w/w of the native BLG, even more preferably at least 98% of the native BLG and most preferably at least 99% w/w of the native BLG.

The present inventors have found that a high level of BLG denaturation gives a better heat-stability of the resulting whey protein nanogels composition.

The duration of the heat-treatment depends on the temperature but is typically between 1 minute to 1 hour, preferably between 4-50 minutes, more preferably between 6-45 minutes, even more preferably between 8-40 minutes, and most preferably between 10-30 minutes.

The present method surprisingly allows for producing whey protein nanogel composition at a high protein concentration with only limited mechanical shear or even with no mechanical shear despite the relatively high protein concentrations used in the whey protein solution. In some preferred embodiments of the present invention the heat-treatment of step b) does not involve mechanical shear, such as e.g. scraped-surface heat-exchangers or high pressure homogenization. However, mechanical shear is not excluded from the present invention and in other preferred embodiments of the present invention the heat-treatment of step b) does involve mechanical shearing.

Compositional features described in the context of the whey protein solution of step a) apply equally to the suspension of whey protein nanogels obtained in step b) save that considerably amount of native protein has been denatured and hence converted to e.g. whey protein nanogels.

Step c) is optional but preferred in some embodiments.

Thus, in some preferred embodiments of the present invention the method comprises step c) which involves concentrating the suspension of whey protein nanogels to obtain a concentrated suspension of whey protein nanogels.

However, in other preferred embodiments of the present invention the method does not comprise step c) and the suspension is therefore not concentrated.

In the present content the term "concentrating the suspension of whey protein nanogels" does not involve a drying step such as e.g. spray-drying but the removal of at least water to increase the concentration of at least whey protein nanogels.

The suspension of whey protein nanogels is preferably concentrated by one or more of the following methods: microfiltration, ultrafiltration, nanofiltration, reverse osmosis and/or evaporation. Ultrafiltration, nanofiltration or reverse osmosis are particularly preferred as they retain the protein content of the suspension.

In some embodiments of the present invention the concentration of step c) increases the content of whey protein nanogels of the suspension by a least 25%, more preferably by at least 50%, even more preferred by at least 75%, and most preferred by at least 100%. Even higher levels of concentration may be required and in some preferred embodiments of the present invention the concentration of step c) increases the content of whey protein nanogels of the suspension by a least 200%, more preferably by at least 300%, even more preferred by at least 500%, and most preferred by at least 700%.

In some embodiments of the present invention the concentration of step c) increases the content of whey protein nanogels of the suspension by 25-900%, more preferably by 100-850%, even more preferred by 200-825%, and most preferred by 300-800%.

In some preferred embodiments of the present invention the concentration of step c) provides a concentrated suspension of whey protein nanogels which comprises a total amount of protein of at least 21% w/w, more preferably at least 25%, even more preferred by at least 28% w/w, and most preferred by at least 30% w/w.

Thus, in some preferred embodiments of the present invention the concentrated suspension of whey protein nanogels comprises a total amount of protein of at least 21% w/w, more preferably at least 25%, even more preferred by at least 28% w/w, and most preferred by at least 30% w/w.

In other preferred embodiments of the present invention the concentration of step c) provides a concentrated suspension of whey protein nanogels which comprises a total amount of protein of 21-35% w/w, more preferably 25-33%, even more preferred 28-32% w/w, and most preferred 29-31% w/w.

Thus in other preferred embodiments of the present invention the concentrated suspension of whey protein nanogels comprises a total amount of protein of 21-35% w/w, more preferably 25-33%, even more preferred 28-32% w/w, and most preferred 29-31% w/w.

In some preferred embodiments of the present invention the concentration of step c) provides a concentrated suspension of whey protein nanogels which comprises whey protein nanogels in an amount of at least 21% w/w, more preferably at least 25%, even more preferred by at least 28% w/w, and most preferred by at least 30% w/w.

Thus, in some preferred embodiments of the present invention the concentrated suspension of whey protein nanogels comprises whey protein nanogels in an amount of at least 21% w/w, more preferably at least 25%, even more preferred by at least 28% w/w, and most preferred by at least 30% w/w.

In other preferred embodiments of the present invention the concentration of step c) provides a concentrated suspension of whey protein nanogels which comprises whey protein nanogels in an amount of 21-35% w/w, more preferably 25-33%, even more preferred 28-32% w/w, and most preferred 29-31% w/w.

Thus, in other preferred embodiments of the present invention the concentrated suspension of whey protein nanogels comprises whey protein nanogels in an amount of 21-35% w/w, more preferably 25-33%, even more preferred 28-32% w/w, and most preferred 29-31% w/w.

The present inventors have found that it is preferred to control the content of soluble whey protein aggregates of the suspension and concentrated suspension and keeping them to a minimum.

Thus, in some preferred embodiments of the present invention the concentrated suspension of whey protein nanogels comprises soluble whey protein aggregates in an amount of at most 8% w/w, more preferably at most 6%, even more preferred at most 3% w/w, and most preferred at most 1% w/w. Even lower contents of soluble whey protein aggregates are feasible and in some preferred embodiments of the present invention the concentrated suspension of whey protein nanogels comprises soluble whey protein aggregates in an amount of at most 1% w/w, more preferably at most 0.5%, even more preferred at most 0.3% w/w, and most preferred at most 0.1% w/w.

In some preferred embodiments of the present invention the concentrated suspension of whey protein nanogels comprises whey protein nanogels in an amount of at least 60% w/w relative to total protein, more preferably at least 70% w/w, even more preferably at least 80% w/w, and most preferably at least 90% w/w relative to total protein.

Even higher contents of whey protein nanogel are both feasible and often preferred. Thus in some preferred embodiments of the present invention the concentrated suspension of whey protein nanogels comprises whey protein nanogels in an amount of at least 92% w/w relative to total protein, more preferably at least 94% w/w, even more preferably at least 96% w/w, and most preferably at least 98% w/w relative to total protein.

Compositional features described in the context of the whey protein solution of step a) apply equally to the concentrated suspension of whey protein nanogels obtained in step c) save that considerably amount of native protein has been denatured and hence converted to e.g. whey protein nanogels. Furthermore the content of total protein has been increased due to the concentration.

If the pH of the whey protein nanogel composition should be different from the pH used during the formation of the whey protein nanogels, the method preferably comprises one or more steps of adjusting the pH of one or more of the whey protein nanogel-containing streams obtained by or following step b), e.g. the suspension of whey protein nanogels, the concentrated suspension of whey protein nanogels, and/or the dryer feed. The one or more pH-adjustments are sufficient to provide a whey protein nanogel composition having the desired pH, and preferably one of the preferred ranges mentioned in the context of the whey protein nanogel composition. The one or more pH-adjustments preferably use one or more suitable acids or bases, preferably selected from the acids or bases mentioned herein.

Step d) is optional but preferred in some embodiments.

In some preferred embodiments of the present invention the method does not comprise step d) and no drying step is performed.

However, in other preferred embodiments of the present invention the method comprises step d) which involves drying a dryer feed comprising whey protein nanogels derived from step b) or c). Step d) is particularly preferred as it provides the whey protein nanogel composition in the form of a powder which is easy to transport and has a better storage stability than has an aqueous suspension.

In the context of the present invention the term "dryer feed" pertains to the liquid feed that is fed to a dryer in order to convert the feed to a powder. The present dryer feed contains whey protein nanogels produced in step b).

In some preferred embodiments of the present invention the dryer feed comprises the solids of the suspension of whey protein nanogels of step b) and/or the solids of the concentrated suspension of whey protein nanogels of step c).

In other preferred embodiments of the present invention the solids of the dryer feed comprises the solids of the suspension of whey protein nanogels of step b) and/or the solids of the concentrated suspension of whey protein nanogels of step c).

In some preferred embodiments of the present invention the dryer feed is the suspension of whey protein nanogels of step b) and/or the concentrated suspension of whey protein nanogels of step c).

Preferably, the dryer feed comprises a total amount of protein of at least 21% w/w, more preferably at least 25%, even more preferred at least 28% w/w, and most preferred at least 30% w/w.

In some preferred embodiments of the present invention the dryer feed comprises a total amount of protein of 21-35% w/w, more preferably 25-33%, even more preferred 28-32% w/w, and most preferred 29-31% w/w.

In other preferred embodiments of the present invention the dryer feed comprises a total amount of protein of 15-32% w/w, more preferably 17-31%, even more preferred 18-30% w/w, and most preferred 19-29% w/w.

Preferably the dryer feed comprises whey protein nanogels in an amount of at least 21% w/w, more preferably at least 25%, even more preferred by at least 28% w/w, and most preferred by at least 30% w/w.

In some preferred embodiments of the present invention the dryer feed comprises whey protein nanogels in an amount of 21-35% w/w, more preferably 25-33%, even more preferred 28-32% w/w, and most preferred 29-31% w/w.

In other preferred embodiments of the present invention the dryer feed comprises whey protein nanogels in an amount of 10-35% w/w, more preferably 12-30%, even more preferred 14-25% w/w, and most preferred 15-20% w/w.

The inventors have seen indications that the drying of a dryer feed comprising whey protein nanogels in an amount of 10-25% w/w provides dried whey protein nanogel composition having an improved dispersibility when reconstituted in water. Thus, in some preferred embodiments of the invention the dryer feed comprises whey protein nanogels in an amount of 10-25% w/w, more preferably 12-25%, even more preferred 14-20% w/w, and most preferred 15-20% w/w.

It is preferred that the dryer feed comprises soluble whey protein aggregates in an amount of at most 8% w/w, more preferably at most 6%, even more preferred at most 3% w/w, and most preferred at most 1% w/w.

In some preferred embodiments of the present invention the dryer feed comprises whey protein nanogels in an amount of at least 60% w/w relative to total protein, more preferably at least 70% w/w, even more preferably at least 80% w/w, and most preferably at least 90% w/w relative to total protein.

Even higher contents of whey protein nanogel are both feasible and often preferred. Thus in some preferred embodiments of the present invention the dryer feed comprises whey protein nanogels in an amount of at least 92% w/w relative to total protein, more preferably at least 94% w/w, even more preferably at least 96% w/w, and most preferably at least 98% w/w relative to total protein.

In some preferred embodiments of the present invention the dryer feed comprises:
   a content of total BLG in an amount of at least 90% w/w relative to total protein, most preferably at least 95% w/w,
   a content of total protein in an amount of at least 80% w/w relative to total solids, most preferably at least 90% w/w,
   a content of total solids in the range of 21-40% w/w, most preferably 24-35% w/w,
   whey protein nanogels in an amount of at least 90% w/w relative to total protein, most preferably at least 95% w/w, and
   soluble whey protein aggregates in an amount of at most 9% w/w relative to total protein, and most preferably at most 5% w/w.

In further preferred embodiments of the present invention the dryer feed comprises:
   a content of total BLG in an amount of at least 90% w/w relative to total protein, most preferably at least 95% w/w,
   a content of total protein in an amount of at least 80% w/w relative to total solids, most preferably at least 90% w/w,
   a content of total solids in the range of 8-25% w/w, most preferably 12-22% w/w,
   whey protein nanogels in an amount of 30-85% w/w relative to total protein, most preferably of 35-70% w/w, and
   soluble whey protein aggregates in an amount of 15-70% w/w relative to total protein, and most preferably 30-65% w/w.

In even further preferred embodiments of the present invention the dryer feed comprises:
   a content of total BLG in an amount of at least 50% w/w relative to total protein, most preferably at least 60% w/w,
   a content of total protein in an amount of at least 80% w/w relative to total solids, most preferably at least 90% w/w,
   a content of total solids in the range of 8-25% w/w, most preferably 12-22% w/w,
   whey protein nanogels in an amount of 30-85% w/w relative to total protein, most preferably of 35-70% w/w, and
   soluble whey protein aggregates in an amount of 15-70% w/w relative to total protein, and most preferably 30-65% w/w.

It is particularly preferred that the dryer feed contains carbohydrate in an amount of at most 15% w/w relative to total solids, more preferably at most 5% w/w relative to total solids, even more preferably at most 1% w/w relative to total solids, and most preferably at most 0.1% w/w relative to total solids.

In some preferred embodiments of the invention, the dryer feed contains carbohydrate in an amount in the range of 1-15% w/w relative to total solids, more preferably 5-15% w/w and most preferably 8-15% w/w relative to total solids. The inventors have seen indications that such embodiments are useful for whey protein nanogel compositions in powder form as they appear to ease the reconstitution and hydration of the powder. The carbohydrate preferably comprises or even consists of digestible carbohydrate such as e.g. sucrose, lactose, glucose, galactose and/or maltodextrin.

The carbohydrate may be present in the whey protein solution before the heat-treatment of step b). However, in some preferred embodiments of the invention at least some of the carbohydrate of the dryer feed is added after the heat-treatment of step b).

It is furthermore particularly preferred that the dryer feed contains lipid in an amount of at most 8% w/w relative to total solids, more preferably at most 2% w/w relative to total solids, even more preferably at most 0.5% w/w relative to total solids, and most preferably at most 0.1% w/w relative to total solids.

In some preferred embodiments of the present invention the method is a method of producing a whey protein nanogel composition in the form of a powder, the method comprising:

a) providing a whey protein solution having:
a content of native BLG in an amount of 8-30% w/w, most preferably 12-24% w/w,
a content of native BLG in an amount of at least 90% w/w relative to total protein, most preferably at least 95% w/w,
a content of total protein in an amount of least at least 80% w/w relative to total solids, most preferably at least 90% w/w,
a pH in the range of 5.8-7.5, most preferably 5.8-6.5,
a weight ratio between the total amount calcium and native BLG which is
at most 0.0041*pH-0.0209, and
at least 0.0037*pH-0.0234 but larger than zero, and
a total concentration of monovalent metal cations of
at most 20 mM, and most preferably at most 15 mM, if the content of native BLG of the whey protein solution is less than 10% w/w, or
at most 15 mM, and most preferably at most 10 mM, if the content of native BLG of the whey protein solution is at least 10% w/w,
b) heating the whey protein solution to a temperature of 80-100 degrees C., most preferably at least 85-95 degrees C. for a duration sufficient to form a suspension of whey protein nanogels, the duration sufficient to denature at least 90% of the native BLG, most preferably at least 95%,
c) optionally, concentrating the suspension of whey protein nanogels to obtain a concentrated suspension of whey protein nanogels,
d) drying a dryer feed by spray-drying, the dryer feed comprising whey protein nanogels derived from step b) or c), preferably the dryer feed is the suspension of step b) or the concentrated suspension of step c).

In some preferred embodiments of the present invention the method is a method of producing a whey protein nanogel composition in the form of a powder, the method comprising:

a) providing a whey protein solution having:
a content of native BLG in an amount of 8-30% w/w, most preferably 12-24% w/w,
a content of native BLG in an amount of at least 90% w/w relative to total protein, most preferably at least 95% w/w,
a content of total protein in an amount of at least 80% w/w relative to total solids, most preferably at least 90% w/w,
a pH in the range of 5.8-7.5, most preferably 5.8-6.5,
a weight ratio between the total amount of calcium and native BLG which is
at most 0.0041*pH-0.0209, and
at least 0.0037*pH-0.0234 but larger than zero, and a total concentration of monovalent metal cations of
at most 20 mM, and most preferably at most 15 mM, if the content of native BLG of the whey protein solution is less than 10% w/w, or
at most 15 mM, and most preferably at most 10 mM, if the content of native BLG of the whey protein solution is at least 10% w/w,
b) heating the whey protein solution to a temperature of 80-100 degrees C., most preferably at least 85-95 degrees C. for a duration sufficient to form a suspension of whey protein nanogels, the duration sufficient to denature at least 90% of the native BLG, most preferably at least 95%,
c) if the concentration of whey protein nanogels in the suspension of step b) is below the required whey protein nanogel concentration of step d) then concentrating the suspension of whey protein nanogels to obtain a concentrated suspension of whey protein nanogels having the required whey protein nanogel concentration,
d) drying a dryer feed by spray-drying, the dryer feed comprising whey protein nanogels derived from step b) or c), preferably the dryer feed is the suspension of step b) or the concentrated suspension of step c), the dryer feed comprises:
a content of total BLG in an amount of at least 90% w/w relative to total protein, most preferably at least 95% w/w,
a content of total protein in an amount of at least 80% w/w relative to total solids, most preferably at least 90% w/w,
a content of total solids in the range of 21-40% w/w, most preferably 24-35% w/w,
whey protein nanogels in an amount of at least 90% w/w relative to total protein, most preferably at least 95% w/w, and
soluble whey protein aggregates in an amount of at most 9% w/w relative to total protein, and most preferably at most 5% w/w.

In some preferred embodiments of the present invention the method is a method of producing a whey protein nanogel composition in the form of a powder, the method comprising:

a) providing a whey protein solution having:
a content of native BLG in an amount of 16-30% w/w, most preferably 18-24% w/w,
a content of native BLG in an amount of at least 90% w/w relative to total protein, most preferably at least 95% w/w,
a content of total protein in an amount of at least 80% w/w relative to total solids, most preferably at least 90% w/w,
a pH in the range of 5.8-7.5, most preferably 5.8-6.5,
a weight ratio between the total amount of calcium and native BLG which is
at most 0.0041*pH-0.0209, and
at least 0.0037*pH-0.0234 but larger than zero, and
a total concentration of monovalent metal cations of
at most 20 mM, and most preferably at most 15 mM, if the content of native BLG of the whey protein solution is less than 10% w/w, or
at most 15 mM, and most preferably at most 10 mM, if the content of native BLG of the whey protein solution is at least 10% w/w,
b) heating the whey protein solution to a temperature of 80-100 degrees C., most preferably at least 85-95 degrees C. for a duration sufficient to form a suspension of whey protein nanogels, the duration sufficient to denature at least 90% of the native BLG, most preferably at least 95%, d) drying a dryer feed by spray-drying, the dryer feed comprising whey protein nanogels derived from step b) or c), the dryer feed is the suspension of step b).

In some preferred embodiments of the present invention the method is a method of producing a whey protein nanogel composition in the form of a powder, the method comprising:

a) providing a whey protein solution having:
    a content of native BLG in an amount of 3-10% w/w, most preferably 4-8% w/w,
    a content of native BLG in an amount of at least 90% w/w relative to total protein, most preferably at least 95% w/w,
    a content of total protein in an amount of least at least 80% w/w relative to total solids, most preferably at least 90% w/w,
    a pH in the range of 5.8-7.5, most preferably 5.8-6.5,
    a weight ratio between the total amount of calcium and native BLG which is
        at most $0.0041*pH-0.0209$, and
        at least $0.0037*pH-0.0234$ but larger than zero, and
    a total concentration of monovalent metal cations of at most 15 mM, and most preferably at most 10 mM, b) heating the whey protein solution to a temperature of 80-100 degrees C., most preferably at least 85-95 degrees C. for a duration sufficient to form a suspension of whey protein nanogels, the duration sufficient to denature at least 90% of the native BLG, most preferably at least 95%, c) concentrating the suspension of whey protein nanogels to obtain a concentrated suspension of whey protein nanogels having the whey protein nanogel concentration required in step d), d) drying a dryer feed by spray-drying, the dryer feed comprising whey protein nanogels derived from step b) or c), the dryer feed is the concentrated suspension of step c), the dryer feed comprises:
    a content of total BLG in an amount of at least 90% w/w relative to total protein, most preferably at least 95% w/w,
    a content of total protein in an amount of at least 80% w/w relative to total solids, most preferably at least 90% w/w,
    a content of total solids in the range of 21-40% w/w, most preferably 24-35% w/w,
    whey protein nanogels in an amount of at least 90% w/w relative to total protein, most preferably at least 95% w/w, and
    soluble whey protein aggregates in an amount of at most 9% w/w relative to total protein, and most preferably at most 5% w/w.

It is particularly preferred that the whey protein nanogel composition contains carbohydrate in an amount of at most 15% w/w relative to total solids, more preferably at most 5% w/w relative to total solids, even more preferably at most 1% w/w relative to total solids, and most preferably at most 0.1% w/w relative to total solids.

In some preferred embodiments of the invention, the whey protein nanogel composition contains carbohydrate in an amount in the range of 1-15% w/w relative to total solids, more preferably 5-15% w/w and most preferably 8-15% w/w relative to total solids. The inventors have seen indications that such embodiments are useful for whey protein nanogel compositions in powder form as they appear to ease the reconstitution and hydration of the powder. The carbohydrate preferably comprises or even consists of digestible carbohydrate such as e.g. sucrose, lactose, glucose, galactose and/or maltodextrin.

It is furthermore particularly preferred that the whey protein nanogel composition contains lipid in an amount of at most 8% w/w relative to total solids, more preferably at most 2% w/w relative to total solids, even more preferably at most 0.5% w/w relative to total solids, and most preferably at most 0.1% w/w relative to total solids.

In some preferred embodiments of the present invention the method is a method of producing a whey protein nanogel composition in the form of a powder, the method comprising:

a) providing a whey protein solution having:
    a content of native BLG in an amount of 8-20% w/w, most preferably 12-18% w/w,
    a content of native BLG in an amount of at least 90% w/w relative to total protein, most preferably at least 95% w/w,
    a content of total protein in an amount of at least 80% w/w relative to total solids, most preferably at least 90% w/w,
    a pH in the range of 5.8-7.5, most preferably 5.9-6.5,
    a weight ratio between the total amount of calcium and native BLG which is
        at most $0.0041*pH-0.0209$, and
        at least $0.0037*pH-0.0234$ but larger than zero, and
    a total concentration of monovalent metal cations of
        18-25 mM, and most preferably 20-25 mM, if the content of native BLG of the whey protein solution is less than 10% w/w, or
        15-20 mM, and most preferably 17-20 mM, if the content of native BLG of the whey protein solution is at least 10% w/w, b) heating the whey protein solution to a temperature of 80-100 degrees C., most preferably at least 85-95 degrees C. for a duration sufficient to form a suspension of whey protein nanogels, the duration sufficient to denature at least 90% of the native BLG, most preferably at least 95%, c) optionally, concentrating the suspension of whey protein nanogels to obtain a concentrated suspension of whey protein nanogels, d) drying a dryer feed by spray-drying, the dryer feed comprising whey protein nanogels derived from step b) or c), preferably the dryer feed is the suspension of step b) or the concentrated suspension of step c), preferably the dryer feed comprising
    a content of total BLG in an amount of at least 90% w/w relative to total protein, most preferably at least 95% w/w,
    a content of total protein in an amount of at least 80% w/w relative to total solids, most preferably at least 90% w/w,
    a content of total solids in the range of 8-25% w/w, most preferably 12-22% w/w,
    whey protein nanogels in an amount of 30-85% w/w relative to total protein, most preferably of 35-70% w/w, and
    soluble whey protein aggregates in an amount of 15-70% w/w relative to total protein, and most preferably 30-65% w/w.

Yet an aspect of the invention pertains to a whey protein nanogel composition comprising whey protein nanogels in an amount of at least 30% relative to total protein and a total amount of protein of at least 30% w/w relative to total solids.

The whey protein nanogel composition is preferably obtainable by the method described herein.

In some preferred embodiments of the present invention the whey protein nanogel composition comprises whey protein nanogels in an amount of at least 60% w/w relative to total protein, more preferably at least 70% w/w, even more preferably at least 80% w/w, and most preferably at least 90% w/w relative to total protein.

Even higher contents of whey protein nanogel are often preferred, and in other preferred embodiments of the present invention the whey protein nanogel composition comprises whey protein nanogels in an amount of at least 92% w/w relative to total protein, more preferably at least 94% w/w, even more preferably at least 96% w/w, and most preferably at least 98% w/w relative to total protein.

It may even be preferred that the whey protein nanogel composition contains whey protein nanogels in an amount of about 100% w/w relative to total protein.

In some preferred embodiments of the present invention the whey protein nanogel composition comprises soluble whey protein aggregates in an amount of at most 30% w/w relative to total protein, more preferably at most 20% w/w, even more preferably at most 10% w/w, and most preferably at most 5% w/w relative to total protein.

Even lower contents of soluble whey protein aggregate are often preferred and the whey protein nanogel composition preferably comprises soluble whey protein aggregates in an amount of at most 3% w/w relative to total protein, more preferably at most 2% w/w, even more preferably at most 1% w/w, and most preferably at most 0.5% w/w relative to total protein.

In other preferred embodiments of the present invention the whey protein nanogel composition comprises soluble whey protein aggregates in an amount of at most 30% w/w relative to the total weight of the composition, more preferably at most 20% w/w, even more preferably at most 10% w/w, and most preferably at most 5% w/w relative to the total weight of the composition.

Even lower contents of soluble whey protein aggregate are often preferred and the whey protein nanogel composition preferably comprises soluble whey protein aggregates in an amount of at most 3% w/w relative to the total weight of the composition, more preferably at most 2% w/w relative to the total weight of the composition, even more preferably at most 1% w/w relative to the total weight of the composition, and most preferably at most 0.5% w/w relative to the total weight of the composition.

Whey protein nanogel composition having a low content of soluble whey protein aggregates are particularly useful for high protein acidic beverages.

The present inventors have seen indications that such whey protein nanogel compositions having an increased content of whey protein nanogels appear to be subject to slower gastrointestinal digestion and form less gel in the acidic environment of the stomach than soluble whey protein aggregates. The whey protein nanogels therefore appear to contribute less to development of structure and the feeling of satiety than soluble whey protein aggregates. This makes these whey protein nanogels useful for high energy beverages for clinical nutrition of any pH that should not promote a feeling of satiety.

The present inventors have observed that whey protein nanogel compositions having a significant content of soluble whey protein aggregates are stable to heat-treatment and furthermore generate gel upon acidification. This makes such whey protein nanogel compositions highly suitable for acidic, thickened food products which are produced by pasteurizing a liquid food base and subsequently acidifying the heat-treated food base. This is for example useful to replace the use of carbohydrate-based hydrocolloids such as starches, gums or pectins.

In some preferred embodiments of the present invention the whey protein nanogel composition comprises:

a total amount of BLG of at least 90% w/w relative to total protein, most preferably at least 95% w/w, whey protein nanogels in an amount of 30-85% w/w relative to total protein, most preferably of 35-70% w/w, and.

soluble whey protein aggregates in an amount of 15-70% w/w relative to total protein, and most preferably 30-65% w/w.

In other preferred embodiments of the present invention the whey protein nanogel composition comprises:

a total amount of BLG of at least 50% w/w relative to total protein, most preferably at least 60% w/w, whey protein nanogels in an amount of 30-85% w/w relative to total protein, most preferably of 35-70% w/w, and.

soluble whey protein aggregates in an amount of 15-70% w/w relative to total protein, and most preferably 30-65% w/w.

The present inventors have seen indications that such whey protein nanogel compositions having an increased content of soluble whey protein aggregates appear to be subject to faster gastrointestinal digestion and is believed to form gel in the acidic environment of the stomach and contribute to development of structure and the feeling of satiety. This makes these whey protein nanogel compositions useful for beverages that may promote improved satiety and/or rapid digestion of protein.

The whey protein nanogel composition that contain soluble whey protein aggregates in an amount of 15-70% w/w relative to total protein, and most preferably 30-65% w/w, may be used as a food ingredient for producing a thickened food product having a pH of less than 5.5 and a viscosity of at more than 200 cP measured at 20 degrees C. and a shear rate of 300 s$^{-1}$.

It is typically preferred that the whey protein nanogel composition of the present invention contains a low amount of larger whey protein particles which may cause sedimentation in beverages and even an impression of sandiness. Thus, in some preferred embodiments of the present invention the whey protein nanogel composition comprises whey protein microparticles in an amount of at most 10% w/w relative to total protein, more preferably at most 5% w/w, even more preferably at most 3% w/w, and most preferably at most 1% w/w relative to total protein. The content of whey protein microparticles is determined according to Analysis 3.

The whey protein nanogel compositions of the present Examples typically contained less than 4% w/w whey protein microparticles if any.

In some preferred embodiments of the present invention the whey protein nanogel composition comprises total protein in an amount of at least 30% w/w relative to total solids, more preferably at least 60% w/w relative to total solids, even more preferred at least 70% w/w relative to total solids, and most preferred at least 80% w/w relative to total solids.

In other preferred embodiments of the present invention the whey protein nanogel composition comprises total protein in an amount of at least 85% w/w relative to total solids, more preferably at least 90% w/w relative to total solids, even more preferred at least 92% w/w relative to total solids, and most preferred at least 95% w/w relative to total solids.

In some preferred embodiments of the present invention the whey protein nanogel composition comprises total protein in an amount of at least 30% w/w, more preferably at least 60% w/w, even more preferred at least 70% w/w, and most preferred at least 80% w/w.

In other preferred embodiments of the present invention the whey protein nanogel composition comprises total protein in an amount of at least 85% w/w, more preferably at least 90% w/w, even more preferred at least 92% w/w, and most preferred at least 95% w/w.

In some preferred embodiments of the present invention the whey protein nanogel composition comprises total BLG in an amount of at least 50% w/w relative to total protein, more preferably at least 60% w/w relative to total protein, even more preferred at least 70% w/w relative to total protein, and most preferred at least 80% w/w relative to total protein.

In other preferred embodiments of the present invention the whey protein nanogel composition comprises total BLG in an amount of at least 85% w/w relative to total protein, more preferably at least 90% w/w relative to total protein, even more preferred at least 92% w/w relative to total protein, and most preferred at least 95% w/w relative to total protein. It is often preferred that the whey protein nanogel composition comprises total BLG in an amount of at least 97% w/w relative to total protein.

In further preferred embodiments of the present invention the whey protein nanogel composition comprises total BLG in an amount in the range of 50-80% w/w relative to total protein, more preferably in the range of 52-75% w/w relative to total protein, even more preferred in the range of 54-70% w/w relative to total protein, and most preferred in the range of 55-65% w/w relative to total protein.

In the context of the present invention the term "total BLG in an amount" and "a total amount of BLG" is used interchangeably and both relate to the total amount of BLG of the composition in question including both native and denatured BLG.

In some preferred embodiments of the present invention the whey protein nanogel composition is a liquid and comprises total solids in an amount of 1-50% w/w, more preferably in an amount of 10-45% w/w, even more preferred in an amount of 15-40% w/w, and most preferably in an amount of 20-35% w/w.

It is preferred that if the whey protein nanogel composition is a liquid it comprises water in an amount of 50-99% w/w, more preferably in an amount of 55-90% w/w, even more preferred in an amount of 60-85% w/w, and most preferably in an amount of 65-80% w/w.

In the context of liquid whey protein nanogel compositions it is preferred that soluble whey protein aggregates are present in an amount of at most 8% w/w, more preferably at most 6%, even more preferred at most 3% w/w, and most preferred at most 1% w/w.

In some preferred embodiments of the present invention the whey protein nanogel composition is a powder and comprises total solids in an amount of 90-99% w/w, more preferably in an amount of 92-99% w/w, even more preferred in an amount of 94-99% w/w, and most preferably in an amount of 95-99% w/w.

It is preferred that if the whey protein nanogel composition is a powder it comprises water in an amount of water in an amount of 1-10% w/w, more preferably in an amount of 1-8% w/w, even more preferred in an amount of 1-6% w/w, and most preferably in an amount of 1-5% w/w.

In some preferred embodiments of the present invention the whey protein nanogel composition is a paste and comprises total solids in an amount of 51-89% w/w, more preferably in an amount of 55-90% w/w, even more preferred in an amount of 60-85% w/w, and most preferably in an amount of 65-80% w/w.

It is preferred that if the whey protein nanogel composition is a powder it comprises water in an amount of 11-49% w/w, more preferably in an amount of 13-45% w/w, even more preferred in an amount of 15-40% w/w, and most preferably in an amount of 20-35% w/w.

Although a wide range of pHs are possible, the whey protein nanogel composition preferably has a pH in the range of 3-8, more preferably 4-7, even more preferably 5-7, and most preferably 6-7.

If the whey protein nanogel composition contains a considerable amount of soluble whey protein aggregates it is preferred that the pH is in the range of 5.7-8, and most preferably in the range of 6.0-7.5.

The present inventors have found that pH neutral variants of the whey protein nanogel composition are particularly suitable for pH neutral food applications where the pH of the final food product, e.g. a beverage, is close to the pH of the whey protein nanogel composition. This reduces the risk of undesired agglomeration of protein during the handling of the protein and particularly during the pH adjustments.

In some preferred embodiments of the present invention the whey protein nanogel composition has a pH in the range of 6-8, and most preferably 6-7. In other preferred embodiments of the present invention the whey protein nanogel composition has a pH in the range of 7-8.

In further preferred embodiments of the present invention the whey protein nanogel composition has a pH in the range of 6.5-8.0, and more preferably 6.6-7.5, even more preferably 6.8-7.5 and most preferably 6.9-7.5.

Similar to the situation for the pH neutral variants of the whey protein nanogel composition, the present inventors have found that acidic variants of the whey protein nanogel composition are particularly suitable for acidic food applications where the pH of the final food product, e.g. a beverage, is close to the pH of the whey protein nanogel composition as it reduces the risk of undesired agglomeration of protein during the handling of the protein and particularly during the pH adjustments.

In some preferred embodiments of the present invention the whey protein nanogel composition has a pH in the range of 3-5, and most preferably 3-4.

In other preferred embodiments of the present invention the whey protein nanogel composition has a pH in the range of 4-5.

In further preferred embodiments of the present invention the whey protein nanogel composition has a pH in the range of 3-5.5, and more preferably 3.0-5.0, even more preferably 3.0-4.7 and most preferably 3.5-4.5.

The nanogels of the present invention typically have a particle size in the nano-range. In some preferred embodiments of the present invention the particles of the whey protein nanogel composition in hydrated form have a z-average diameter measured by dynamic light scattering of 150-1000 nm, more preferably 170-900 nm, even more preferred 200-800 nm, and most preferred 250-700 nm.

In some preferred embodiments of the present invention the particles of the whey protein nanogel composition in hydrated form have a z-average diameter of 150-800 nm, more preferably 250-700 nm, even more preferred 300-600 nm, and most preferred 350-500 nm.

If the nanogels are provided in the form of powdered whey protein nanogel composition the measurement of particle size and polydispersity index require reconstitution in water and hydration of the whey protein nanogels prior to the particles size measurement, and preferably subjecting the reconstituted whey protein nanogels to homogenisation to make sure they are have been hydrated.

In some preferred embodiments of the present invention the particles of the whey protein nanogel composition have a polydispersity index of at most 0.3, more preferably at most 0.2, even more preferably at most 0.1, and most preferably at most 0.05.

If the whey protein nanogel composition for example is prepared by directly drying the suspension of whey protein nanogel of step b) or the concentrated suspension of step c) it contains the same or slightly less mineral on a total solids basis as the whey protein solution did.

Thus, in some preferred embodiments of the present invention the whey protein nanogel composition has a weight ratio between the total amount of calcium and native BLG of at most 0.0070, more preferably at most 0.0065, even more preferred at most 0.0060, and most preferred at most 0.0050.

In other preferred embodiments of the present invention the whey protein nanogel composition has a weight ratio between the total amount of calcium and total BLG of at most 0.0045, more preferably at most 0.0040, even more preferred at most 0.0035, and most preferred at 0.0030.

Even lower weight ratios are often preferred and in some preferred embodiments of the present invention the whey protein nanogel composition has a weight ratio between the total amount of calcium and total BLG of at most 0.0025, more preferably at most 0.0020, even more preferred at most 0.0015, and most preferred at 0.0010.

In other preferred embodiments of the present invention the whey protein nanogel composition has a weight ratio between the total amount of calcium and total BLG in the range of 0.0010-0.0030, and most preferably in the range of 0.0017-0.0027.

The whey protein nanogel composition may preferably have a total concentration of monovalent metal cations of at most 20 mM, when standardized to 20% w/w total protein by vacuum evaporation or adding of milli-Q water, more preferably at most 15 mM, even more preferably at most 10 mM, and more preferably at most 5 mM.

In some preferred embodiments of the present invention the whey protein nanogel composition has a total content of monovalent metal ions of at most 0.5% w/w relative to total solids, more preferably at most 0.3% w/w, even more preferably at most 0.1% w/w relative to total solids, and most preferably at most 0.01% w/w relative to total solids.

While the present method limits the weight ratio between calcium and native BLG during the heat-treatment of step b) it is possible to enrich the resulting suspension of whey protein nanogel with calcium and other minerals. This may e.g. be advantageous if the whey protein nanogel composition is to be used to enrich the mineral content of a food product.

Thus in some preferred embodiments of the present invention the whey protein nanogel composition has a weight ratio between the total amount of calcium and total BLG of at least 0.005, more preferably at least 0.01, even more preferred at least 0.02, and most preferred at least 0.03.

In other preferred embodiments of the present invention the whey protein nanogel composition has a weight ratio between the total amount of calcium and total BLG of 0.005-0.050, more preferably 0.010-0.045, even more 0.015-0.040, and most preferred 0.020-0.035.

In some preferred embodiments of the present invention the whey protein nanogel composition has a total concentration of monovalent metal cations of more than 20 mM, when standardized to 20% w/w total protein by vacuum evaporation or adding of milli-Q water, more preferably at least 25 mM, even more preferably at least 50 mM, and more preferably at least 100 mM.

In other preferred embodiments of the present invention the whey protein nanogel composition has a total concentration of monovalent metal cations of 20-400 mM, when standardized to 20% w/w total protein by vacuum evaporation or adding of milli-Q water, more preferably at least 40-350 mM, even more preferably 50-300 mM, and most preferably 60-250 mM.

The whey protein nanogel composition may comprise other macronutrients than proteins, such as e.g. carbohydrate and/or lipid.

However, it is often preferred that the whey protein nanogel composition contains carbohydrate in an amount of at most 15% w/w relative to total solids, more preferably at most 5% w/w relative to total solids, even more preferably at most 1% w/w relative to total solids, and most preferably at most 0.1% w/w relative to total solids.

In some preferred embodiments of the invention, the whey protein nanogel composition contains carbohydrate in an amount in the range of 1-15% w/w relative to total solids, more preferably 5-15% w/w and most preferably 8-15% w/w relative to total solids. The inventors have seen indications that such embodiments are useful for whey protein nanogel compositions in powder form as they appear to ease the reconstitution and hydration of the powder. The carbohydrate preferably comprises or even consists of digestible carbohydrate such as e.g. sucrose, lactose, glucose, galactose and/or maltoxdetrin.

It is furthermore often preferred that the whey protein nanogel composition contains lipid in an amount of at most 8% w/w relative to total solids, more preferably at most 2% w/w relative to total solids, even more preferably at most 0.5% w/w relative to total solids, and most preferably at most 0.1% w/w relative to total solids.

The whey protein nanogel composition may comprise other macronutrients and ingredients than proteins. The embodiments and preferences described below in the context of the packaged, heat-treated beverage and pertaining to macronutrients and additional ingredients equally apply to the whey protein nanogel composition and we refer to those embodiments instead of repeating them here.

In some particularly preferred embodiments of the invention the whey protein nanogel composition has the same chemical composition as that of the packaged, heat-treated beverage except that the protein is in native form.

In other particularly preferred embodiments of the invention the whey protein nanogel composition has the same chemical composition as that of the packaged, heat-treated beverage.

In some preferred embodiments of the present invention the whey protein nanogel composition is in the form of a powder, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 9% w/w relative to total protein, and most preferably at most 5% w/w and one or more of the following:

i) the particles of the whey protein nanogel composition in hydrated form have a z-average diameter measured by dynamic light scattering of 150-900 nm, ii) having a viscosity of at most 150 cP at 20 degrees C. and at a shear rate of 300 s$^{-1}$ when standardized to 20% w/w total protein by vacuum evaporation or addition of milli-Q water, and most preferred at most 100 cP at 20 degrees C. and at a shear rate of 300 s$^{-1}$, and iii) the particles of the whey protein nanogel composition in hydrated form having a polydispersity index of at most 0.2.

In some preferred embodiments of the present invention the whey protein nanogel composition is in the form of a powder, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 70% w/w relative to total protein, most preferably at least 80% w/w, and soluble whey protein aggregates in an amount of at most 9% w/w relative to total protein, and more preferably at most 5% w/w and one or more of the following:

i) the particles of the whey protein nanogel composition in hydrated form have a z-average diameter measured by dynamic light scattering of 150-900 nm, ii) having a viscosity of at most 150 cP at 20 degrees C. and at a shear rate of 300 s$^{-1}$ when standardized to 20% w/w total protein by vacuum evaporation or addition of milli-Q water, and most preferred at most 100 cP at 20 degrees C. and at a shear rate of 300 s$^{-1}$, and iii) the particles of the whey protein nanogel composition in hydrated form have a polydispersity index of at most 0.2.

In some preferred embodiments of the present invention the whey protein nanogel composition is in the form of a powder, said whey protein nanogel composition comprising:

total solids in an amount of at least 92% w/w relative to the total weight of the composition, total protein in an amount of at least 80% w/w relative to total solids, most preferably at least 90% w/w, a total amount of BLG of at least 90% w/w relative to total protein, most preferably at least 95% w/w, whey protein nanogels in an amount of at least 80% w/w relative to total protein, most preferably at least 85% w/w, and soluble whey protein aggregates in an amount of at most 20% w/w relative to total protein, and most preferably at most 15% w/w and one or more of the following:

i) the particles of the whey protein nanogel composition in hydrated form have a z-average diameter measured by dynamic light scattering of 150-900 nm, ii) having a viscosity of at most 300 cP at 20 degrees C. and at a shear rate of 300 s$^{-1}$ when standardized to 20% w/w total protein by vacuum evaporation or addition of milli-Q water, and most preferred at most 200 cP at 20 degrees C. and at a shear rate of 300 s$^{-1}$, and iii) the particles of the whey protein nanogel composition in hydrated form having a polydispersity index of at most 0.2.

In some preferred embodiments of the present invention the whey protein nanogel composition is in the form of a powder, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 70% w/w relative to total protein, most preferably at least 80% w/w, and soluble whey protein aggregates in an amount of at most 9% w/w relative to total protein, and most preferably at most 5% w/w and one or more of the following:

i) the particles of the whey protein nanogel composition in hydrated form have a z-average diameter measured by dynamic light scattering of 150-900 nm, ii) having a viscosity of at most 300 cP at 20 degrees C. and at a shear rate of 300 s$^{-1}$ when standardized to 20% w/w total protein by vacuum evaporation or addition of milli-Q water, and most preferred at most 200 cP at 20 degrees C. and at a shear rate of 300 s$^{-1}$, and iii) the particles of the whey protein nanogel composition in hydrated form have a polydispersity index of at most 0.2.

In some preferred embodiments of the present invention the whey protein nanogel composition is in the form of a powder, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 90% w/w relative to total protein, most preferably at least 95% w/w, whey protein nanogels in an amount of 30-85% w/w relative to total protein, most preferably of 35-70% w/w, and soluble whey protein aggregates in an amount of 15-70% w/w relative to total protein, and most preferably 30-65% w/w and one or more of the following:

i) the particles of the whey protein nanogel composition in hydrated form have a z-average diameter measured by dynamic light scattering of 150-900 nm, and iii) the particles of the whey protein nanogel composition in hydrated form have a polydispersity index of at most 0.2.

In some preferred embodiments of the present invention the whey protein nanogel composition is in the form of a powder, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of 30-59% w/w relative to total protein, most preferably of 35-50% w/w, and soluble whey protein aggregates in an amount of 21-50% w/w relative to total protein, and most preferably 30-45% w/w and one or more of the following:

i) the particles of the whey protein nanogel composition in hydrated form have a z-average diameter measured by dynamic light scattering of 150-900 nm, and iii) the particles of the whey protein nanogel composition in hydrated form have a polydispersity index of at most 0.2.

The powders of the present invention are preferably dried by spray-drying.

In some preferred embodiments of the present invention the whey protein nanogel composition is in the form of a liquid, said whey protein nanogel composition comprising:

total protein in an amount of 21-35% w/w relative to the total weight of the whey protein nanogel composition, most preferably 24-32% w/w, total protein in an amount of at least 80% w/w relative to total solids, most preferably at least 90% w/w, total BLG in an amount of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 9% w/w relative to total protein, and most preferably in an amount of at most 5% w/w, and one or more of:

i) the particles of the whey protein nanogel composition in hydrated form have a z-average diameter measured by dynamic light scattering of 150-900 nm, and ii) having a viscosity of at most 200 cP at 20 degrees C. and at a shear rate of 300 s$^{-1}$ when standardized to 20% w/w total protein by vacuum evaporation or addition of milli-Q water, and iii) the particles of the whey protein nanogel composition in hydrated form have a polydispersity index of at most 0.2.

In some preferred embodiments of the present invention the whey protein nanogel composition in the form of a liquid has a viscosity of at most 200 cP at 20 degrees C. and at a shear rate of 300 s$^{-1}$ when standardized to 20% w/w total protein by vacuum evaporation or addition of milli-Q water, more preferably at most 100 cP at 20 degrees C. and at a shear rate of 300 s$^{-1}$, even more preferably at most 50 cP at 20 degrees C. and at a shear rate of 300 s$^{-1}$, and most preferably at most 20 cP at 20 degrees C. and at a shear rate of 300 s$^{-1}$.

While other methods may be used to prepare the present whey protein nanogel composition it is preferred that the whey protein nanogel composition is obtainable by the method described herein.

In some preferred embodiments of the present invention the whey protein nanogel composition is in the form of a powder and has a pH in the range of 6-8, most preferably 7-8, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 9% w/w relative to total protein, and most preferably at most 5% w/w and one or more of the following:

i) the particles of the whey protein nanogel composition in hydrated form have a z-average diameter measured by dynamic light scattering of 150-900 nm, ii) having a viscosity of at most 150 cP at 20 degrees C. and at a shear rate of 300 s$^{-1}$ when standardized to 20% w/w total protein by vacuum evaporation or addition of milli-Q water, and most preferred at most 100 cP at 20 degrees C. and at a shear rate of 300 s$^{-1}$, and iii) the particles of the whey protein nanogel composition in hydrated form having a polydispersity index of at most 0.2.

In some preferred embodiments of the present invention the whey protein nanogel composition is in the form of a powder and has a pH in the range of 6-8, most preferably 7-8, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 70% w/w relative to total protein, most preferably at least 80% w/w, and soluble whey protein aggregates in an amount of at most 9% w/w relative to total protein, and more preferably at most 5% w/w and one or more of the following:

i) the particles of the whey protein nanogel composition in hydrated form have a z-average diameter measured by dynamic light scattering of 150-900 nm, ii) having a viscosity of at most 150 cP at 20 degrees C. and at a shear rate of 300 s$^{-1}$ when standardized to 20% w/w total protein by vacuum evaporation or addition of milli-Q water, and most preferred at most 100 cP at 20 degrees C. and at a shear rate of 300 s$^{-1}$, and iii) the particles of the whey protein nanogel composition in hydrated form have a polydispersity index of at most 0.2.

In other preferred embodiments of the present invention the whey protein nanogel composition is in the form of a powder and has a pH in the range of 6-8, most preferably 7-8, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 9% w/w relative to total protein, and more preferably at most 5% w/w and one or more of the following:

i) the particles of the whey protein nanogel composition in hydrated form have a z-average diameter measured by dynamic light scattering of 150-900 nm, ii) having a viscosity of at most 150 cP at 20 degrees C. and at a shear rate of 300 s$^{-1}$ when standardized to 20% w/w total protein by vacuum evaporation or addition of milli-Q water, and most preferred at most 100 cP at 20 degrees C. and at a shear rate of $300 \text{ s}^{-1}$, and iii) the particles of the whey protein nanogel composition in hydrated form have a polydispersity index of at most 0.2.

In some preferred embodiments of the present invention the whey protein nanogel composition is in the form of a powder and has a pH in the range of 6-8, most preferably 7-8, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 90% w/w relative to total protein, most preferably at least 95% w/w, whey protein nanogels in an amount of at least 80% w/w relative to total protein, most preferably at least 85% w/w, and soluble whey protein aggregates in an amount of at most 20% w/w relative to total protein, and most preferably at most 15% w/w and one or more of the following:

i) the particles of the whey protein nanogel composition in hydrated form have a z-average diameter measured by dynamic light scattering of 150-900 nm, ii) having a viscosity of at most 300 cP at 20 degrees C. and at a shear rate of $300 \text{ s}^{-1}$ when standardized to 20% w/w total protein by vacuum evaporation or addition of milli-Q water, and most preferred at most 200 cP at 20 degrees C. and at a shear rate of $300 \text{ s}^{-1}$, and iii) the particles of the whey protein nanogel composition in hydrated form having a polydispersity index of at most 0.2.

In some preferred embodiments of the present invention the whey protein nanogel composition is in the form of a powder and has a pH in the range of 6-8, most preferably 7-8, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 70% w/w relative to total protein, most preferably at least 80% w/w, and soluble whey protein aggregates in an amount of at most 9% w/w relative to total protein, and most preferably at most 5% w/w and one or more of the following:

i) the particles of the whey protein nanogel composition in hydrated form have a z-average diameter measured by dynamic light scattering of 150-900 nm, ii) having a viscosity of at most 300 cP at 20 degrees C. and at a shear rate of $300 \text{ s}^{-1}$ when standardized to 20% w/w total protein by vacuum evaporation or addition of milli-Q water, and most preferred at most 200 cP at 20 degrees C. and at a shear rate of $300 \text{ s}^{-1}$, and iii) the particles of the whey protein nanogel composition in hydrated form have a polydispersity index of at most 0.2.

In some preferred embodiments of the present invention the whey protein nanogel composition is in the form of a powder and has a pH in the range of 6-8, most preferably 7-8, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 9% w/w relative to total protein, and most preferably at most 5% w/w and one or more of the following:

i) the particles of the whey protein nanogel composition in hydrated form have a z-average diameter measured by dynamic light scattering of 150-900 nm, ii) having a viscosity of at most 300 cP at 20 degrees C. and at a shear rate of $300 \text{ s}^{-1}$ when standardized to 20% w/w total protein by vacuum evaporation or addition of milli-Q water, and most preferred at most 200 cP at 20 degrees C. and at a shear rate of $300 \text{ s}^{-1}$, and iii) the particles of the whey protein nanogel composition in hydrated form have a polydispersity index of at most 0.2.

In some preferred embodiments of the present invention the whey protein nanogel composition is in the form of a powder and has a pH in the range of 6-8, most preferably 7-8, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 90% w/w relative to total protein, most preferably at least 95% w/w, whey protein nanogels in an amount of 30-85% w/w relative to total protein, most preferably of 35-70% w/w, and soluble whey protein aggregates in an amount of 15-70% w/w relative to total protein, and most preferably 30-65% w/w and one or more of the following:

i) the particles of the whey protein nanogel composition in hydrated form have a z-average diameter measured by dynamic light scattering of 150-900 nm, and iii) the particles of the whey protein nanogel composition in hydrated form have a polydispersity index of at most 0.2.

In some preferred embodiments of the present invention the whey protein nanogel composition is in the form of a powder and has a pH in the range of 6-8, most preferably 7-8, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of 30-59% w/w relative to total protein, most preferably of 35-50% w/w, and soluble whey protein aggregates in an amount of 21-50% w/w relative to total protein, and most preferably 30-45% w/w and one or more of the following:

i) the particles of the whey protein nanogel composition in hydrated form have a z-average diameter measured by dynamic light scattering of 150-900 nm, and iii) the particles of the whey protein nanogel composition in hydrated form have a polydispersity index of at most 0.2.

The powders of the present invention are preferably dried by spray-drying.

In some preferred embodiments of the present invention the whey protein nanogel composition is in the form of a liquid and has a pH in the range of 6-8, most preferably 7-8, said whey protein nanogel composition comprising:

total protein in an amount of 21-35% w/w relative to the total weight of the whey protein nanogel composition, most preferably 24-32% w/w, total protein in an amount of at least 80% w/w relative to total solids, most preferably at least 90% w/w, total BLG in an amount of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 9% w/w relative to total protein, and most preferably in an amount of at most 5% w/w, and one or more of:

i) the particles of the whey protein nanogel composition in hydrated form have a z-average diameter measured by dynamic light scattering of 150-900 nm, and ii) having a viscosity of at most 200 cP at 20 degrees C. and at a shear rate of 300 s$^{-1}$ when standardized to 20% w/w total protein by vacuum evaporation or addition of milli-Q water, and iii) the particles of the whey protein nanogel composition in hydrated form have a polydispersity index of at most 0.2.

In some preferred embodiments of the present invention the whey protein nanogel composition is in the form of a liquid and has a pH in the range of 6-8, most preferably 7-8, said whey protein nanogel composition comprising:

total protein in an amount of 21-35% w/w relative to the total weight of the whey protein nanogel composition, most preferably 24-32% w/w, total protein in an amount of at least 80% w/w relative to total solids, most preferably at least 90% w/w, total BLG in an amount of at least 50% w/w relative to total protein, most preferably at least 55% w/w, whey protein nanogels in an amount of at least 50% w/w relative to total protein, most preferably at least 55% w/w, and soluble whey protein aggregates in an amount of at most 9% w/w relative to total protein, and most preferably in an amount of at most 5% w/w, and one or more of:

i) the particles of the whey protein nanogel composition in hydrated form have a z-average diameter measured by dynamic light scattering of 150-900 nm, and ii) having a viscosity of at most 200 cP at 20 degrees C. and at a shear rate of 300 s$^{-1}$ when standardized to 20% w/w total protein by vacuum evaporation or addition of milli-Q water, and iii) the particles of the whey protein nanogel composition in hydrated form have a polydispersity index of at most 0.2.

In some preferred embodiments of the present invention the whey protein nanogel composition is in the form of a powder and has a pH in the range of 3-5, most preferably 3-4, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 9% w/w relative to total protein, and most preferably at most 5% w/w and one or more of the following:

i) the particles of the whey protein nanogel composition in hydrated form have a z-average diameter measured by dynamic light scattering of 150-900 nm, ii) having a viscosity of at most 150 cP at 20 degrees C. and at a shear rate of 300 s$^{-1}$ when standardized to 20% w/w total protein by vacuum evaporation or addition of milli-Q water, and most preferred at most 100 cP at 20 degrees C. and at a shear rate of 300 s$^{-1}$, and iii) the particles of the whey protein nanogel composition in hydrated form having a polydispersity index of at most 0.2.

In some preferred embodiments of the present invention the whey protein nanogel composition is in the form of a powder and has a pH in the range of 3-5, most preferably 3-4, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 70% w/w relative to total protein, most preferably at least 80% w/w, and soluble whey protein aggregates in an amount of at most 9% w/w relative to total protein, and more preferably at most 5% w/w and one or more of the following:

i) the particles of the whey protein nanogel composition in hydrated form have a z-average diameter measured by dynamic light scattering of 150-900 nm, ii) having a viscosity of at most 150 cP at 20 degrees C. and at a shear rate of 300 s$^{-1}$ when standardized to 20% w/w total protein by vacuum evaporation or addition of milli-Q water, and most preferred at most 100 cP at 20 degrees C. and at a shear rate of 300 s$^{-1}$, and iii) the particles of the whey protein nanogel composition in hydrated form have a polydispersity index of at most 0.2.

In some preferred embodiments of the present invention the whey protein nanogel composition is in the form of a powder and has a pH in the range of 3-5, most preferably 3-4, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 9% w/w relative to total protein, and more preferably at most 5% w/w and one or more of the following:

i) the particles of the whey protein nanogel composition in hydrated form have a z-average diameter measured by dynamic light scattering of 150-900 nm, ii) having a viscosity of at most 150 cP at 20 degrees C. and at a shear rate of 300 s$^{-1}$ when standardized to 20% w/w total protein by vacuum evaporation or addition of milli-Q water, and most preferred at most 100 cP at 20 degrees C. and at a shear rate of 300 s$^{-1}$, and iii) the particles of the whey protein nanogel composition in hydrated form have a polydispersity index of at most 0.2.

In some preferred embodiments of the present invention the whey protein nanogel composition is in the form of a powder and has a pH in the range of 3-5, most preferably 3-4, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 90% w/w relative to total protein, most preferably at least 95% w/w, whey protein nanogels in an amount of at least 80% w/w relative to total protein, most preferably at least 85% w/w, and soluble whey protein aggregates in an amount of at most 20% w/w relative to total protein, and most preferably at most 15% w/w and one or more of the following:

i) the particles of the whey protein nanogel composition in hydrated form have a z-average diameter measured by dynamic light scattering of 150-900 nm, ii) having a viscosity of at most 300 cP at 20 degrees C. and at a shear rate of 300 s$^{-1}$ when standardized to 20% w/w total protein by vacuum evaporation or addition of milli-Q water, and most preferred at most 200 cP at 20 degrees C. and at a shear rate of 300 s$^{-1}$, and iii) the particles of the whey protein nanogel composition in hydrated form having a polydispersity index of at most 0.2.

In some preferred embodiments of the present invention the whey protein nanogel composition is in the form of a powder and has a pH in the range of 3-5, most preferably 3-4, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 70% w/w relative to total protein, most preferably at least 80% w/w, and soluble whey protein aggregates in an amount of at most 9% w/w relative to total protein, and most preferably at most 5% w/w and one or more of the following:

i) the particles of the whey protein nanogel composition in hydrated form have a z-average diameter measured by dynamic light scattering of 150-900 nm, ii) having a viscosity of at most 300 cP at 20 degrees C. and at a shear rate of 300 s$^{-1}$ when standardized to 20% w/w total protein by vacuum evaporation or addition of milli-Q water, and most preferred at most 200 cP at 20 degrees C. and at a shear rate of 300 s$^{-1}$, and iii) the particles of the whey protein nanogel composition in hydrated form have a polydispersity index of at most 0.2.

In some preferred embodiments of the present invention the whey protein nanogel composition is in the form of a powder and has a pH in the range of 3-5, most preferably 3-4, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 9% w/w relative to total protein, and most preferably at most 5% w/w and one or more of the following:

i) the particles of the whey protein nanogel composition in hydrated form have a z-average diameter measured by dynamic light scattering of 150-900 nm, ii) having a viscosity of at most 300 cP at 20 degrees C. and at a shear rate of 300 s$^{-1}$ when standardized to 20% w/w total protein by vacuum evaporation or addition of milli-Q water, and most preferred at most 200 cP at 20 degrees C. and at a shear rate of 300 s$^{-1}$, and iii) the particles of the whey protein nanogel composition in hydrated form have a polydispersity index of at most 0.2.

In some preferred embodiments of the present invention the whey protein nanogel composition is in the form of a powder and has a pH in the range of 3-5, most preferably 3-4, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 90% w/w relative to total protein, most preferably at least 95% w/w, whey protein nanogels in an amount of 30-85% w/w relative to total protein, most preferably of 35-70% w/w, and soluble whey protein aggregates in an amount of 15-70% w/w relative to total protein, and most preferably 30-65% w/w and one or more of the following:

i) the particles of the whey protein nanogel composition in hydrated form have a z-average diameter measured by dynamic light scattering of 150-900 nm, and iii) the particles of the whey protein nanogel composition in hydrated form have a polydispersity index of at most 0.2.

In some preferred embodiments of the present invention the whey protein nanogel composition is in the form of a powder has a pH in the range of 3-5, most preferably 3-4, said whey protein nanogel composition comprising:

total solids in an amount of at least 92% w/w relative to the total weight of the composition, most preferably at least 94% w/w, total protein in an amount of at least 80% w/w relative to total solids, most preferably at least 90% w/w, a total amount of BLG of at least 50% w/w relative to total protein, most preferably at least 55% w/w, whey protein nanogels in an amount of 30-59% w/w relative to total protein, most preferably of 35-50% w/w, and soluble whey protein aggregates in an amount of 21-50% w/w relative to total protein, and most preferably 30-45% w/w and one or more of the following:

i) the particles of the whey protein nanogel composition in hydrated form have a z-average diameter measured by dynamic light scattering of 150-900 nm, and iii) the particles of the whey protein nanogel composition in hydrated form have a polydispersity index of at most 0.2.

The powders of the present invention are preferably dried by spray-drying.

In some preferred embodiments of the present invention the whey protein nanogel composition is in the form of a liquid and has a pH in the range of 3-5, most preferably 3-4, said whey protein nanogel composition comprising:

total protein in an amount of 21-35% w/w relative to the total weight of the whey protein nanogel composition, most preferably 24-32% w/w, total protein in an amount of at least 80% w/w relative to total solids, most preferably at least 90% w/w, total BLG in an amount of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 9% w/w relative to total protein, and most preferably in an amount of at most 5% w/w, and one or more of:

i) the particles of the whey protein nanogel composition in hydrated form have a z-average diameter measured by dynamic light scattering of 150-900 nm, and ii) having a viscosity of at most 200 cP at 20 degrees C. and at a shear rate of 300 s$^{-1}$ when standardized to 20% w/w total protein by vacuum evaporation or addition of milli-Q water, and iii) the particles of the whey protein nanogel composition in hydrated form have a polydispersity index of at most 0.2.

The whey protein nanogel composition is preferably prepared by heat-denaturation of whey protein at a pH in the range of 5.8-7.5 or one of the preferred sub-ranges described in the context of the whey protein solution of step a).

Yet an aspect of the invention pertains to a whey protein nanogel obtainable by the method described herein. Individual whey protein nanogels may e.g. be separated by microfiltration, differential centrifugation, and centrifugation with density gradients.

A plurality of the present whey protein nanogels in hydrated form preferably have a z-average diameter of 150-1000 nm, more preferably 170-900 nm, even more preferred 200-800 nm, and most preferred 250-700 nm.

In some preferred embodiments of the present invention a plurality of the present whey protein nanogels in hydrated form have a z-average diameter of 150-800 nm, more preferably 250-700 nm, even more preferred 300-600 nm, and most preferred 350-500 nm.

In some preferred embodiments of the present invention the present whey protein nanogels provide a viscosity of at most 200 cP at 20 degrees C. and at a shear rate of 300 s$^{-1}$ when such whey protein nanogels are present in an amount of 20.0% w/w in demineralised water, more preferably at most 100 cP at 20 degrees C. and at a shear rate of 300 s$^{-1}$, even more preferably at most 50 cP at 20 degrees C. and at a shear rate of 300 s$^{-1}$, and most preferably at most 40 cP at 20 degrees C. and at a shear rate of 300 s$^{-1}$.

In some preferred embodiments of the present invention a plurality of the present whey protein nanogels in hydrated form have a polydispersity index of at most 0.3, more preferably at most 0.2, and most preferably at most 0.1.

Yet an aspect of the present invention pertains to a food product comprising a whey protein nanogel composition as defined herein or a plurality of whey protein nanogels defined herein.

The food product preferably contains at least one or more additional ingredients in addition to the whey protein nanogel composition or the whey protein nanogels and/or has been converted to a product that is not a whey protein nanogel composition anymore.

The food product is preferably a beverage, an acidic, thickened food product, or a solid food product.

The inventors have found that the present whey protein nanogels and whey protein nanogel compositions are particularly useful for beverages and preferably packaged, heat-treated beverages having a high protein content.

Thus, a specific aspect of the invention pertains to a packaged, heat-treated beverage comprising at least whey protein nanogels.

In some preferred embodiments of the present invention the packaged, heat-treated beverage has a pH in the range of 3-8 and comprises whey protein nanogels in an amount of at least 1% w/w.

It is particularly preferred that the whey protein nanogels of the beverages are provided by the whey protein nanogel compositions defined herein or are whey protein nanogels as defined herein. It is furthermore particularly preferred that the whey protein nanogels of the beverages are obtainable by the method described herein.

In some preferred embodiments of the present invention the packaged, heat-treated beverage comprises total protein in an amount in the range of 1-32% w/w, more preferably 5-31% w/w, even more preferably 10-30% w/w, and most preferably 21-30% w/w.

In some preferred embodiments of the present invention the packaged, heat-treated beverage comprises total protein in an amount in the range of 17-32% w/w, more preferably 21-31% w/w, even more preferably 22-30% w/w, and most preferably 24-30% w/w.

In other preferred embodiments of the present invention the packaged, heat-treated beverage comprises total protein in an amount in the range of 8-32% w/w, more preferably 9-24% w/w, even more preferably 10-22% w/w, and most preferably 11-20% w/w.

In some preferred embodiments of the present invention the packaged, heat-treated beverage comprises total BLG in an amount of at least 50% w/w relative to total protein, more preferably at least 60% w/w relative to total protein, even more preferred at least 70% w/w relative to total protein, and most preferred at least 80% w/w relative to total protein.

In other preferred embodiments of the present invention the packaged, heat-treated beverage comprises total BLG in an amount of at least 85% w/w relative to total protein, more preferably at least 90% w/w relative to total protein, even more preferred at least 92% w/w relative to total protein, and most preferred at least 95% w/w relative to total protein. It is often preferred that the whey protein nanogel composition comprises total BLG in an amount at least 97% w/w relative to total protein.

In further preferred embodiments of the present invention the packaged, heat-treated beverage comprises total BLG in an amount in the range of 50-80% w/w relative to total protein, more preferably in the range of 52-75% w/w relative to total protein, even more preferred in the range of 54-70% w/w relative to total protein, and most preferred in the range of 55-65% w/w relative to total protein.

In some preferred embodiments of the present invention the packaged, heat-treated beverage comprises whey protein nanogels in an amount of at least 5% w/w, more preferably at least 8% w/w, even more preferably at least 10% w/w, and most preferably at most at least 11% w/w.

Preferably, the packaged, heat-treated beverage may comprise whey protein nanogels in an amount of 5-32% w/w, more preferably 8-24% w/w, even more preferably 10-22% w/w, and most preferably at most 11-20% w/w.

In some preferred embodiments of the present invention the packaged, heat-treated beverage comprises whey protein nanogels in an amount of least 21% w/w, more preferably at least 22% w/w, even more preferably at least 25% w/w, and most preferably at least 28% w/w.

Preferably, the packaged, heat-treated beverage comprises whey protein nanogels in an amount of 21-32% w/w, more preferably 22-31% w/w, even more preferably 23-30% w/w, and most preferably 24-30% w/w.

In some preferred embodiments of the present invention the packaged, heat-treated beverage comprises whey protein nanogels in an amount of at least 50% w/w relative to total protein, more preferably at least 70% w/w, even more preferably at least 80% w/w, and most preferably at least 90% w/w relative to total protein. Even higher contents of whey protein nanogel are often preferred and in other preferred embodiments of the present invention the packaged, heat-treated beverage comprises whey protein nanogels in an amount of at least 92% w/w relative to total protein, more preferably at least 94% w/w, even more preferably at least 96% w/w, and most preferably at least 98% w/w relative to total protein.

The degree of BLG denaturation of the beverages is preferably very high. In some preferred embodiments of the present invention the packaged, heat-treated beverage has a degree of BLG denaturation of at least 70% relative to total protein, more preferably at least 80%, even more preferably at least 85%, and most preferably at least 90%. Even higher degree of BLG denaturation are often preferred and in other preferred embodiments of the present invention the packaged, heat-treated beverage has a degree of BLG denaturation of at least 92%, more preferably at least 94%, even more preferably at least 96%, and most preferably at least 98%.

In some preferred embodiments of the present invention the packaged, heat-treated beverage comprises soluble whey protein aggregates in an amount of at most 30% w/w relative to total protein, more preferably at most 20% w/w, even more preferably at most 10% w/w, and most preferably at most 5% w/w relative to total protein.

Even lower contents of soluble whey protein aggregate are often preferred and the packaged, heat-treated beverage preferably comprises soluble whey protein aggregates in an amount of at most 3% w/w relative to total protein, more preferably at most 2% w/w, even more preferably at most 1% w/w, and most preferably at most 0.5% w/w relative to total protein.

In other preferred embodiments of the present invention the packaged, heat-treated beverage comprises soluble whey protein aggregates in an amount of at most 8% w/w relative to the total weight of the beverage, more preferably at most 5% w/w, even more preferably at most 2% w/w, and most preferably at most 0.5% w/w relative to the total weight of the beverage.

It is typically preferred that the packaged, heat-treated beverage of the present invention contains a low amount of larger whey protein particles which may cause sedimentation in beverages and even an impression of sandiness. Thus, in some preferred embodiments of the present invention the packaged, heat-treated beverage comprises whey protein microparticles in an amount of at most 10% w/w relative to total protein, more preferably at most 5% w/w, even more preferably at most 3% w/w, and most preferably at most 1% w/w relative to total protein. The content of whey protein microparticles is determined according to Analysis 3.

In some preferred embodiments of the present invention the packaged, heat-treated beverage comprises:
    a total amount of BLG of at least 90% w/w relative to total protein, most preferably at least 95% w/w,
    whey protein nanogels in an amount of at least 90% w/w relative to total protein, most preferably at least 95% w/w, and
    soluble whey protein aggregates in an amount of at most 9% w/w relative to total protein, and most preferably at most 5% w/w.

In other preferred embodiments of the present invention the packaged, heat-treated beverage comprises:
    a total amount of BLG of at least 90% w/w relative to total protein, most preferably at least 95% w/w,
    whey protein nanogels in an amount of at least 85% w/w relative to total protein, most preferably at least 89% w/w, and
    soluble whey protein aggregates in an amount of at most 15% w/w relative to total protein, and most preferably at most 11% w/w.

In some preferred embodiments of the present invention the packaged, heat-treated beverage has a total solids content in an amount of 3-50% w/w, more preferably in an amount of 4-40% w/w, even more preferred in an amount of 6-35% w/w, and most preferably in an amount of 8-30% w/w.

In other preferred embodiments of the present invention the packaged, heat-treated beverage has a total solids content in an amount of 10-50% w/w, more preferably in an amount of 12-40% w/w, even more preferred in an amount of 14-35% w/w, and most preferably in an amount of 16-30% w/w.

In some preferred embodiments of the present invention the packaged, heat-treated beverage has a water content in an amount of 50-97% w/w, more preferably in an amount of 60-96% w/w, even more preferred in an amount of 65-94% w/w, and most preferably in an amount of 70-92% w/w.

The portion of the packaged, heat-treated beverage that is not solids is preferably water.

The pH of the beverage may span from acidic to slightly alkaline.

In some preferred embodiments of the present invention the packaged, heat-treated beverage has a pH in the range of 5.5-8.0, more preferably 6.0-7.5, even more preferred 6.2-7.3, and most preferred 6.3-7.2.

In other preferred embodiments of the present invention the packaged, heat-treated beverage has a pH in the range of 6.0-7.5, more preferably 6.2-7.5, and most preferred 6.3-7.5.

In further preferred embodiments of the present invention the packaged, heat-treated beverage has a pH in the range of 6.0-8.0, more preferably 6.6-7.7, even more preferred 6.7-7.6, and most preferred 6.8-7.5.

In other preferred embodiments of the present invention the packaged, heat-treated beverage has a pH in the range of 3.0-5.4, more preferably 3.5-5.0, even more preferred 3.7-4.8, and most preferred 4.0-4.6.

In further preferred embodiments of the present invention the packaged, heat-treated beverage has a pH in the range of 3.0-5.4, more preferably 3.0-5.0, even more preferred 3.5-5.0, and most preferred 3.5-4.6.

In even further preferred embodiments of the present invention the packaged, heat-treated beverage has a pH in the range of 3.0-5.4, more preferably 3.1-5.0, even more preferred 3.2-4.6, and most preferred 3.5-4.0.

The inventors have found that the viscosity contribution of soluble whey protein aggregates becomes less pronounced below pH 4.0. Thus, in some preferred embodiments of the invention the packaged, heat-treated beverage has a pH in the range of 3.0-4.0, more preferably 3.0-3.8, and most preferably 3.0-3.6. Preferably, the packaged, heat-treated beverage may have a pH in the range of 3.0-4.0, more preferably 3.0-3.8, and most preferably 3.0-3.6; and whey protein nanogels may contribute with at 50-95% w/w of the total protein of the packaged, heat-treated beverage, more preferably 55-85% w/w, and even more preferably 60-75% w/w; and soluble whey protein aggregates may contribute with 5-50% w/w of the total protein of the packaged, heat-treated beverage, more preferably 15-45% w/w, and most preferably 25-30% w/w.

The inventors have furthermore found that a high content of whey protein nanogels relative to total protein makes it possible to produce low viscosity, high protein beverage in the pH range 4.0-5.0, most preferably 4.2-4.8. Thus, in some preferred embodiments of the invention the packaged, heat-treated beverage has a pH in the range of 4.0-5.0, and most preferably 4.2-4.8. Preferably, the packaged, heat-treated beverage may have a pH in the range of 4.0-5.0, and most preferably 4.2-4.8, and whey protein nanogels may contribute with at least 80% w/w of the total protein of the packaged, heat-treated beverage, most preferably at least 90% w/w.

The present inventors have observed that heat-treated, acidic protein beverages containing the present whey protein nanogels surprisingly have a less astringent taste than comparable beverages that contain other types of denatured whey protein. This e.g. documented in Example 8. This is e.g. advantageous for beverages which have been subjected to protein denaturing heat-treatment such as e.g. heat-treatment at a temperature above 100 degrees C.

An advantage of the present packaged, heat-treated beverage is that it has a surprisingly low viscosity compared to the amount of protein it contains.

In some preferred embodiments of the present invention the packaged, heat-treated beverage has a viscosity of at most 200 cP at 20 degrees C. and at a shear rate of 300 s$^{-1}$, more preferably at most 100 cP at 20 degrees C. and at a shear rate of 300 s$^{-1}$, even more preferred at most 50 cP at 20 degrees C. and at a shear rate of 300 s$^{-1}$, and most preferred at most 20 cP at 20 degrees C. and at a shear rate of 300 s$^{-1}$.

Even lower viscosities are possible and often desired. Thus, in other preferred embodiments of the present invention the packaged, heat-treated beverage has a viscosity of at most 15 cP at 20 degrees C. and at a shear rate of 300 s$^{-1}$, more preferably at most 10 cP at 20 degrees C. and at a shear rate of 300 s$^{-1}$, even more preferred at most 8 cP at 20 degrees C. and at a shear rate of 300 s$^{-1}$, and most preferred at most 5 cP at 20 degrees C. and at a shear rate of 300 s$^{-1}$.

It is particularly preferred that the packaged, heat-treated beverage is sterile.

In some preferred embodiments of the present invention the packaged, heat-treated beverage has a shelf-life at ambient temperature of at least 6 months, more preferably at least 1 year, and even more preferably at least 2 years.

The packaged, heat-treated beverage of the present invention may comprise other macronutrients than proteins, such as e.g. carbohydrate and/or lipid.

In some embodiments of the invention, the packaged, heat-treated beverage furthermore comprises carbohydrates. The total carbohydrate content in the heat-treated beverage of the invention depends on the intended use of the heat-treated beverage.

The carbohydrate of the packaged heat-treated beverage is preferably provided by one or more source of carbohydrate sources.

Useful carbohydrate sources may be selected from the group consisting of: sucrose, maltose, dextrose, galactose, maltodextrin, corn syrup solids, sucromalt, glucose polymers, corn syrup, modified starches, resistant starches, rice-derived carbohydrates, isomaltulose, white sugar, glucose, fructose, lactose, high fructose corn syrup, honey, sugar alcohols, fructooligosaccharides, soy fiber, corn fiber, guar gum, konjac flour, polydextrose, fibersol, and combinations thereof. In some embodiments of the invention, the packaged heat-treated beverage comprises non-digestible sugars like fructans, the fructan comprises inulin or fructooligosaccharides.

In some preferred embodiments of the invention, the packaged, heat-treated beverage comprises carbohydrate between 0 to 95% of the total energy content of the beverage, more preferably in a range between 10 to 85% of the total energy content of the beverage, even more preferably in a range between 20 to 75% of the total energy content of the beverage, and most preferably in a range between 30 to 60% of the total energy content of the beverage Even lower carbohydrate content is often preferred, thus in some preferred embodiments of the invention preferably in a range between 0 to 30% of the total energy content of the beverage more preferably in a range between 0 to 20% of the total energy content of the beverage even more preferably in a range between 0 to 10% of the total energy content of the beverage.

In some preferred embodiments of the present invention, the beverage is particularly useful as a sport beverage and comprises e.g. a total amount of carbohydrate of at most 75% of the total energy content of the beverage (E), more preferably at most 40 E %, even more preferably at most 10 E %, and most preferably at most 5 E %.

In some preferred embodiments of the present invention, the packaged heat-treated beverage is particularly useful as a nutritionally incomplete nutritional supplement and comprises e.g. a total amount of carbohydrate in a range between 70-95% of the total energy content of the beverage (E), preferably 80-90 E %.

In some preferred embodiments of the present invention, the packaged, heat-treated beverage comprises a total amount of carbohydrate in a range between 30-60% of the total energy content of the beverage, and most preferably in a range between 35-50 E %. Such beverages are particularly useful for nutritionally complete beverages.

In some embodiments of the invention, the packaged, heat-treated beverage furthermore comprises at least one additional ingredient selected from the group consisting of vitamins, flavouring agent, minerals, sweeteners, antioxidants, food acid, lipids, carbohydrate, prebiotics, probiotics and non-whey protein, and a combination therefore.

The additional ingredients can be used to adjust the nutrient contribution and the taste and flavour characteristics of the beverage.

In one embodiment of the invention, the beverage comprises at least one high intensity sweetener (HIS). The at least one HIS is preferably selected from the group consisting of aspartame, cyclamate, sucralose, acesulfame salt, neotame, saccharin, stevia extract, a steviol glycoside such as e.g. rebaudioside A, or a combination thereof.

In some embodiments of the invention, it is particularly preferred that the sweetener comprises or even consists of one or more high intensity sweeteners.

HIS is both found among both natural and artificial sweeteners and typically have a sweetening intensity of at least 10 times that of sucrose.

If used, the total amount of HIS of the beverage is typically in the range of 0.001-2% w/w. Preferably, the total amount of HIS is in the range of 0.005-1% w/w. Most preferably, the total amount of HIS is in the range of 0.01-0.5% w/w.

The choice of the sweetener may depend on the beverage to be produced, e.g. high-intensity sweeteners (e.g. aspartame, acetsulfam-K or sucralose) may be used in beverages where no energy contribution from the sweetener is desired, whereas for beverages having a natural profile natural sweeteners (e.g. steviol glycosides, sorbitol or sucrose) may be used.

It may furthermore be preferred that the sweetener comprises or even consists of one or more polyol sweetener(s). Non-limiting examples of useful polyol sweetener are maltitol, mannitol, lactitol, sorbitol, inositol, xylitol, threitol, galactitol or combinations thereof. If used, the total amount of polyol sweetener of the beverage is typically in the range of 1-20% w/w. More preferably, the total amount of polyol sweetener of the beverage is in the range of 2-15% w/w.

Even more preferably, the total amount of polyol sweetener may be in the range of 4-10% w/w.

In some preferred embodiments of the invention, the packaged, heat-treated beverage comprises:

a total amount of carbohydrate of at most 1% w/w, more preferably at most 0.5% w/w, and most preferably at most 0.1% w/w, and a total amount of HIS in the range of 0.001-2% w/w, more preferably in the range of 0.005-1% w/w, and most preferably in the range of 0.01-0.5% w/w.

In some embodiments of the invention, the packaged, heat-treated beverage furthermore comprises lipids. The total lipid content in the heat-treated beverage of the invention depends on the intended use of the heat-treated, beverage.

In some preferred embodiments of the invention, the packaged, heat-treated beverage has a lipid content between 0 to 50% of the total energy content of the beverage, or preferably in a range between 0 to 40% of the total energy content of the beverage, or preferably in a range between 0 to 30% of the total energy content of the beverage or preferably in a range between 0 to 20% of the total energy content of the beverage or preferably in a range between 0 to 10% of the total energy content of the beverage or preferably in a range between 0 to 5% of the total energy content of the beverage.

In some preferred embodiments of the present invention, the beverage is particularly useful as a sport beverage and comprises e.g. a total amount of lipid of at most 10 E %, preferably at most at most 1 E %.

In some preferred embodiments of the present invention, the packaged heat-treated beverage is particularly useful as a nutritionally incomplete nutritional supplement and comprises e.g. a total amount of lipid of at most 10% of the total energy content of the beverage, preferably at most at most 1 E %.

In some preferred embodiments of the present invention, the beverage, e.g. in the form of a sports beverage, comprises:

a total amount of protein in the range of 1-30% w/w relative to the weight of the beverage, more preferably 4-24% w/w relative to the weight of the beverage, even more preferably 8-20% w/w relative to the weight of the beverage, and most preferably 10-20% w/w relative to the weight of the beverage, a total amount of carbohydrate of at most 75% of the total energy content of the beverage (E), more preferably at most 40 E %, even more preferably at most 10 E %, and most preferably at most 5 E %, and a total amount of lipid of at most 10 E %, more preferably at most 6 E %, even more preferably at most 3 E %, and most preferably at most 1 E %.

In other preferred embodiments of the present invention, the beverage, e.g. in the form of a low carbohydrate sports beverage, comprises:

a total amount of protein in the range of 1-30% w/w relative to the weight of the beverage, more preferably 4-24% w/w relative to the weight of the beverage, even more preferably 8-20% w/w relative to the weight of the beverage, and most preferably 10-20% w/w relative to the weight of the beverage, a total amount of carbohydrate of at most 10 E %, more preferably at most 6 E %, even more preferably at most 3 E %, and most preferably at most 1 E %, a total amount of lipid of at most 5 E %, more preferably at most 4 E %, even more preferably at most 3 E %, and most preferably at most 1 E %, and a total amount of HIS in the range of 0.001-2% w/w, more preferably in the range of 0.005-1% w/w, and most preferably in the range of 0.01-0.5% w/w.

In other preferred embodiments of the present invention, the packaged heat-treated beverage, e.g. in the form of a nutritionally complete beverage, comprises:

a total amount of protein in the range of 1-30% w/w relative to the weight of the beverage, more preferably 4-24% w/w relative to the weight of the beverage, even more preferably 8-20% w/w relative to the weight of the beverage, and most preferably 10-20% w/w relative to the weight of the beverage, a total amount of carbohydrate in a range between 30-60% of the total energy content of the beverage, and most preferably in a range between 35-50 E % and a total amount of lipid in the range of 20-50% of the total energy content, more preferably in a range between 25-45 E %, and most preferably 30-40 E %.

In some preferred embodiments of the present invention the packaged, heat-treated beverage has a pH in the range of 3.0-5.4, most preferably 3.5-4.6, and comprises:

a total amount of protein in the range of 8-32% w/w relative to the weight of the beverage, and most preferably 10-22% w/w relative to the weight of the beverage, a total amount of BLG of at least 90% w/w relative to total protein, most preferably at least 95% w/w, whey protein nanogels in an amount of at least 85% w/w relative to total protein, most preferably at least 89% w/w, and soluble whey protein aggregates in an amount of at most 15% w/w relative to total protein, and most preferably at most 11% w/w.

In other preferred embodiments of the present invention the packaged, heat-treated beverage has a pH in the range of 3.0-5.4, most preferably 3.5-4.6, and comprises:

a total amount of protein in the range of 8-32% w/w relative to the weight of the beverage, and most preferably 10-22% w/w relative to the weight of the beverage, a total amount of BLG of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 10% w/w relative to total protein, and most preferably at most 5% w/w.

In some preferred embodiments of the present invention the packaged, heat-treated beverage has a pH in the range of 3.0-5.4, most preferably 3.5-4.6, and comprises:

a total amount of protein in the range of 8-32% w/w relative to the weight of the beverage, and most preferably 10-22% w/w relative to the weight of the beverage, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 15% w/w relative to total protein, and most preferably at most 11% w/w.

In other preferred embodiments of the present invention the packaged, heat-treated beverage has a pH in the range of 3.0-5.4, most preferably 3.5-4.6, and comprises:

a total amount of protein in the range of 8-32% w/w relative to the weight of the beverage, and most preferably 10-22% w/w relative to the weight of the beverage, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 10% w/w relative to total protein, and most preferably at most 5% w/w.

In some preferred embodiments of the present invention the packaged, heat-treated beverage has a pH in the range of 6.2-7.5, most preferably 6.8-7.5, and comprises:

a total amount of protein in the range of 8-32% w/w relative to the weight of the beverage, and most preferably 10-22% w/w relative to the weight of the beverage, a total amount of BLG of at least 90% w/w relative to total protein, most preferably at least 95% w/w, whey protein nanogels in an amount of at least 85% w/w relative to total protein, most preferably at least 89% w/w, and soluble whey protein aggregates in an amount of at most 15% w/w relative to total protein, and most preferably at most 11% w/w.

In other preferred embodiments of the present invention the packaged, heat-treated beverage has a pH in the range of 6.2-7.5, most preferably 6.8-7.5, and comprises:

a total amount of protein in the range of 8-32% w/w relative to the weight of the beverage, and most preferably 10-22% w/w relative to the weight of the beverage, a total amount of BLG of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 10% w/w relative to total protein, and most preferably at most 5% w/w.

In some preferred embodiments of the present invention the packaged, heat-treated beverage has a pH in the range of 6.2-7.5, most preferably 6.8-7.5, and comprises:

a total amount of protein in the range of 8-32% w/w relative to the weight of the beverage, and most preferably 10-22% w/w relative to the weight of the beverage, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 15% w/w relative to total protein, and most preferably at most 11% w/w.

In other preferred embodiments of the present invention the packaged, heat-treated beverage has a pH in the range of 6.2-7.5, most preferably 6.8-7.5, and comprises:

a total amount of protein in the range of 8-32% w/w relative to the weight of the beverage, and most preferably 10-22% w/w relative to the weight of the beverage, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 10% w/w relative to total protein, and most preferably at most 5% w/w.

In some preferred embodiments of the present invention, the beverage, e.g. in the form of a sports beverage, comprises:

a total amount of carbohydrate of at most 75% of the total energy content of the beverage (E), more preferably at most 40 E %, even more preferably at most 10 E %, and most preferably at most 5 E %, and a total amount of lipid of at most 10 E %, more preferably at most 6 E %, even more preferably at most 3 E %, and most preferably at most 1 E %.

In other preferred embodiments of the present invention, the packaged heat-treated beverage, e.g. in the form of a nutritionally complete beverage, comprises:

a total amount of carbohydrate in a range between 30-60% of the total energy content of the beverage, and most preferably in a range between 35-50 E % and a total amount of lipid in the range of 20-50% of the total energy content, more preferably in a range between 25-45 E %, and most preferably 30-40 E %.

An aspect of the invention pertains to a process of producing a packaged, heat-treated beverage having a pH in the range of 3-8, comprising the following steps:

1) providing a liquid solution having a pH in the range of 3-8 and comprising:

a total amount of protein of 1 to 32% by weight, wherein at least 50 w/w % of the protein is beta-lactoglobulin (BLG)

optionally, sweetener and/or flavour 2) packaging the liquid solution, wherein the liquid solution of step a) and/or the packaged liquid solution of step b) is subjected to a heat-treatment comprising at least pasteurisation.

The heat-treated beverage is therefore the heat-treated liquid solution.

In some particularly preferred embodiment of the invention the liquid solution is a whey protein solution according to step a) of the above-mentioned method of producing a whey protein nanogel composition and the heat-treatment of the process of producing the packaged, heat-treated beverage is step b) of the above-mentioned method. The heat-treatment is preferably a sterilisation and therefore makes it possible to package the sterile, liquid whey protein nanogel composition as the heat-treated liquid solution in step 2) of the process of producing the packaged, heat-treated beverage.

In other particularly preferred embodiment of the invention the liquid solution is:

the suspension of nanogels obtained from step b) of the above-mentioned method of producing a whey protein nanogel composition, and/or the concentrated suspension of nanogels obtained from step c), and the heat-treatment of the process of producing the packaged, heat-treated beverage sterilizes the liquid solution or the packaged liquid solution.

In some preferred embodiments the liquid solution has a pH in the range of 3-8 and comprises whey protein nanogels in an amount of at least 1% w/w.

It is particularly preferred that the whey protein nanogels of the liquid solution are provided by a whey protein nanogel compositions, preferably in powder form, as defined herein and/or are whey protein nanogels as defined herein. It is furthermore particularly preferred that the whey protein nanogels of the liquid solution are obtainable by the method described herein. The provision of the liquid solution typically involves reconstituting a whey protein nanogel composition in powder form in water, and if required, homogenizing the reconstituted whey protein nanogel composition until sufficient dispersion has been obtained. Preferably the particle size of the whey protein nanogels of the liquid solution is substantially the same as their particle size prior to drying step d).

In some preferred embodiments of the present invention the liquid solution comprises total protein in an amount in the range of 1-32% w/w, more preferably 5-31% w/w, even more preferably 10-30% w/w, and most preferably 21-30% w/w.

In some preferred embodiments of the present invention the liquid solution comprises total protein in an amount in the range of 17-32% w/w, more preferably 21-31% w/w, even more preferably 22-30% w/w, and most preferably 24-30% w/w.

In other preferred embodiments of the present invention the liquid solution comprises total protein in an amount in the range of 8-32% w/w, more preferably 9-24% w/w, even more preferably 10-22% w/w, and most preferably 11-20% w/w.

In some preferred embodiments of the present invention the liquid solution comprises total BLG in an amount of at least 50% w/w relative to total protein, more preferably at least 60% w/w relative to total protein, even more preferred at least 70% w/w relative to total protein, and most preferred at least 80% w/w relative to total protein.

In other preferred embodiments of the present invention the liquid solution comprises total BLG in an amount of at least 85% w/w relative to total protein, more preferably at least 90% w/w relative to total protein, even more preferred at least 92% w/w relative to total protein, and most preferred at least 95% w/w relative to total protein. It is often preferred that the whey protein nanogel composition comprises total BLG in an amount at least 97% w/w relative to total protein.

In further preferred embodiments of the present invention the liquid solution comprises total BLG in an amount in the range of 50-80% w/w relative to total protein, more preferably in the range of 52-75% w/w relative to total protein, even more preferred in the range of 54-70% w/w relative to total protein, and most preferred in the range of 55-65% w/w relative to total protein.

In some preferred embodiments of the present invention the liquid solution comprises whey protein nanogels in an amount of at least 5% w/w, more preferably at least 8% w/w, even more preferably at least 10% w/w, and most preferably at most at least 11% w/w.

Preferably, the liquid solution may comprise whey protein nanogels in an amount of 5-32% w/w, more preferably 8-24% w/w, even more preferably 10-22% w/w, and most preferably at most 11-20% w/w.

In some preferred embodiments of the present invention the liquid solution comprises whey protein nanogels in an amount of at least 21% w/w, more preferably at least 22% w/w, even more preferably at least 25% w/w, and most preferably at least 28% w/w.

Preferably, the liquid solution comprises whey protein nanogels in an amount of 21-32% w/w, more preferably 22-31% w/w, even more preferably 23-30% w/w, and most preferably 24-30% w/w.

In some preferred embodiments of the present invention the liquid solution comprises whey protein nanogels in an amount of at least 50% w/w relative to total protein, more preferably at least 70% w/w, even more preferably at least 80% w/w, and most preferably at least 90% w/w relative to total protein. Even higher contents of whey protein nanogel are often preferred and in other preferred embodiments of the present invention the liquid solution comprises whey protein nanogels in an amount of at least 92% w/w relative to total protein, more preferably at least 94% w/w, even more preferably at least 96% w/w, and most preferably at least 98% w/w relative to total protein.

The degree of BLG denaturation of the liquid solution is often very high, particularly if the protein of the liquid solution mainly is in the form of whey protein nanogels and optionally soluble whey protein aggregates. In some preferred embodiments of the present invention the liquid solution has a degree of BLG denaturation of at least 70% relative to total protein, more preferably at least 80%, even more preferably at least 85%, and most preferably at least 90%. Even a higher degree of BLG denaturation is often preferred and in other preferred embodiments of the present invention the liquid solution has a degree of BLG denaturation of at least 92%, more preferably at least 94%, even more preferably at least 96%, and most preferably at least 98%.

In some preferred embodiments of the present invention the liquid solution comprises soluble whey protein aggregates in an amount of at most 30% w/w relative to total protein, more preferably at most 20% w/w, even more preferably at most 10% w/w, and most preferably at most 5% w/w relative to total protein.

Even lower contents of soluble whey protein aggregate are often preferred and the liquid solution preferably comprises soluble whey protein aggregates in an amount of at most 3% w/w relative to total protein, more preferably at most 2% w/w, even more preferably at most 1% w/w, and most preferably at most 0.5% w/w relative to total protein.

In other preferred embodiments of the present invention the liquid solution comprises soluble whey protein aggregates in an amount of at most 8% w/w relative to the total weight of the liquid solution, more preferably at most 5% w/w, even more preferably at most 2% w/w, and most preferably at most 0.5% w/w relative to the total weight of the liquid solution.

In some preferred embodiments of the present invention the liquid solution comprises:
    a total amount of BLG of at least 90% w/w relative to total protein, most preferably at least 95% w/w,
    whey protein nanogels in an amount of at least 90% w/w relative to total protein, most preferably at least 95% w/w, and
    soluble whey protein aggregates in an amount of at most 9% w/w relative to total protein, and most preferably at most 5% w/w.

It is typically preferred that the liquid solution contains a low amount of larger whey protein particles which may cause sedimentation in beverages and even an impression of sandiness. Thus, in some preferred embodiments of the present invention the liquid solution comprises whey protein microparticles in an amount of at most 10% w/w relative to total protein, more preferably at most 5% w/w, even more preferably at most 3% w/w, and most preferably at most 1% w/w relative to total protein.

The pH of the liquid solution may span from acidic to slightly alkaline.

Near-pH-neutral liquid solutions are particularly preferred for production of near-pH neutral beverages. In some preferred embodiments of the present invention the liquid solution has a pH in the range of 5.5-8.0, more preferably 6.0-7.5, even more preferred 6.2-7.3, and most preferred 6.3-7.2.

In other preferred embodiments of the present invention the packaged, heat-treated beverage has a pH in the range of 6.0-7.5, more preferably 6.2-7.5, and most preferred 6.3-7.5.

In further preferred embodiments of the present invention the liquid solution has a pH in the range of 6.0-8.0, more preferably 6.6-7.7, even more preferred 6.7-7.6, and most preferred 6.8-7.5.

Acidic liquid solutions are particularly preferred for production of acidic beverages. In some preferred embodiments of the present invention the liquid solution has a pH in the range of 3.0-5.4, more preferably 3.5-5.0, even more preferred 3.7-4.8, and most preferred 4.0-4.6.

In further preferred embodiments of the present invention the liquid solution has a pH in the range of 3.0-5.4, more preferably 3.0-5.0, even more preferred 3.5-5.0, and most preferred 3.5-4.6.

In even further preferred embodiments of the present invention the liquid solution has a pH in the range of 3.0-5.4, more preferably 3.1-5.0, even more preferred 3.2-4.6, and most preferred 3.3-3.8.

The inventors have found that the viscosity contribution of soluble whey protein aggregates become less pronounced below pH 4.0. Thus, in some preferred embodiments of the invention the liquid solution has a pH in the range of 3.0-4.0, more preferably 3.0-3.8, and most preferably 3.0-3.6. Preferably, the liquid solution may have a pH in the range of 3.0-4.0, more preferably 3.0-3.8, and most preferably 3.0-3.6; and whey protein nanogels may contribute with at 50-95% w/w of the total protein of the liquid solution, more preferably 55-85% w/w, and even more preferably 60-75% w/w; and soluble whey protein aggregates may contribute with 5-50% w/w of the total protein of the liquid solution, more preferably 15-45% w/w, and most preferably 25-30% w/w.

The inventors have furthermore found that a high content of whey protein nanogels relative to total protein makes it possible to produce low viscosity, high protein beverage in the pH range 4.0-5.0, most preferably 4.2-4.8. Thus, in some preferred embodiments of the invention the liquid solution has a pH in the range of 4.0-5.0, and most preferably 4.2-4.8. Preferably, the liquid solution may have a pH in the range of 4.0-5.0, and most preferably 4.2-4.8, and whey protein nanogels may contribute with at least 80% w/w of the total protein of the liquid solution, most preferably at least 90% w/w.

Generally any suitable food acid or food base may be used to adjust the pH of the liquid solution. Those skilled in the art will recognize suitable means for adjusting the pH. Suitable food bases include sodium or potassium carbonate, sodium or potassium hydrogen carbonate, or ammonium hydroxide. Alternatively KOH or NaOH maybe e.g. be employed to adjust the pH. Suitable food acids include e.g. citric acid, hydrochloric acid, malic acid or tartaric acid or phosphoric acid.

In some preferred embodiments of the present invention the liquid solution has a viscosity of at most 200 cP at 20 degrees C. and at a shear rate of 300 s$^{-1}$, more preferably at most 100 cP at 20 degrees C. and at a shear rate of 300 s$^{-1}$, even more preferred at most 50 cP at 20 degrees C. and at a shear rate of 300 s$^{-1}$, and most preferred at most 20 cP at 20 degrees C. and at a shear rate of 300 s$^{-1}$.

Even lower viscosities are possible and often desired. Thus, in other preferred embodiments of the present invention the liquid solution has a viscosity of at most 15 cP at 20 degrees C. and at a shear rate of 300 s$^{-1}$, more preferably at most 10 cP at 20 degrees C. and at a shear rate of 300 s$^{-1}$, even more preferred at most 8 cP at 20 degrees C. and at a shear rate of 300 s$^{-1}$, and most preferred at most 5 cP at 20 degrees C. and at a shear rate of 300 s$^{-1}$.

It is particularly preferred that the liquid solution is sterile.

The liquid solution of the present invention may comprise other macronutrients and ingredients than proteins. The embodiments and preferences described in the context of the packaged, heat-treated beverage and pertaining to macronutrients and additional ingredients equally apply to the liquid solution and we refer to those embodiments instead of repeating them here.

In some particularly preferred embodiments of the invention the liquid solution has the same chemical composition of as that of the packaged, heat-treated beverage.

In other particularly preferred embodiments of the invention the liquid solution has the same chemical composition of as that of the packaged, heat-treated beverage except less protein denaturation.

It is particularly preferred that the provision of the liquid solution comprises combining a whey protein nanogel composition in the form of a powder as defined herein with water and optionally one or more additional ingredients.

It is preferred that the whey protein nanogel composition in powder form contributes with at least 50% w/w of the whey protein nanogels of the liquid solution, more preferably at least 80% w/w, even more preferably at least 90% w/w and most preferably all whey protein nanogels of the liquid solution.

It is furthermore preferred that the whey protein nanogel composition in powder form contributes with at least 50% w/w of the protein of the liquid solution, more preferably at least 80% w/w, even more preferably at least 90% w/w and most preferably all protein of the liquid solution.

In some preferred embodiments of the present invention the liquid solution has a pH in the range of 3.0-5.4, most preferably 3.5-4.6, and comprises:

a total amount of protein in the range of 8-32% w/w relative to the weight of the liquid solution, and most preferably 10-22% w/w relative to the weight of the liquid solution, a total amount of BLG of at least 90% w/w relative to total protein, most preferably at least 95% w/w, whey protein nanogels in an amount of at least 85% w/w relative to total protein, most preferably at least 89% w/w, and soluble whey protein aggregates in an amount of at most 15% w/w relative to total protein, and most preferably at most 11% w/w.

In other preferred embodiments of the present invention the liquid solution has a pH in the range of 3.0-5.4, most preferably 3.5-4.6, and comprises:

a total amount of protein in the range of 8-32% w/w relative to the weight of the liquid solution, and most preferably 10-22% w/w relative to the weight of the liquid solution, a total amount of BLG of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 10% w/w relative to total protein, and most preferably at most 5% w/w.

In some preferred embodiments of the present invention the liquid solution has a pH in the range of 3.0-5.4, most preferably 3.5-4.6, and comprises:

a total amount of protein in the range of 8-32% w/w relative to the weight of the liquid solution, and most preferably 10-22% w/w relative to the weight of the liquid solution, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 15% w/w relative to total protein, and most preferably at most 11% w/w.

In other preferred embodiments of the present invention the liquid solution has a pH in the range of 3.0-5.4, most preferably 3.5-4.6, and comprises:

a total amount of protein in the range of 8-32% w/w relative to the weight of the liquid solution, and most preferably 10-22% w/w relative to the weight of the liquid solution, a total amount of BLG of at least 50% w/w relative to total protein, most preferably at least 55% w/w, whey protein nanogels in an amount of at least 50% w/w relative to total protein, most preferably at least 60% w/w, and soluble whey protein aggregates in an amount of at most 10% w/w relative to total protein, and most preferably at most 5% w/w.

In some preferred embodiments of the present invention the liquid solution has a pH in the range of 6.2-7.5, most preferably 6.8-7.5, and comprises:

a total amount of protein in the range of 8-32% w/w relative to the weight of the liquid solution, and most preferably 10-22% w/w relative to the weight of the liquid solution, a total amount of BLG of at least 90% w/w relative to total protein, most preferably at least 95% w/w, whey protein nanogels in an amount of at least 85% w/w relative to total protein, most preferably at least 89% w/w, and soluble whey protein aggregates in an amount of at most 15% w/w relative to total protein, and most preferably at most 11% w/w.

In other preferred embodiments of the present invention the liquid solution has a pH in the range of 6.2-7.5, most preferably 6.8-7.5, and comprises:

a total amount of protein in the range of 8-32% w/w relative to the weight of the liquid solution, and most preferably 10-22% w/w relative to the weight of the liquid solution, a total amount of BLG of at least 90% w/w relative to total protein, most preferably at least 95% w/w, whey protein nanogels in an amount of at least 90% w/w relative to total protein, most preferably at least 95% w/w, and soluble whey protein aggregates in an amount of at most 10% w/w relative to total protein, and most preferably at most 5% w/w.

In some preferred embodiments of the present invention, the liquid solution, e.g. for preparation of a sports beverage, comprises:

a total amount of carbohydrate of at most 75% of the total energy content of the liquid solution (E), more preferably at most 40 E %, even more preferably at most 10 E %, and most preferably at most 5 E %, and a total amount of lipid of at most 10 E %, more preferably at most 6 E %, even more preferably at most 3 E %, and most preferably at most 1 E %.

In other preferred embodiments of the present invention, the liquid solution, e.g. for preparation of a nutritionally complete beverage, comprises:

a total amount of carbohydrate in a range between 30-60% of the total energy content of the liquid solution, and most preferably in a range between 35-50 E % and a total amount of lipid in the range of 20-50% of the total energy content, more preferably in a range between 25-45 E %, and most preferably 30-40 E %.

The packaging of step 2) may be any suitable packaging techniques, and any suitable container may be used for packaging the liquid solution.

However, in a preferred embodiment of the invention, the packaging of step 2) is aseptic packaging, i.e. the liquid solution is packaged under aseptic conditions. For example, the aseptic packaging may be performed by using an aseptic filling system, and it preferably involves filling the liquid solution into one or more aseptic container(s).

Aseptic filling and sealing is particularly preferred if the liquid solution already is sterile or very low in microorganisms prior to filling.

Examples of useful containers are e.g. bottles, cartons, bricks, and/or bags.

In some preferred embodiments of the inventive process, the liquid solution of step 1) is subjected to a heat treatment comprising at least pasteurisation and then packaged in step 2).

In another embodiment of the inventive process, the packaged liquid solution of step 2) is subjected to a heat treatment comprising at least pasteurisation.

In some preferred embodiments, the heat-treatment involves heating the liquid solution to a temperature in the range of 70-80 degrees C.

In some preferred embodiments of the invention, the temperature of the heat-treatment is in the range of 70-80 degrees C., preferably in the range of 70-79 degrees C., more preferably in the range of 71-78 degrees C., even more preferably in the range of 72-77 degrees C., and most preferably in the range of 73-76 degrees C., such as approx. 75 degrees C.

Preferably, the duration of the heat-treatment, when performed in the temperature range 70-80, for 1 second to 60 minutes. The highest exposure times are best suited for the lowest temperatures of the temperature range and vice versa.

In other preferred embodiments the temperature of the heat-treatment is at 70 degrees C. for at least 60 minutes or preferably at 75 degrees C. for at least 45 minutes or preferably at 80 degrees C. for at least 30 minutes or preferably at 85 degrees C. for at least 22 minutes or preferably at 90 degrees C. for at least 10 minutes.

In particularly preferred embodiments of the invention, the heat-treatment provides 70-78 degrees C. for 1 second to 30 minutes, more preferably 71-77 degrees C. for 1 minute to 25 minutes, and even more preferred 72-76 degrees C. for 2 minute to 20 minutes.

In some preferred embodiments of the invention, the process of the heat-treatment involves heating to a temperature of 85° C.-95 degrees C. for 1 to 30 minutes.

Higher temperatures may also be preferred in some embodiments, especially if unfolding and optionally also aggregation for BLG is required. For example, the temperature of the heat-treatment may be at least 81 degrees C., preferably at least 91 degrees C., preferably at least 95 degrees C., more preferred at least 100 degrees C., even more preferred at least 120 degrees C., and most preferred at least 140 degrees C.

In other preferred embodiments of the invention the temperature of the heat-treatment is preferably at least 95 degrees C., more preferred at least 100 degrees C., even more preferred at least 120 degrees C., and most preferred at least 140 degrees C. For example, the temperature of the heat-treatment is preferably in the range of 95-160 degrees C., more preferred in the range of 100-155 degrees C., even more preferred in the range of 120-153 degrees C., and most preferred in the range of 140-152 degrees C.

In some preferred embodiments of the invention, the heat-treatment is a heat-sterilisation and preferably involves a temperature in the range of 120 to 155 degrees C. for a duration sufficient to obtain sterility, typically 0.3 seconds to 10 minutes, and more preferably 4-30 seconds at 140 to 155 degrees C.

The heat-treatment may for example involve a temperature in the range of 90-130 degrees C. and a duration in the range of 5 seconds-10 minutes. The heat-treatment may e.g. involve heating to a temperature in the range of 90-95 degrees C. for a duration of 1-10 minutes, e.g. approx. 120 degrees C. for 20 approx. seconds. Alternatively, the heat-treatment may involve heating to a temperature in the range of 115-125 degrees C. for a duration of 5-30 seconds, e.g. approx. 120 degrees C. for 20 approx. seconds.

Alternatively, but particularly preferred the heat-treatment is sterilizing UHT-type treatment which typically involves a temperature in the range of 135-146 degrees C. and a duration in the range of 2-10 seconds.

Alternatively, but also preferred, the heat-treatment may involve a temperature in the range of 145-180 degrees C. and a duration in the range of 0.01-2 seconds, and more preferably a temperature in the range of 150-180 degrees C. and a duration in the range of 0.01-0.3 seconds.

The implementation of the heat-treatment may involve the use of equipment such as a plate or tubular heat exchanger, scraped surface heat exchanger or a retort system. Alternatively, and particularly preferred for heat-treatments above 95 degrees C., direct steam-based heating may be employed, e.g. using direct steam injection, direct steam infusion, or spray-cooking. Additionally, such direct steam-based heating is preferably used in combination with flash cooling. Suitable examples of implementation of spray-cooking are found in WO2009113858A1, which is incorporated herein for all purposes. Suitable examples of implementation of direct steam injection and direct steam infusion are found in WO2009113858A1 and WO 2010/085957 A3, which are incorporated herein for all purposes. General aspects of high temperature treatment are e.g. found in "Thermal technologies in food processing" ISBN 185573558 X, which is incorporated herein by reference for all purposes.

In some preferred embodiments of the invention the heat-treatment involves, or even consists of, retort heat-treatment, preferably at a temperature of at least 80 degrees C., and more preferably at a temperature of at least 95 degrees C., even more preferably at least 100 degrees C., and most preferably at least 120 degrees C. As shown in Example 10 the present inventors have demonstrated that beverages according to the invention can endure retort-type heat-treatment at 150 degrees C. for 10 minutes.

In other preferred embodiments of the invention the heat-treatment involves, or even consists of, steam infusion or spray cooking, preferably at a temperature of at least 100 degrees C., and more preferably at a temperature of at least 120 degrees C., even more preferably at least 130 degrees C., and most preferably at least 140 degrees C.

In some preferred embodiments of the invention, the pasteurisation is combined with a physical microbial reduction.

Useful examples of physical microbial reduction involve one or more of germ filtration, UV radiation, high pressure treatment, pulsed electric field treatment, and ultrasound.

In some preferred embodiments of the invention, the heat-treatment is a sterilizing heat-treatment and hence results in a sterile liquid solution and therefore a sterile beverage. Such a sterilisation may e.g. be obtained by combining germ filtration and pasteurisation or by performing heat-treatment at at least 100 degrees C. and for a duration sufficient to obtain sterilisation.

In some particularly preferred embodiments of the invention, the heat-treatment involves heating the liquid solution to a temperature in the range of 100-160 degrees C. for a duration sufficient to sterilize the liquid solution. This preferably involves heating the liquid solution to a temperature in the range of 120 to 155 degrees C. for a duration sufficient to obtain sterility, typically 0.3 seconds to 10 minutes, and more preferably 140 to 155 degrees C. for 0.3-30 seconds.

It is beneficial that the liquid solution is subjected to cooling after the heat-treatment. According to a preferred embodiment of the inventive process, following the heat-treatment, the heat-treated liquid solution is in an optional step cooled to preferably 0 to 50° C., preferably 0 to 25° C. or preferably 0 to 20° or preferably 0 to 15° C., preferably 0 to 10° C. or preferably 4 to 8° C. or preferably 2 to 5° C. or preferably 1 to 5° C.

If the liquid solution has been at least pasteurized, it is preferably cooled to 0 to 15° C., more preferably to 1 to 5° C. after the heat-treatment.

The cooling may take place prior to a filling step or after a filling step.

In some preferred embodiments of the invention the packaged, heat-treated beverage is obtainable by the above-mentioned process.

The food product may alternatively be an acidic, thickened food product. The present inventors have observed that whey protein nanogel compositions which contain soluble whey protein aggregates in considerable amounts in addition to whey protein nanogels are both heat-stable and capable of building viscosity upon acidification. Such whey protein nanogel compositions are useful for applications where a liquid food base is pasteurised or sterilised at near-neutral pH and subsequently acidified chemically or by means of bacteria.

In the context of the present invention a "thickened food product" has a viscosity of more than 200 cP at 20 degrees C. and a shear rate of 300 s$^{-1}$. A thickened food product may be viscous but still pourable liquid or it may be a coherent gel.

In the context of the present invention an "acidic food product" has a pH of at most 5.6 at 25 degrees C.

Thus, a specific aspect of the invention pertains to a process of producing an acidic, thickened food product comprising the steps of:

preparing a liquid food base having a pH of at least 5.7 which liquid food base comprises sufficient whey protein nanogel composition to provide protein in an amount of 4-20% w/w, the whey protein nanogel composition, preferably as defined herein, comprising:

soluble whey protein aggregates in an amount of at 15-70% w/w relative to total protein, and more preferably 20-50% w/w, whey protein nanogels in an amount of 30-85% relative to total protein, and more preferably 50-80% w/w, heat-treating the liquid food base at at least 70 degrees C. for a duration sufficient to at least pasteurise the liquid food base, optionally, homogenizing the heat-treated liquid food base, acidifying the heat-treated, liquid food base to a pH of at most 5.4, optionally homogenizing the acidified food base wherein the acidic, thickened food product is the acidified food base or a mixture of the acidified liquid food base and further ingredients such as e.g. sweeteners and/or flavours.

Another specific aspect of the invention pertains to an acidic, thickened food product obtainable by the process described above, preferably in the form of a pourable, viscous liquid or a non-pourable gel.

Yet an aspect of the invention pertains to the use of a whey protein nanogel composition as defined herein and/or a plurality of whey protein nanogels as defined herein for one or more of the following:

as a food ingredient, as a food ingredient for producing a sterile beverage containing at least 10% w/w protein and even more preferred at least 21% w/w protein, as a food ingredient for producing a thickened food product having a pH of less than 5.5 and a viscosity of at more than 200 cP measured at 20 degrees C. and a shear rate of 300 s$^{-1}$, and as a whitening agent, e.g. in coffee whiteners.

A further aspect of the invention pertains to the use of whey protein nanogels and/or a whey protein nanogel composition as protein source for reducing the astringency and/or sourness of a heat-treated protein beverage having a pH of 3.0-5.0, most preferably 3.5-4.6, preferably wherein whey protein nanogels contribute with at least 50% w/w of the total protein of the heat-treated beverage, more preferably at least 70% w/w, even more preferably at least 80% w/w, and most preferably at least 90% w/w of the total protein of the heat-treated beverage; and preferably wherein the heat-treated beverage contains total protein in an amount of 2-35% w/w, more preferably 4-30% w/w, even more preferably 6-25% w/w and most preferably 8-20% w/w.

Preferably, the invention the whey protein nanogels contain a total amount of BLG of a least 60% w/w, more preferably at least 70% w/w, even more preferably at least 80% w/w, and most preferably at least 90% w/w.

The whey protein nanogels and/or a whey protein nanogel composition of the above-mentioned uses are preferably whey protein nanogels and/or a whey protein nanogel composition as defined herein and preferably obtainable by the method of the present invention.

The present invention has been described above with reference to specific embodiments. However, other embodiments than the above described are equally possible within the scope of the invention. The different features and steps of various embodiments and aspects of the invention may be combined in other ways than those described herein unless it is stated otherwise.

EXAMPLES

Methods of Analysis

Analysis 1: Determination of Aggregate Morphology by Transmission Electron Microscopy Samples are fixed in the 2% glutaraldehyde phosphate buffer (pH 7.2), with volume ration of 1:1, for 40 min at room temperature. Thereafter, the fixed samples were diluted in water to the protein concentration around 0.2%. 4 μl of diluted sample was placed on the discharged formvar/carbon film grid (with 300 mesh), for 1 min followed by blotting with filter paper. Staining was done by adding 4 μl phosphotungstic acid (1%, pH7.0), for 1 min, then blotting. The grid was washed once with MilliQ water and dried before inserted into a Philips CM-100 electron microscope operated at 100 kV. Images are taken at least five different places on the grids.

Analysis 2: Determination of Aggregate Size by Dynamic Light Scattering

The hydrodynamic diameter of whey protein nanogels was measured using a Malvern Nanosizer S instrument. Whey protein nanogel preparations diluted to a protein concentration of 0.05% or less in milliQ water was placed in 2.5 mL 12.5×12.5×45 mm disposable cuvettes with the arrow marker pointing in the direction of the instrument laser. The samples were measured at 20 degrees C. after an equilibration time of 30 seconds with automatic adjustment of attenuation factor and measurement duration as determined by the software.

The averaged Z-average hydrodynamic diameter in nanometers from five measurements as provided by the software are presented.

Analysis 3: Quantification of the Amount of Whey Protein Nanogels, Soluble Whey Protein Aggregates, Microparticles and Residual Protein.

The amount of whey protein nanogels, whey protein microparticles, soluble whey protein aggregates and residual protein was determined by fractionation of the samples to be analysed (diluted to 4% protein in milliQ water (18.2 MΩ) and adjusted to pH 7.0) as described below. The protein content of each fraction was determined as described in analysis 7.

The amount of microparticles was determined by filtering a 5.0 mL subsample of the 4% protein solution through a 2.0 μm syringe filter and measuring the different between to total amount of protein of the initial subsample (P) and the total amount of protein of the filtrate ($P_{filtrate}$). The amount of whey protein microparticles relative to total protein was calculated as:

$$Microparticles\ (\%) = \frac{P_{total} - P_{filtrate}}{P_{total}} * 100\%$$

Denatured whey protein is known to have a lower solubility at pH 4.6 than at pH values below or above pH 4.6, therefore the amount of non-denatured (native) whey protein is determined by measuring the amount of protein that does not sediment under centrifugation at pH 4.6 relative to the total amount of protein at the same pH.

Therefore, a solution of the sample containing 4.0% (w/w) total protein and having a pH of 4.6 was prepared by pH adjustment using 5% (w/w) HCl (aq). The solution was stored for 2 h at room temperature and subsequently centrifuged at 50.000 g for 1 hour. The total amount of protein of the supernatant ($P_{pH4.6,\ supernatant\ after\ 50.000\ g}$) and the amount of protein before centrifugation ($P_{pH\ 4.6,\ before\ centrifugation}$) were determined. The amount of non-denatured protein relative to total protein was calculated as:

$$non-denatured\ protein\ (\%) = \frac{P_{pH\ 4.6,\ supernatant\ after\ 50.000\ g}}{P_{pH\ 4.6,\ before\ centrifugation}} * 100\%$$

The fraction of soluble whey protein aggregates was determined by measuring the amount of protein that stays in the supernatant after centrifugation of the pH 7.0 solution of the sample (measuring both soluble whey protein aggregates and non-denatured whey protein) and subtracting the amount of protein that stays in the supernatant after centrifugation of the pH 4.6 solution (measuring only non-denatured whey protein).

Therefore, a subsample of the 4.0% protein solution (pH 7.0) was stored for 2 h at room temperature and subsequently centrifuged at 50.000 g for 1 hour. The total amount of protein of the supernatant ($P_{pH7.0,supernatant\ after\ 50.000\ g}$) and of the subsample before centrifugation ($P_{pH\ 7.0,before\ centrifugation}$) were determined.

The amount of soluble whey protein aggregates relative to total protein was determined as:

Soluble whey protein aggregates (%) =

$$\left( \frac{P_{pH\ 7.0,\ supernatant\ after\ 50.000\ g}}{P_{pH\ 7.0,\ before\ centrifugation}} - \frac{P_{pH\ 4.6,\ supernatant\ after\ 50.000\ g}}{P_{pH\ 4.6,\ before\ centrifugation}} \right) * 100\%$$

The amount of whey protein nanogels relative to total protein was determined by subtracting the relative amounts of microparticles, non-denatured protein and soluble whey protein aggregates from the total amount of protein content (100%):

Nanogels (%)=100%−microparticles (%)−soluble whey protein aggregates (%)−non-denatured protein (%)

The degree of protein denaturation was determined as 100%−residual protein (%).

Analysis 4: Viscosity of a Liquid Sample

The viscosity was measured using a handheld capillary viscometer (Viscoman, Gilson) at 20 degrees C. and reported at a shear rate of 300 s$^{-1}$.

Analysis 5: Quantification of Gel Formation During Acidification

A rheometer (Anton Paar Physica MCR301) was used to evaluate the gel formation and development of viscosity of sample containing whey protein nanogels during acidification. The whey protein nanogel samples were diluted to a total protein content of 4 w/w % using demineralised water and equilibrated at 42 degrees C. for 10 minutes. GDL (D-Gluconic acid delta-lactone) was added from powder form to the stirred solution to a final concentration of 1 w/w % and allowed to dissolve under stirring for 1 minute.

20 mL of the solution was added to the cup (CC27-SS) in the rheometer pre-equilibrated to 42 degrees C. and storage and loss modulus were measured for 60 minutes at 0.1 Hz and 0.5% strain. The pH was logged throughout the experiment using a WTW Multi 3410 pH logger calibrated using standard solutions at 42 degrees C.

Analysis 6: Determination of Native BLG, Native ALA and CMP and Determination of the Degree of BLG Denaturation Protein samples (non-heated and heated) were diluted to 2% in MQ water. 5 mL protein solution, 10 mL Milli-Q, 4 mL 10% acetic acid and 6 mL 1.0M NaOAc are mixed and stirred for 20 minutes to allow precipitation agglomeration of denatured protein around pH 4.6. The solution is filtered through 0.22 μm filter to remove agglomerates and non-native proteins.

All samples were subjected to the same degree of dilution by adding polished water.

For each sample, the same volume was loaded on an UPLC system with a UPLC column (Protein BEH C4; 300 Å; 1.7×μm; 150×2.1 mm) and detected at 214 nm.

The samples were run using the following conditions:
Buffer A: Milli-Q water, 0.1% w/w TFA
Buffer B: HPLC grade acetonitrile, 0.1% w/w TFA Flow: 0.4 ml/min Gradient: 0-6.00 minutes 24-45% B; 6.00-6.50 minutes 45-90% B; 6.50-7.00 minutes 90% B; 7.00-7.50 minutes 90-24% B and 7.50-10.00 minutes 24% B.

The area of BLG peaks against a protein standard (Sigma L0130) was used to determine the concentration of native BLG in samples (5 level calibration curve)

Samples were diluted further and reinjected if outside linear range.

The degree of BLG denaturation (D) provided by the heat-treatment was calculated as:

$$D=((BLG_{native, \ non-heated}-BLG_{native, \ heated})/ \\ BLG_{native, \ non-heated})*100\%.$$

Analysis 6 is also used to determine the content of native BLG, native ALA and CMP of a sample.

Analysis 7: Determination of Total Protein

The total protein content (true protein) of a sample is determined by:

1) Determining the total nitrogen of the sample following ISO 8968-1/2|IDF 020-1/2—Milk—Determination of nitrogen content—Part 1/2: Determination of nitrogen content using the Kjeldahl method.

2) Determining the non-protein nitrogen of the sample following ISO 8968-4|IDF 020-4—Milk—Determination of nitrogen content—Part 4: Determination of non-protein-nitrogen content.

3) Calculating the total amount protein as $(m_{total \ nitrogen}-m_{non-protein-nitrogen})*6.38$.

Analysis 8: Determination of the Total Amount of Lipid

The amount of lipid is determined according to ISO 1211:2010 (Determination of Fat Content—Röse-Gottlieb Gravimetric Method).

Analysis 9: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Analysis 10: Determination of Brix

Brix measurements were conducted using an Atago PAL-α digital hand-held refractometer calibrated against polished water (water filtered by reverse osmosis to obtain a conductivity of at most 0.05 mS/cm).

Approx. 500 μl of sample was transferred to the prism surface of the instrument and the measurement was started. The measured value was read and recorded.

The Brix of a whey protein solution is proportional to the content of total solids (TS) and TS (measured in % w/w) is approx. Brix*0.85.

Analysis 11: Determination of the Ash Content

The ash content of a food product is determined according to NMKL 173:2005 "Ash, gravimetric determination in foods".

Analysis 12: Determination of Total Solids and Water Content

The total solids of a product may be determined according to NMKL 110 $2_{nd}$ Edition, 2005 (Total solids (Water)—Gravimetric determination in milk and milk products). NMKL is an abbreviation for "Nordisk Metodikkomité for Naeringsmidler".

The water content of the product can be calculated as 100% minus the relative amount of total solids (% w/w).

Analysis 13: Measurement of pH

All pH values are measured using a pH glass electrode and at 25 degrees C.

The pH glass electrode (having temperature compensation) is rinsed carefully before and calibrated before use.

When the sample is in liquid form, then pH is measured directly in the liquid solution at 25 degrees C.

When the sample is a powder, 10 gram of a powder is dissolved in 90 ml of demineralised water at room temperature while stirring vigorously. The pH of the solution is then measured at 25 degrees C.

Analysis 14: Determination of the Amounts of Calcium, Magnesium, Sodium, Potassium and Phosphorus (ICP-MS Method)

The total amounts of calcium, magnesium, sodium, potassium, and phosphorus are determined using a procedure in which the samples are first decomposed using microwave digestion, and then the total amount of mineral(s) is determined using an ICP apparatus.

Apparatus:

The microwave is from Anton Paar and the ICP is an Optima 2000DV from PerkinElmer Inc.

Materials:

1 M $HNO_3$

Yttrium in 2% $HNO_3$

Suitable standards for calcium, magnesium, sodium, potassium, and phosphorus in 5% $HNO_3$ Pre-treatment:

Weigh out a certain amount of powder and transfer the powder to a microwave digestion tube.

Add 5 mL 1M $HNO_3$. Digest the samples in the microwave in accordance with microwave instructions.

Place the digested tubes in a fume cupboard, remove the lid and let volatile fumes evaporate.

Measurement Procedure:

Transfer pre-treated sample to DigiTUBE using a known amount of Milli-Q water. Add a solution of yttrium in 2% $HNO_3$ to the digestion tube (about 0.25 mL per 50 mL diluted sample) and dilute to known volume using Milli-Q water. Analyse the samples on the ICP using the procedure described by the manufacturer.

A blind sample is prepared by diluting a mixture of 10 mL 1M $HNO_3$ and 0.5 mL solution of yttrium in 2% $HNO_3$ to a final volume of 100 mL using Milli-Q water.

At least 3 standard samples are prepared having concentrations which bracket the expected sample concentrations.

Analysis 16: Determination of Heat Clot Time

Heat stability of whey proteins is particularly important for high protein beverages in the neutral pH range where ultrahigh temperature treatment is necessary to secure prolonged shelf-life of beverage compositions.

Therefore, a heat clot time analysis was developed as a measure of heat stability. 1.0 mL whey protein nanogel preparation was transferred to a 2 mL 32×11.5 mm injection vial (Mikrolab, part no ML33003V) and crimp sealed. The sample was then heated by incubation in an aluminium block preheated to 150 degrees C. in a Mikrolab supertherm heating unit. The aluminium block had holes drilled to fit exactly the dimensions of the vials ensuring efficient heat transfer. A temperature increase from 20-100 degrees C. is achieved in 40 seconds and a temperature of 140 degrees C. was reached within 132 seconds.

Aliqouts of individual samples were incubated for (minutes:seconds) 0:45, 1:00, 1:20, 1:47, 2:22, 3:10, 4:13, 5:38, 7:30 or 10:00 with the temperature in the sample measured to exceed 140 degrees C. after 132 seconds (2:12) to simulate UHT conditions. After heating the sample was immediately transferred to cold water to stop further reactions. The samples were inverted and their ability to flow to the bottom was recorded at each heating time. The heat clot time (HCT) was determined as the first heating time where the sample was gelled and hence did not flow to the bottom of the vial upon inversion.

The temperatures were recorded by placing a thermocouple thermometer connected to an Omega HH802 digital thermometer into a vial containing 1 mL oil to avoid boiling and evaporation of the sample at high temperatures.

Analysis 17: Determination of the Total Amount of BLG and ALA

The total amount of BLG and the total amount of ALA of a sample, including BLG and/or ALA in aggregated form, are determined according to Example 1.31 of PCT application No. PCT/EP2019/067039.

Example 1: Preparation of Dense Whey Protein Nanogel Solutions

The present inventors have previously, and by accident, discovered that whey protein nanogels can be produced in solutions having a surprisingly high protein content. The purpose of the present example was to further explore the possibilities of creating whey protein nanogels at high protein concentrations and characterised the obtained whey protein nanogel compositions.

Materials and Methods

TABLE 1

Characteristics of exemplary whey protein powder used for preparation of whey protein nanogels.

| Protein source | BLG isolate |
| --- | --- |
| pH | 5.67 |
| Total solids % | 95.2 |
| Protein/total solids % | 98.7 |
| Ash % | 0.51 |
| Fat % | 0.11 |
| Lactose % | <0.09 |
| Pho % of TS | <0.025 |
| Na % of TS | 0.025 |
| K % of TS | 0.051 |
| Ca % of TS | 0.146 |
| Mg % of TS | 0.022 |
| Native ALA % | 0.2 |
| Native BLG % | 96.5 |
| CMP % | 0.7 |
| Ca:BLG w/w ratio | 0.0016 |

Exemplary whey protein solutions were prepared by dissolving BLG isolate powder produced as described in WO 2018/115520, Example 7. The characteristics of the BLG isolate powder are described in Table 1.

The mineral content was determined using analysis 14 and fat, lactose, ash, total solids and total protein by analysis 8, 9, 10, 11, 12 and 7, respectively. The protein composition was determined using Analysis 6.

The powder was weighed off to produce final whey protein compositions at 4, 8, 10, 12, and 16% protein taking into account the protein/total solids. 90% of milli-Q water was added to the samples and pH was adjusted to 5.9 (or pH 6.0 at 10% protein) using 3M NaOH.

Remaining water was added and the final pH was verified. 15 mL of each sample in Duran GL18 screw thread tubes (wall thickness 1.8 mm, 16 mm outer diameter, cat no 28625320) with PBT screwcap (Duran) mounted was thermally treated at 90 degrees C. for 14 minutes (or 10 minutes at 10% protein) in a water bath and subsequently cooled immediately in an ice-water bath.

The characterization of whey protein nanogels by dynamic light scattering (Z-average hydrodynamic diameter), transmission electron microscopy and fraction of soluble whey protein aggregates and whey protein nanogels was done as described in Analysis 1, 2 and 3, respectively.

Results

The whey protein nanogel preparations were formed by thermal treatment of BLG at 90 degrees C. for 14 minutes. Surprisingly, the whey nanogel preparations were found to remain liquid even when heating at high protein concentration of up to at least 16% protein as demonstrated in Table 2.

It was generally found that thermal treatment at e.g. 90 degrees C. for 10 minutes lead to 95-97% denaturation with only 3-5% non-denatured protein (by Analysis 6) present after thermal treatment.

The whey nanogel preparations were characterized by a z-average diameter of 196-287 nm and having a fraction of soluble whey protein aggregates of 6 to 20% and nanogel fraction of 94 to 80% with increasing protein concentration, respectively (see FIG. 1).

Figure 2:
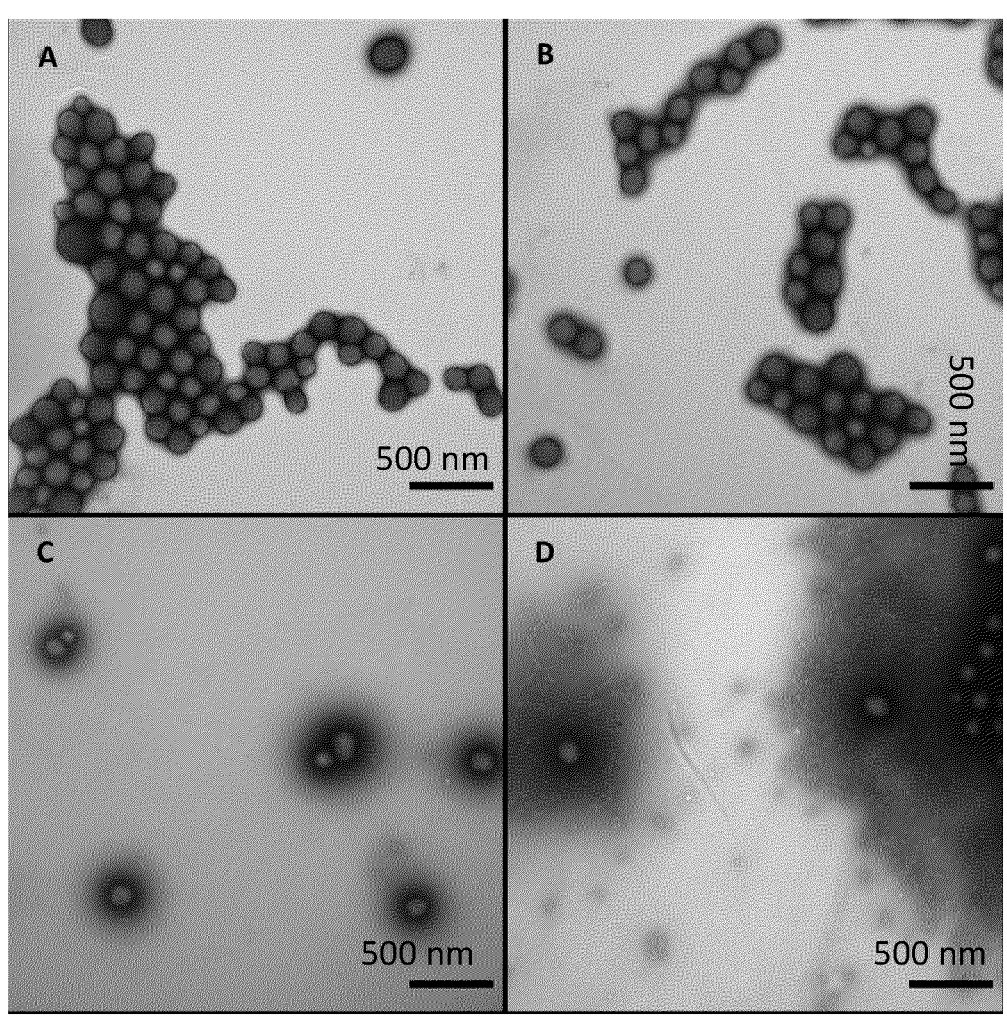
FIG. 2 shows transmission electron microscopy images of whey protein nanogel suspensions prepared at A: 4% w/w native BLG; B: 8% w/w native BLG; C: 12% w/w native BLG and D: 16% w/w native BLG. Scale bar is 500 nm for all the images.

FIG. 2 shows transmission electron microscopy images containing highly uniform, spherical nanogels whose individual sizes agree well with dynamic light scattering measurements (Table 2). During TEM sample preparation, both staining and drying will have an effect on the particles which makes them cluster together, as shown in FIG. 2.

Although non-spherical aggregates are visually abundant in TEM images of 12-16% whey protein nanogel preparations, the mass fraction of spherical aggregates account for >80% due to their compact structure.

It was further found that the increasing fraction of soluble aggregates with increasing protein concentration was in agreement with the emergence of smaller stranded aggregates in TEM images which suggest that the increase in protein concentration and/or increase in the content of Na and K results in an increased fraction of soluble aggregates.

TABLE 2

Characteristics of 4-16% whey protein nanogel preparations.

| Protein | 4% | 8% | 10% | 12% | 16% |
| --- | --- | --- | --- | --- | --- |
| pH | 5.91 | 5.92 | 6.0 | 5.93 | 5.92 |
| Ca:BLG w:w ratio | 0.0016 | 0.0016 | 0.0016 | 0.0016 | 0.0016 |
| Na + K (mM) | 3.8 | 7.6 | 9.5 | 11.4 | 15.2 |
| Z-average diameter, nm | 211 ± 1 | 211 ± 3 | 196 | 222 ± 3 | 287 ± 3 |
| Nanogels | 94% | 90% | n.d | 88% | 80% |
| Soluble aggregates | 6% | 10% | n.d | 12% | 20% | n.d. = not determined

Conclusion

Whey protein nanogel preparations can be prepared even at concentrations of up to at least 16% protein when using whey protein solutions characterized by low calcium (0.0016 Ca:BLG w:w) and monovalent salts. The resulting whey protein nanogel preparations consist for the major part (≥80%) of spherical nanogels having a size of 211-287 nm with a minor fraction of soluble whey protein aggregates.

The fraction of soluble whey protein aggregates increases with increasing protein and/or content of monovalent salts (Na+K).

Example 2: Whey Protein Nanogel Preparations Having a Low Content of Soluble Aggregates The purpose of the present whey protein nanogel preparations is to demonstrate how mono- and divalent cations present during thermal treatment of whey protein compositions influence the distribution between nanogels and soluble whey protein aggregates and ultimately enable thermal treatment of whey protein solutions at high protein concentrations without gelation to form whey protein nanogels.

Materials and Methods

Whey protein nanogel preparations were prepared from the BLG powder used in example 1 having the composition described in Table 1 by weighing off the BLG powder to reach 3, 4, 5 and 16% BLG, respectively, all having a calcium content of 0.0016 g per gram BLG.

The powder was dispersed into MilliQ water to reach desired concentrations and dissolved by pH adjustment to 6.0 using 3M NaOH while recording the amount of added minerals. 0-50 mM NaCl was added to the preparations from a 1M stock solution. The total molar concentration of Na+K was calculated by summarizing the inherent content of Na+K in the powder using their respective molecular weights, the amount of Na added in form of NaCl and resulting total amount of Na+K is presented in Table 3.

1 mL of each sample in a 2 mL clear crimp sealed vial (Agilent Technologies, Germany) was heated for 10 minutes in an aluminium block preheated at 90 degrees C.

The size of whey protein nanogels was evaluated by light scattering using analysis 2, the flow behaviour (gel/liquid) by evaluating the samples flow to the bottom upon sample inversion and measurement of sample viscosity using the Viscoman as described in analysis 4.

Samples A-E were prepared from the same BLG powder to make 12% BLG compositions with an inherent Ca content of 0.0016 g/g BLG. The BLG powder was weighed off, dispersed in MilliQ water and dissolved by addition of 3M NaOH to reach pH 5.9 (Sample A).

Samples B-E were prepared by further titration with 3M NaOH to reach pH 6.0-6.1-6.3 and 6.5, respectively.

15 mL of each sample (A-E) were heated at 95 degrees C. for 15 min in Duran glass tubes by immersion into a water bath and immediately cooled in an ice-water bath after heating.

Samples F-L were prepared from the same BLG powder to make 14% BLG solutions with a calcium content of 0.0021 g/g BLG. The BLG powder was weighed off, dispersed in MilliQ water and dissolved by titration with a 5% Ca(OH)2 slurry (under stirring to ensure homogeneity) to the Ca content of 0.0021 g/g BLG and a pH of 5.97 (Sample F).

Samples G-K were prepared from sample F by adjustment with 3M NaOH to reach pH 6.1-6.7 (see table) while recording the amount of added NaOH.

15 mL of each of the samples F-L were heated at 95 degrees C. for 14 minutes in a water bath to prepare whey protein nanogels and immediately cooled after heating.

A sample set M was prepared as described for samples F-L but with addition of 7.5 mM CaCl2 from 1M CaCl2 after the initial pH adjustment to 5.97 to reach a calcium content of 0.0044 g/g BLG. The pH was adjusted to 5.9-6.5 using 3M NaOH and sample was heated as described for samples F-L.

A sample set N was prepared as described for sample set M but with addition of 14.9 mM CaCl2 to reach a Ca content of 0.0065 g/g BLG. Aliquots of the sample was adjusted to pH in the 5.9-6.7 range using 3M NaOH and heated as described for samples F-L.

Additional whey protein nanogel preparations O-P-Q were prepared by dissolving BLG powder to reach 14-16-20% BLG by pH adjustment to 6.04-5.94-5.89 using 5% Ca(OH)2 slurry to reach Ca contents of 0.0022, 0.0024 and 0.0023 g/g BLG, respectively. The pH was then adjusted using 3M NaOH to reach pH 6.11, 6.10 and 6.08, respectively. Whey protein nanogel preparations O-P-Q with a low content of soluble whey protein aggregates were then prepared by heating of 15 mL sample in Duran glass tubes immersed in a 95 degrees C. water bath for 14 minutes.

The viscosities of samples O-P-Q were determined according to Analysis 4.

Samples R and S were prepared as described for Sample F and further titrated to pH 6.2 and 6.4, respectively, using 5% Ca(OH)2 and heated as described for samples F-L. The calcium content of the samples were 0.0028 and 0.0030 g/g BLG as described in Table 4.

The Z-average size and distribution between nanogels and soluble whey protein aggregates in whey protein nanogel preparations was characterized by analysis 2 and 3, respectively. The viscosity was determined by analysis 4 and the mineral content as described in analysis 14.

Results 1.0 mL whey protein compositions characterized by an inherent calcium content of 0.0016 g/g BLG was adjusted to pH 6.0 with 0-50 mM added NaCl and were thermally treated at 90 degrees C. for 10 minutes in the aluminium block. The amount of added NaCl and resulting total amount of Na+K after adjustment can be seen in Table 3 (3%, 4% and 5% whey protein solutions) and Table 4 (16% whey protein solutions).

Having just demonstrated that whey protein nanogel preparations could be formed (Example 1) even at up to at least 16% native BLG the inventors found it very surprising that an apparent threshold concentration exists at around 20 mM total Na+K above which the whey protein solution forms a gel upon thermal treatment. At lower protein concentrations (3-5%) whey protein nanogel preparations could be formed at up to at last 23-25 mM total Na+K.

Above this approximate content of monovalent minerals thermal treatment results in gelation of the sample independent on whether the protein dosage is 3%, 4%, 5% (Table 3) or even 16% protein (Table 4). In contrast, all samples containing <20 mM Na+K (16%) or <25 mM (3-5%) remained liquid thus clearly demonstrating the feasibility of making whey protein nanogel preparations at low monovalent mineral contents.

Table 4 further reveals that even subtle increases in total Na+K from 15.2 to 19.5 increase the viscosity from 24 cP to >100 cP upon thermal treatment of the 16% whey protein solution.

TABLE 3

Influence of added NaCl content on the flow behaviour upon sample inversion after thermal treatment at 90 degrees C. for 14 minutes to form whey protein nanogels at 3-5% protein at pH 6.0 and a Calcium content of 0.0016 g/g BLG. The flow behaviour of the samples were evaluated as liquid when they flowed to the bottom upon inversion of the vial and did not stay at the origin (i.e gelled state).

| | Protein: | | | |
|---|---|---|---|---|
| | 3% | 4% | 5% | Flow |
| Added NaCl, mM | Total mineral (N + K), mM | | | behaviour |
| 0 | 2.9 | 3.8 | 4.8 | liquid |
| 10 | 12.9 | 13.8 | 14.8 | liquid |
| 20 | 22.9 | 23.8 | 24.8 | liquid |
| 30 | 32.9 | 33.8 | 34.8 | gelled |
| 50 | 52.9 | 53.8 | 54.8 | gelled |

TABLE 4

Influence of Na + K content on resulting viscosity and aggregate size of 16% whey protein nanogel preparations after thermal treatment at 90 degrees C. for 10 minutes at pH 6.0.

| Protein | Added NaCl, mM | Total Na + K, mM | Calcium g/g BLG | Viscosity, cP | Z-average diameter, nm |
|---|---|---|---|---|---|
| 16% | 0 | 15.2 | 0.0016 | 24.3 | 287 ± 2 |
| 16% | 5 | 17.4 | 0.0016 | 32.9 | n.d. |
| 16% | 10 | 19.5 | 0.0016 | 103.5 | n.d. |
| 16% | 15 | 21.6 | 0.0016 | gel | | n.d. = not determined.

In order to minimize addition of monovalent minerals, it was attempted to pH adjust a 14% whey protein composition by use of a $Ca(OH)_2$ slurry thereby adding divalent cations instead of monovalent cations during titration.

Thus a 14% whey protein composition was prepared by dissolving BLG by use of pH adjustment to pH 5.97 using Ca(OH)2 bringing the Ca content to 0.0021 g/g BLG. However, as shown in Table 6 (Samples F-L) thermal treatment at 95 degrees C. for 10 minutes resulted in gelation of the sample.

The pH was thus further increased by use of 3M NaOH to keep the calcium content constant at 0.0021 g/g BLG while increasing electrostatic repulsion between proteins. This surprisingly allowed the formation of whey protein nanogel preparations at 14% protein by thermal treatment at 95 degrees C. for 10 minutes from at most pH 6.1 and up to at least 6.7. As Table 6 shows, the total Na+K remains ≤20 mM within this pH range.

Surprisingly, the fraction of soluble aggregates in the heated whey protein nanogel preparations remain remarkably low (≤2%) at pH 6.1-6.3 with no sign of sedimentation in the sample despite the high protein concentrations used making it particularly beneficial to prepare nanogels in this pH range.

Even more surprisingly, it was found that calcium content of about 0.0022-0.0024 (samples O-P-Q) g/g BLG accomplished by the two-step pH adjustment of (1) using $Ca(OH)_2$ to reach desired calcium content and (2) increasing pH to about 6.1 to ensure that total Na+K is kept well below 20 mM allowed thermal treatment of protein concentrations of up to at least 20% BLG as shown in Table 6.

However, if the calcium content is not modified by addition of $CaCl_2$, $Ca(OH)_2$ or other sources, the 12% whey protein nanogel preparations thermally treated at pH 5.9-6.1 shown in Table 6 (Sample A-D, 0.0016 g/g BLG) demonstrate that the fraction of soluble whey protein is significantly higher and increases with pH and ultimately leads to gelation at pH ≥6.3.

Table 6 (Sample sets M-N) further demonstrates that if $CaCl_2$ is added to increase the calcium content in the whey protein compositions from 0.0043 to 0.0065 g/g BLG in the pH range between 5.9-6.7 it results in gelation upon thermal treatment.

Surprisingly, even when the pH was increased only by use of $Ca(OH)_2$, liquid whey protein nanogels samples R and S were prepared by thermal treatment at 94 degrees C. for 14 minutes at pH 6.2-6.48, respectively, nanogel formation was feasible at 0.0028-0.0030 g calcium/g BLG and 3.7 mM total Na+K (see Table 6).

TABLE 5

Characteristics of raw material and process used for preparation of whey protein nanogels.

| Samples | F-L | M | N |
|---|---|---|---|
| Protein | 14% | 14% | 14% |
| pH setpoint 1 Ca(OH)2 | 5.97 | 5.97 | 5.97 |
| Added CaCl2, mM | — | 7.5 | 14.9 |
| pH during thermal treatment | 5.97-6.67 | 5.9-6.48 | 5.87-6.66 |
| Calcium/BLG in g/g | 0.0021 | 0.0043 | 0.0064 |
| Monovalent salts | 3.3-12.1 | 3.26-11.3 | 3.26-15.9 |
| Thermal treatment | 95 degrees C. 14 min | 95 degrees C. 14 min | 95 degrees C. 14 min |

TABLE 6

Characteristics of thermally treated whey protein nanogel preparations

| ID | pH | Sample | Ca g/g BLG | Total Na + K mM | Z-average diameter, nm | Nanogels | Soluble aggr. |
|---|---|---|---|---|---|---|---|
| A | 5.9 | 12% | 0.0016 | 11.4 | 228 | 88% | 12% |
| B | 6.0 | 12% | 0.0016 | 12.7 | 209 | 76% | 24% |
| C | 6.1 | 12% | 0.0016 | 16.0 | 184 | 58% | 42% |
| D | 6.3 | 12% | 0.0016 | 19.7 | Gelled | | |
| E | 6.5 | 12% | 0.0016 | 23.4 | Gelled | | |
| F | 6.0 | 14% | 0.0021 | 3.3 | Gelled | | |
| G | 6.1 | 14% | 0.0021 | 4.8 | 458 | 98% | 2% |
| H | 6.2 | 14% | 0.0021 | 6.4 | 304 | 98% | 2% |
| I | 6.3 | 14% | 0.0021 | 7.9 | 276 | 98% | 2% |

TABLE 6-continued

| | | | | Total Na + K | Z-average diameter, | | Soluble |
| --- | --- | --- | --- | --- | --- | --- | --- |
| | | | | Characteristics of thermally treated whey protein nanogel preparations | | | |
| ID | pH | Sample | Ca g/g BLG | mM | nm | Nanogels | aggr. |
| J | 6.4 | 14% | 0.0021 | 9.4 | 284 | 95% | 5% |
| K | 6.5 | 14% | 0.0021 | 10.9 | 286 | 88% | 12% |
| L | 6.7 | 14% | 0.0021 | 12.1 | 291 | 74% | 26% |
| M | 5.9-6.5 | 14% | 0.0043 | 3.26-11.3 | | Gelled | |
| N | 5.9-6.7 | 14% | 0.0065 | 3.26-15.9 | | Gelled | |
| O | 6.04-6.11 | 14% | 0.0022 | 7.5 | 353 | 98.2% | 1.8% |
| P | 5.94-6.10 | 16% | 0.0024 | 8.5 | 364 | 98.1% | 1.9% |
| Q | 5.89-6.08 | 20% | 0.0023 | 10.6 | 563 | 98.1% | 1.9% |
| R | 6.2 | 16% | 0.0028 | 3.73 | n.d. | 97.1% | 2.9% |
| S | 6.42 | 16% | 0.0030 | 3.73 | n.d. | 96.9% | 3.1% |

Conclusion

Whey protein nanogel preparations containing up to at least 98% nanogels were successfully prepared by controlling the amount of calcium per BLG and pH while maintaining the content of monovalent minerals low ($\leq 20$ mM total Na+K). Suitable calcium contents and total Na+K levels were achieved by combining a suitable protein raw material with pH adjustment using Ca(OH)$_2$ and NaOH to reach appropriate levels of minerals.

The aggregates sizes at $\geq 90\%$ nanogel content were observed in the range of 276-563 nm. It was observed that a higher pH is required for nanogel formation to avoid gelation when higher calcium is present and that a too high pH also results in gelation due to formation of a large fraction of soluble whey protein aggregates. Thus, intermediate pH values tailored to the specific calcium content is required for optimum performance.

Example 3: Whey Protein Nanogels Prepared at High Temperature

Whey protein solutions containing 4-16% BLG were heat treated at temperatures ranging from 85 to 150 degrees C. to evaluate the opportunities to produce whey protein nanogels across a wide temperature range.

Materials and Methods

Whey protein solutions were prepared by dissolving BLG as described in Example 1 by adjustment with 3M NaOH to pH 5.9.

Sample set A was thermally treated at 85 degrees C. for 22 minutes. 120 µl of each 4-16% pH 5.9 BLG solution was transferred to a 96-well PCR plate (VWR, Cat no 732-2387) and sealed using adhesive aluminium foil (VWR cat no 60941-126). The plate was heated in an Esco Healthcare Swiftmax MaxPro thermocycler programmed to equilibrate samples at 20 C. for 5 minutes followed by heating to target temperature at 4 degrees C./sec and kept at the target temperature of 85 degrees C. for the described duration of 22 minutes, and the sample was subsequently cooled to 4 degrees C.

Sample set B was identical to sample set A but thermally treated at a higher temperature of 95 degrees C. for 14 minutes to produce whey protein nanogel preparations.

Sample set C consisted of 12% BLG solutions prepared as described above and pH adjusted in the range of 5.9-6.0 and 6.1 using 3M NaOH. 10 mL 12% BLG solution at each pH was heated at 95 degrees C. for 10 minutes in a water bath as described in Example 1.

Sample set D consisted of 12% BLG solutions at pH 5.9-6.0 prepared as described for sample set C. However, sample set D was thermally treated by incubation at 150 degrees C. for 0-10 minutes. 1.0 mL sample was transferred to 2 mL 32×11.5 mm injection vials (Mikrolab, part no ML33003V) and crimp sealed. The sample was then heated by incubation in an aluminium block preheated to 150 degrees C. in a Mikrolab supertherm heating unit. The aluminium block had holes drilled to fit exactly the dimensions of the vials ensuring efficient heat transfer. Aliqouts of individual samples were typically incubated for (minutes: seconds) 0:45, 1:00, 1:20, 1:47, 2:22, 3:10, 4:13, 5:38 or 7:30 with the temperature in the sample measured to exceed 140 degrees C. after 132 seconds (2:12) to simulate UHT conditions. After heating the sample was immediately transferred to cold water to stop further reactions.

Sample E was prepared as a 14% BLG solution as described for sample set F-L in example 2 and adjusted to pH 6.2 using 3 M NaOH.

The Z-average size of whey protein nanogel preparations was determined as described in analysis 2. The mineral content was determined using analysis 14. The heat clot time and distribution between nanogels and soluble whey protein aggregates was determined using analysis 16 and 3, respectively.

Results

Table 7 highlights that whey protein nanogels characterized by Na and K concentration summarizing to 3.8 to 16 mM, a Z-average diameter of about 180-390 nm can be prepared by heating of from at most 4 to at least 12% protein solutions at a calcium content of 0.0016 g/g BLG and thermal treatment at temperatures ranging from at most 85 degrees C. to at least 95 degrees C. at about pH 6.

Further, when 14% native whey protein compositions characterized by 0.0022 g calcium/g BLG and Na+K summarizing to 6.9 mM were thermally treated by incubation in a 150 degrees C. heat block for 0-7:30 minutes it was surprisingly found that the resulting nanogel preparations surprisingly remained liquid and flow freely to the bottom of HPLC vials upon inversion even after thermal treatment for at least 5:38 to 7:30 minutes at 150 degrees C. at pH 6.0 and 5.9, respectively.

TABLE 7

Characteristics of thermally treated whey protein nanogel preparations.

| Sample | pH | Heating | Ca g/g BLG: | Total Na + K, mM | Z-average diameter, nm | Nanogels | Soluble aggr. |
|---|---|---|---|---|---|---|---|
| A4% | 5.9 | 85 degrees C. 22 min | 0.0016 | 3.8 | 201.2 ± 3.7 | n.d. | n.d. |
| A8% | 5.9 | 85 degrees C. 22 min | 0.0016 | 7.6 | 205.4 ± 3.0 | n.d. | n.d. |
| A12% | 5.9 | 85 degrees C. 22 min | 0.0016 | 11.4 | 235.3 ± 1.1 | n.d. | n.d. |
| A16% | 5.9 | 85 degrees C. 22 min | 0.0016 | 15.2 | 388.6 ± 2.0 | n.d. | n.d. |
| B4% | 5.9 | 95 degrees C. 14 min | 0.0016 | 3.8 | 190.4 ± 1.7 | 94% | 6% |
| B8% | 5.9 | 95 degrees C. 14 min | 0.0016 | 7.6 | 223.7 ± 1.7 | 90% | 10% |
| B12% | 5.9 | 95 degrees C. 14 min | 0.0016 | 11.4 | 222.2 ± 3.3 | 88% | 12% |
| C16% | 5.9 | 95 degrees C. 14 min | 0.0016 | 15.2 | 318.8 ± 3.5 | 80% | 20% |
| C12% | 5.9 | 95 degrees C. 10 min | 0.0016 | 11.4 | 228.2 ± 2.9 | 88% | 12% |
| C12% | 6.0 | 95 degrees C. 10 min | 0.0016 | 12.7 | 209.0 ± 2.5 | 76% | 24% |
| C12% | 6.1 | 95 degrees C. 10 min | 0.0016 | 16.0 | 184.2 +/− 3.215 | 58% | 42% |

TABLE 8

Thermal treatment by incubation at 150 degrees C. of 12-14% whey protein compositions at pH 5.9-6.2 demonstrating that nanoparticulation is feasible at high protein concentration even under UHT conditions when mineral conditions and pH are appropriate.

| | D12% | D12% | E14% |
|---|---|---|---|
| Protein | | | |
| Ca g/g BLG | 0.0016 | 0.0016 | 0.0022 |
| Na + K | 11.4 | 12.7 | 6.9 |
| pH | 5.9 | 6.0 | 6.2 |
| Thermal treatment at 150 degrees C. | | | |
| 7:30 | liquid | gel | liquid |
| 5:38 | liquid | liquid | liquid |
| 4:13 | liquid | liquid | liquid |
| 3:10 | liquid | liquid | liquid |
| 2:22 | liquid | liquid | liquid |

Conclusion

It was found that whey protein nanogel preparations can be prepared at a surprisingly wide range of temperatures e.g. at 85 degrees C./22 min or at 150 degrees C./7:30 min and at remarkably high BLG concentrations of at most 4% to at least 16% protein.

Since 140 degrees C. is reached after 2 minutes 12 seconds heating in the heat block at 150 degrees C. a surprisingly long effective holding time beyond 4 minutes 30 seconds and consequently high heat load can be applied to 12-14% samples while still producing whey protein nanogels in liquid form.

While it is generally thought that heating of high protein concentration under UHT conditions without shearing leads to gelation and blocking of equipment, it was thereby surprisingly found that treatment of native BLG under UHT conditions at 12-14% surprisingly did not result in gelation of the samples even in the absence of applied shear forces. This is particularly surprising since BLG is considered among the least heat stable whey proteins.

The resulting nanogel sizes of about 184-389 nm are in good agreement with previous examples and the aggregates sizes observed by TEM in FIG. 2.

Example 4: Heat Stable Whey Protein Nanogel Preparations

The present investigation aims to demonstrate that protein nanogel preparations are suitable for use in ultra-high-temperature processing making them ideal for use in high protein beverage applications at neutral pH

Materials and Methods 14-16-20% whey protein nanogel preparations were as described for sample O-P-Q in Example 2.

The 14-16 and 20% nanogel preparations were subjected to a secondary thermal treatment at UHT temperatures to evaluate the heat stability defined by the first heating time at which the sample clots. This time is referred to as the heat clot time and is measured according to Analysis 16.

Further, the 14% sample was concentrated to 24% protein by ultrafiltration as follows: 150 mL whey protein nanogel preparation was concentrated by placing it in a 200 mL Amicon stirred cell equipped with a Koch HFK 328 membrane with a nominal molecular weight cut-off of 5 kDa. 3 bar N2 gas was applied to pressurize the cell allowing concentration of the sample by forced passage of liquid through the ultrafiltration membrane. The brix of the retentate and permeate was measured and the retentate protein content was calculated as described in analysis 10. During concentration, the pressure was temporarily relieved and the top of the cell removed to allow measurement of protein concentration by Brix (Analysis 10) and viscosity as described in Analysis 4.

The heat clot time of the 24% concentrate was determined according to Analysis 16.

The Z-average diameter and viscosity of whey protein nanogel preparations was determined by Analysis 2 and 4, respectively. The distribution between whey protein nanogels and soluble whey protein aggregates was determined using Analysis 3.

Results

Table 9 summarizes the characteristics of whey protein nanogel preparations made through thermal treatment of high protein concentrations.

The non-heated solutions were characterized by 0.0022-0.0024 g Ca/g BLG and a low content of monovalent ions as demonstrated by a total Na+K of less than 11 mM.

The whey protein nanogel preparations were characterized by a surprisingly low viscosity of 2.9-4.7 cP despite the high protein content (14-20%, respectively) and the Z-average diameter of aggregates were found to be in the range of ~350-560 nm. A remarkably high (>98%) content of nanogels relative to total protein was found in the samples.

As seen in Table 9 it was surprisingly found that the nanogel preparations were particularly heat stable as all samples at 14%, 16%, 20% protein and even the 14% whey protein nanogel preparations concentrated to 24% remained liquid after 2 min 20 sec heating and thereby resisted UHT temperatures and required even further heating at 150 degrees C. for at least 7 min 30 sec at 14-16% or 3 min 10 sec at 20% and 24% protein to force gelation, see Table 9.

TABLE 9

| Characteristics of whey protein nanogel preparations made by thermal treatment at 90 degrees C. for 10 minutes at 14-20% protein concentrations. | | | |
|---|---|---|---|
| Protein % | 14 | 16 | 20 |
| pH | 6.11 | 6.10 | 6.08 |
| Calcium:BLG in g/g | 0.0022 | 0.0024 | 0.0023 |
| [Na] + [K] | 7.5 | 8.5 | 10.6 |
| pH after heating | 6.72 | 6.71 | 6.72 |
| Sample viscosity, cP | 2.92 | 3.44 | 4.66 |
| Z-average diameter, nm | 353 ± 10 | 364 ± 7 | 563 ± 9 |
| Soluble aggregates | 1.85% | 1.89% | 1.92% |
| Nanogels | 98.15% | 98.11% | 98.08% |
| Heat clot time | 7:30 | 7:30 | 3:10 |

Conclusion

Heat stable whey protein nanogel preparations having a diameter of about 353-562 nm and low viscosity can be prepared at high protein concentrations by thermal treatment at pH 14-20% protein, 0.0022-0.0024 g calcium/g BLG and less than 10.6 mM Na+K.

The samples were characterized by a high fraction of whey protein nanogels (>98%) and found to be remarkably resistant to thermal treatment as they remained liquid even after thermal treatment above 140 degrees C., and even the 14% sample concentrated by ultrafiltration to 24% protein resisted heating to UHT temperatures.

Example 5: Low Viscosity Whey Protein Preparations

Whey protein nanogel preparations with low content of soluble aggregates were produced to reduce the protein contribution of soluble whey protein aggregates and evaluate the feasibility of making highly concentrated whey protein nanogel preparations.

High protein at low viscosity is a strong advantage in industrial processing where the ability to reach higher protein concentrations directly increases capacity of spray drying equipment. Low viscosity development is further desired in production as flux across membranes (e.g. in the context of ultrafiltration) scales inversely proportional to the viscosity of the liquid to be filtered.

Low viscosity is furthermore desired in high protein whey protein beverages and high protein yoghurts.

Materials and Methods 200 mL 14% BLG composition was prepared by dispersing powder into MilliQ, dissolving by pH adjustment to 6.0 using 5% Ca(OH)$_2$ slurry and final pH adjustment to 6.2 using 3 M NaOH. The sample was distributed into several 15 mL aliqouts which were immersed into 95 degrees C. water bath for 14 min, immediately cooled after heating and pooled into a single sample.

The sample was concentrated by UF concentration while following the protein concentration and viscosity at appropriate points in time.

The viscosity of whey protein nanogel preparations was measured using a rheometer (Anton Paar, Physica MCR301). 19.6 mL sample was added to cup CC27-SS (SN33864) and samples were equilibrated to 8 degrees C. A shear rate sweep between 1 s$^{-1}$ and 1000 s$^{-1}$ was performed over 10.5 minutes. The viscosity was presented in the unit centipoise (cP) at a shear rate of 300 s$^{-1}$.

The UF concentration was performed by placing 150 mL 14% sample in a 200 mL Amicon stirred cell equipped with a Kock HFK328 membrane. 3 bar N2 gas was applied to pressurize the cell and concentrate the sample. The Brix of the permeate was consistently measured to 0.0 and thereby equal to water suggesting no passage of proteins through the membrane. During concentration, the pressure was temporarily relieved to allow measurement of protein concentration by Brix as described in Analysis 10 and viscosity as described in Analysis 4. A sample was removed after concentration to 24% protein and left at 4 degrees C. overnight.

Results

Table 10 describes the characteristics of a nanogel preparation containing 95.5% nanogels prepared by thermal treatment at 14% protein at 95 degrees C. for 14 minutes at a calcium content of 0.0022 g/g BLG and in the presence of Na and K combining to 6.9 mM concentration. While such thermal treatments of concentrated whey protein preparations typically gel and/or require high shearing by use of e.g. scraped heat exchangers to avoid gelation during heating, the inventors have found that the thermally treated whey protein preparation remained at remarkably low viscosity comparable within experimental error to that of the native whey protein solution as seen in Table 10.

Figure 3:
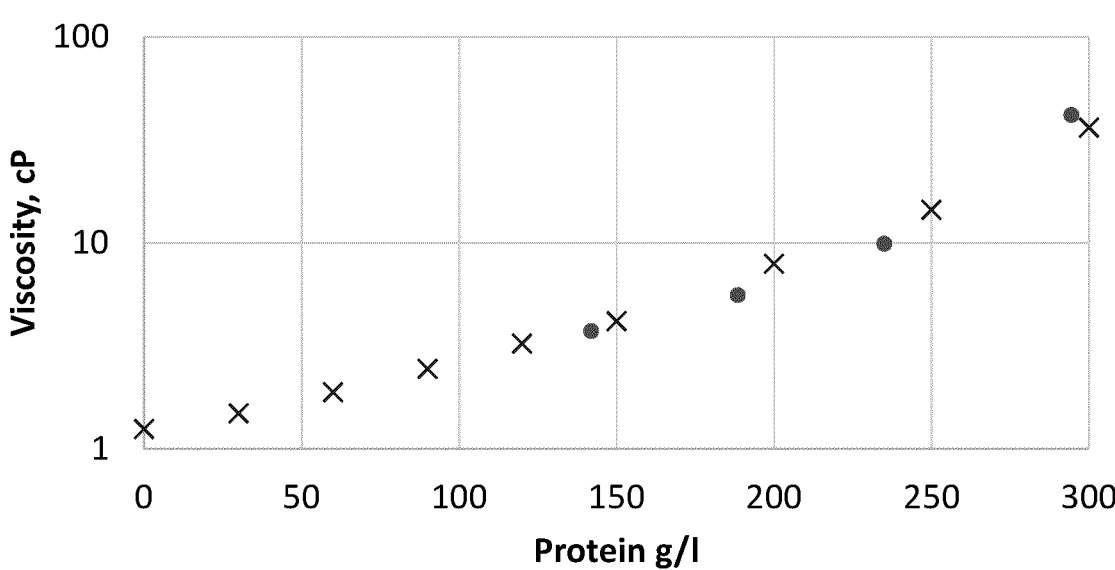
FIG. 3 shows the viscosity development during UF concentration of 14% w/w whey protein nanogel suspension (filled dots) and a native BLG solution (crosses) to approx. 30% w/w total protein.

The whey protein nanogel preparation was further concentrated by ultrafiltration while monitoring the viscosity development as a function of protein content as shown in FIG. 3. Surprisingly, it was found that the nanogel preparation could be concentrated up to at least 29.5% protein and the viscosity in contrast to the expected even followed closely the viscosity of nonheated whey protein solutions all the way up to at least 29.5% protein.

TABLE 10

| Characteristics of whey protein nanogel preparation used to investigate flow behaviour | |
|---|---|
| Protein (%) | 14 |
| Calcium in g/g BLG | 0.0022 |
| Total Na + K, mM | 6.9 |
| Thermal treatment | 95 degrees C. 14 min |
| Z-average diameter, nm | 306 ± 3 |
| Viscosity of non-heated whey protein solution, mPa·s | 3.9 |
| Viscosity of nanogel preparation, mPas | 3.7 |
| Nanogels | 95.5% |
| Soluble aggregates | 4.5% |

Conclusion

The combination of high protein (14%), low Na+K and 0.0022 g calcium/g BLG with thermal treatment at 95 degrees C. for 14 minutes produced stable whey protein nanogel preparations characterized by 95.5% nanogels relative to total protein and a Z-average size of 305.5±2.8 nm.

It was found that the viscosity of even concentrated whey protein nanogel preparations was consistently low and approximately equal to the viscosity of native BLG solutions even when concentrated to high protein levels of up to at least 29.5%.

This allows concentration of whey protein nanogels (24% in previous example) that resist UHT temperatures making them particularly useful at neutral pH where UHT treatment is a prerequisite for e.g. medical beverages where high protein is a desire for several patient groups.

Example 6: Low Viscosity Acidified Products

Nanogel preparations containing low amounts of soluble aggregates were produced to demonstrate that low viscosity acidified products can be prepared.

Methods

Samples A-C were prepared from BLG powder to make 12% BLG compositions with an inherent calcium content of 0.0016 g/g BLG. The BLG powder was weighed off, dispersed in MilliQ water and dissolved by addition of 3 M NaOH to reach pH 5.9 (Sample A).

Samples B-C were prepared by further titration with 3 M NaOH to reach pH 6.0 and 6.2, respectively.

Sample D was prepared from BLG powder to make 16% BLG whey protein nanogel preparation particularly low in acid gellable protein content. Protein was weighed off, dispersed into MilliQ water and dissolved by titration with 5% $Ca(OH)_2$ slurry to reach pH 5.94. The pH was then adjusted to 6.0 using 3 M NaOH.

$3\times18$ mL of each sample A-D were heated at 95 degrees C. for 15 min in Duran glass tubes by immersion into a water bath and immediately cooled in an ice-water bath after heating.

15 gram of each of samples A-D were weighed off and 30 gram MilliQ (Sample A-C) or 45 mL MilliQ (Sample D) was added to dilute sample to 4% protein. The diluted samples were assessed with respect to gel formation upon acidification according to Analysis 5.

The mineral composition of whey protein solutions was determined using Analysis 14. The distribution between whey protein nanogels and soluble whey protein aggregates was determined by analysis 3. The structure formation during acidification was determined using analysis 5.

Results 12-16% whey protein nanogel preparations with varying content of soluble aggregates weres successfully prepared as illustrated in Table 11 including a 16% sample with remarkably low content of soluble aggregates of 1.9%.

Figure 4:
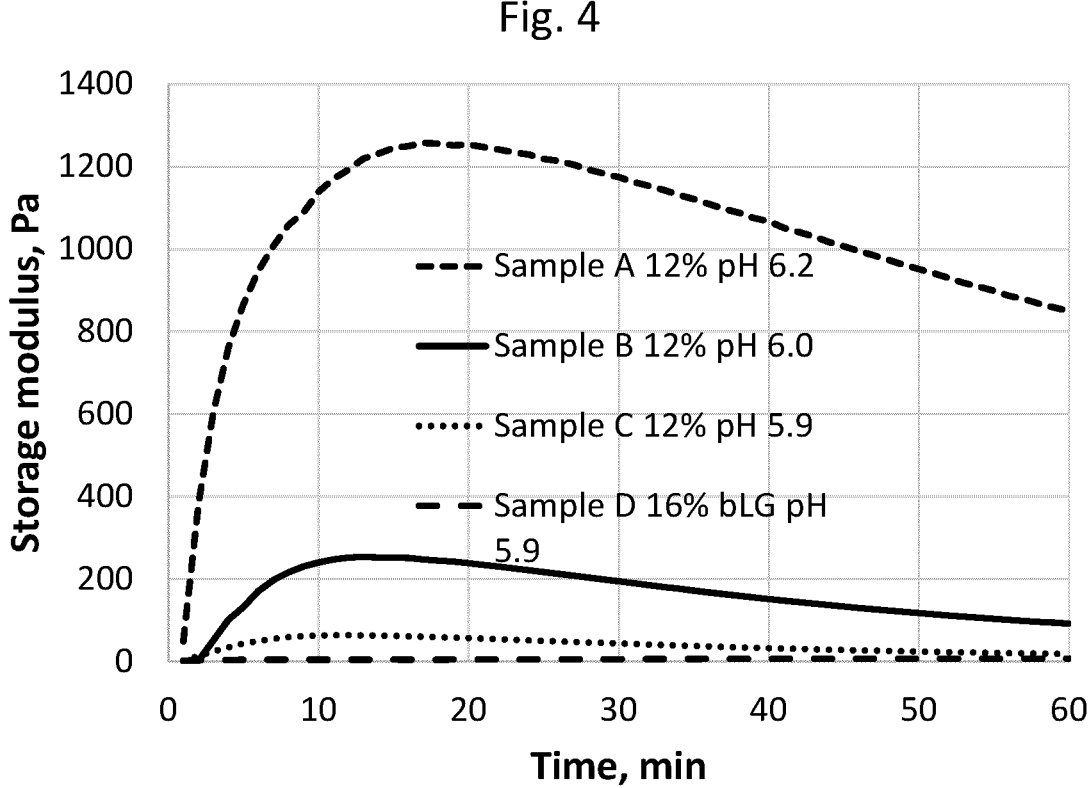
FIG. 4 shows the development of storage modulus (gel strength) of whey protein nanogel preparations containing 1.9% (Sample D) to 59.2% (sample A) soluble whey protein aggregates relative to total protein. All samples were diluted to 4% total protein prior to the determination of the storage modulus.

FIG. 4 demonstrates that acidification of samples (all diluted to 4% protein prior analysis) in the rheometer results in profound increases in storage modulus (gel strength) for samples containing a large content of soluble aggregates (e.g. sample A with a maximum of 1257 observed at around 18 minutes (pH was 4.4)), whereas a decrease in maximum gel strength is observed with decreasing fraction of soluble whey protein aggregates. For instance, a storage modulus of 7.1 Pa was measured as the maximum during acidification of 16% sample (D) containing 1.9% acid gellable protein making such whey protein nanogel preparations particularly useful in acidified/fermented products where low degree of protein gelation is desired such as acidic whey protein beverages and high protein yoghurts.

TABLE 11

| Whey protein nanogel preparations from BLG | | | | |
|---|---|---|---|---|
| Sample | A | B | C | D |
| Protein | 12% | 12% | 12% | 16% |
| pH | 6.2 | 6.0 | 5.9 | 6.0 |
| Calcium in g/g BLG | 0.0016 | 0.0016 | 0.0016 | 0.0016 |
| Total Na + K | 17.9 | 12.7 | 11.4 | 5.9 |
| pH | 6.20 | 6.0 | 5.9 | 6.0 |
| Nanogels | 40.8% | 71.6% | 91.8% | 98.1% |
| Soluble aggregates | 59.2% | 18.4% | 8.2% | 1.9% |

Conclusions

Whey protein nanogel preparations produced at high protein concentration under conditions favouring formation of low amounts of soluble aggregates are particularly useful for low viscosity acidified products because the viscosity remains low even after acidification.

Example 7: Use of Mixtures Between WPI and BLG for Whey Protein Nanogel Preparation Whey protein nanogel preparations were produced by mixing of BLG composition with WPI to demonstrate that the mineral contribution from WPI sources prohibit formation of whey protein nanogel preparations at high protein concentrations at 20-25 mM Na+K and/or too high Ca:BLG ratios.

Methods

A 12% whey protein composition (A) was prepared by dispersing BLG isolate powder (see Example 1) into MilliQ water and dissolved by pH adjustment to 6.0 using 3M NaOH. A 12% whey protein Composition (B) was prepared by further titration to pH 6.4 using 3M NaOH.

A third whey protein composition (C) was thawed (frozen), diluted to 12% in MilliQ water and adjusted to pH 6.0 using 3M NaOH. The protein composition of composition C is provided in Table 12.

12% whey protein solutions consisting 100% of a 12% BLG A as well as 80:20, 75:25, 66.7:33.3 and 50:50 mixtures of 12% BLG A solutions and 12% WPI solutions were prepared by mixing appropriate volumes of BLG A and WPI.

Further, a 66.7:33.3 mixture of BLG B and WPI was prepared resulting in a whey protein composition with pH of 6.2.

All samples were heated at 95 degrees C. for 14 minutes and immediately cooled after heating. The state of the sample was evaluated by inversion of the glass tubes.

The distribution between soluble aggregates and nanogels was evaluated by use of Brix measured before/after centrifugation at 50.000×g for 1 hour.

TABLE 12

| Composition of WPI solution | |
|---|---|
| Protein source | WPI |
| pH | 5.65 |
| TS % | 22.7 |
| Protein/TS % | 21.2 |
| Ash % | 0.5 |
| Fat % | 0.12 |

TABLE 12-continued

| Composition of WPI solution | |
|---|---|
| Protein source | WPI |
| Lactose % | <0.09 |
| Pho % of TS | 0.049 |
| Na % of TS | 0.022 |
| K % of TS | 0.069 |
| Ca % of TS | 0.095 |
| Mg % of TS | 0.016 |
| Native ALA % | 9% |
| Native BLG % | 55% |
| CMP % | 17% |
| Calcium g/g BLG | 0.008 |

The mineral content was determined using analysis 14.

The distribution between whey protein nanogels and soluble whey protein aggregates was determined by Analysis 3.

Results

Table 13 shows whey protein nanogel preparations prepared by mixing of BLG with WPI. The total Na+K content of all nanogel preparations is low and the preparations remain liquid after heating at pH 6.0 when the calcium content is 0.0032 g/g BLG, whereas higher calcium contents lead to extensive formation of gel lumps or gelation of the whole sample.

It was surprisingly found that increasing the pH to 6.2 reduced gelation and allowed the formation of 12% whey protein nanogel preparations even at a calcium content of 0.0037 g/g BLG and more ALA and CMP present in the sample.

TABLE 13

| Whey protein nanogel preparations prepared from BLG and WPI | | | | | | |
|---|---|---|---|---|---|---|
| Protein | 12% | 12% | 12% | 12% | 12% | 12% |
| BLG fraction | 100% | 80% | 75% | 66.7% | 66.7% | 50% |
| WPI fraction | 0% | 20% | 25% | 33.3% | 33.3% | 50% |
| aLA, final | 0% | 2% | 2% | 3% | 3% | 5% |
| BLG, final | 97% | 88% | 86% | 83% | 83% | 76% |
| CMP, final | 1% | 4% | 5% | 6% | 6% | 9% |
| pH | 6.0 | 6.0 | 6.0 | 6.0 | 6.2 | 6.0 |
| Ca in g/g BLG | 0.0016 | 0.0028 | 0.0032 | 0.0037 | 0.0037 | 0.0048 |
| Na + K | 12.2 | 14.4 | 15.0 | 15.9 | 20.9 | 17.7 |
| State | Liquid | Liquid | Liquid | Liquid with lumps | liquid | Gel |
| Soluble aggregates and non-denatured protein | 20.8% | 10% | 11.6% | — | 22.5% | — |
| Nanogels | 79.2% | 90% | 88.4% | — | 77.5% | — |

The non-denatured protein found in the whey protein nanogel preparations primarily consisted of CMP.

Conclusions

Whey protein nanogel preparations can be made at high protein concentrations, in the presence of other proteins than BLG and increased calcium levels when the content of Na and K is sufficiently low and pH is increased to compensate for higher calcium levels.

Example 8: Use of Nanogels for Preparation of Acid Beverage with Low Astringency The inventors had seen indications that whey protein in the form of nanogels provide less astringency than other types of denatured whey. Astringency is not a taste but a mouth feeling and feels like a contraction of cheek muscles and increased saliva production. Astringency may e.g. arise from consumption of foods, e.g. unripe fruits, red wine and heat-sterilised acidic protein beverages. In the present example, inventors investigated the low astringency of whey protein nanogels.

Methods

A BLG nanogel preparation was prepared as described in Example 2 "O-P-Q" with the following modifications:

10% BLG characterized by the properties of Example 1, Table 1 was adjusted to a Ca:BLG ratio to 0.0021 w:w using 5% $Ca(OH)_2$ slurry and further adjusted to 6.0 using 10% NaOH.

A pilot-scale scraped heat exchanger was used to perform thermal treatment at 93° C. for 10 minutes followed by cooling to 10° C. Finally, the nanogel preparation was concentrated to 20.4% protein on MMS SW40 RO pilot unit using spiral wound reverse osmosis membranes (Alfa laval RO98pHt-65-263364) at 20 bar pressure and spray dried on a Anhydro MicraSpray MS 750 to make a nanogel powder.

7.3 kg whey protein nanogel powder with characteristics described in Table 14 below was dispersed into 30.8 kg demineralized water in scanima mixer to produce a 18% BLG nanogel preparation and allowed to hydrate overnight at 10° C. under gentle stirring.

The dispersion was homogenized at 200 bar followed by pH adjustment using 9% HCl and diluted in demineralized water to make a 10% BLG nanogel solution pH 3.5.

The nanogel solution was sterilized using an OMVE HT320 pilot plant UHT system configured using with a plate heat exchanger to provide thermal treatment at 120° C. for 20 sec and tapped into 100 mL screw-cap bottles.

1.1 kg acid BLG powder prepared according to Example 2 of PCT application WO 2020/002426 and having the characteristics described in Table 14 was dissolved into 8.9 kg demineralized water to produce a 10% feed solution. The pH was 3.51 and used without further adjustment. The BLG solution was sterilized using an OMVE HT320 pilot plant UHT system configured using with a plate heat exchanger to provide thermal treatment at 120° C. for 20 sec and tapped into 100 mL screw-cap bottles.

The viscosity of beverage preparations was measured as described in Analysis 4. The perceived level of astringency was evaluated as outlined in PCT application WO 2020/002435 with the modification that non-diluted samples were evaluated in the present Example.

As described in PCT application WO 2020/002435, the astringency was evaluated on a scale from 0-15 where 0 is no intensity and 15 is high intensity.

The lightness and turbidity was determined according to Example 1.9 and Example 1.7 of PCT application WO 2020/002435. The mineral, total solids, ash and protein content of raw materials, nanogels and beverage compositions was determined according to the present Analyses 14, 12, 11 and 7, respectively.

Results

A 10% nanogel preparation characterized by a z-average hydrodynamic diameter of 458 nm (analysis 2), viscosity 5.3 cP (Analysis 4), 89% nanogels and 11% soluble aggregates was prepared, concentrated and dried to make a nanogel powder. The nanogel powder was rehydrated and homogenized to facilitate its use in a beverage composition.

As shown in Table 15 below, a 10% whey protein nanogel beverage composition was prepared at pH 3.5 by thermal treatment at 120° C./20 sec and compared to a 10% acidic BLG composition also thermally treated at 120° C./20 sec. The resulting UHT-treated 10% reference beverage has a protein fraction essentially consisting of soluble aggregates, and monomer protein (98%) and only very few nanogels (2%).

TABLE 14

The characteristics of the nanogel powder and acid BLG powder.

|  | BLG nanogel powder | BLG powder for the reference beverage |
|---|---|---|
| Ash | 1.04% | 0.13% |
| Ca | 0.198% | 226 ppm |
| K | 0.042% | <0.025% |
| Na | 0.116% | <0.025% |
| Mg | 0.024% | <0.003% |
| Pho | 0.008% | <0.025% |
| Protein | 94.0% | 92.4% |
| Dry matter | 96.4% | |
| Ca:BLG w:w ratio | 0.0021 | — |

The nanogel beverage composition produced a beverage with milky appearance as demonstrated by high turbidity and lightness (L*) while in contrast, the acid BLG reference beverage was transparent as also indicated by the amount of soluble aggregates and monomer protein (see Table 15).

The content of phosphorus in the nanogel beverage was below the detection limit making such nanogel preparations particularly useful for chronical kidney disease patients.

The sensory evaluation confirmed the initial findings of the inventors and clearly demonstrated that the nanogel beverage composition had a significantly reduced astringency compared to the transparent reference beverage (see Table 15). This is effect is believed to be closely related to the low content of soluble aggregates and monomer protein in the milky nanogel beverage compared to clear BLG reference beverage and illustrates that the whey protein nanogels are particularly useful for UHT-treated acidic whey protein beverages.

TABLE 15

Characteristics of the nanogel beverage composition and their processing.

|  | 10% BLG nanogel beverage | 10% BLG reference beverage |
|---|---|---|
| Thermal treatment | 120° C./20 sec | 120° C./20 sec |
| pH | 3.50 | 3.51 |
| Turbidity (NTU) | >11000 | 2.5 |
| Viscosity, cP | 2.1 | 2.9 |
| Astringency | 2 | 5 |
| L* | 89.7 | 39.9 |
| Phosphor | <0.005% (BDL) | <0.005% (BDL) |
| Nanogels | 89% | 2% |
| Soluble aggregates, oligomers, monomer protein | 11% | 98% |

Conclusions

A 'milky' nanogel beverage was prepared with a high turbidity and whiteness of the nutritional composition. The beverage contains very low phosphor levels which is particularly important but not limited to manufacture of high protein beverages for chronical kidney disease which do not tolerate high levels of phosphor.

Sensory testing revealed that the astringency was essentially absent in UHT treated nanogel beverage composition and much lower than in the UHT-treated BLG reference beverage.

Example 9: Use of Nanogels for Preparation of Acidic High Energy Beverages

The feasibility of using nanogels for the preparation of UHT-treated high-energy nutritional compositions under acidic conditions was evaluated.

Methods 10.8 kg nanogel powder prepared as described in Example 8 was dispersed into 68.5 kg tap water at 65° C. The emulsifier, oil and dry ingredients was mixed into the liquid using a Brine Mixer Rotostat for 15 min.

The pH was adjusted to 3.5 using 10% phosphoric acid and the nutritional composition was homogenized at 150 bar. Following homogenization the nutritional composition was thermally treated on a tubular heat exchanger at 120° C. for 30 seconds and cooled to 10° C. prior bottling into 100 mL sterile bottles.

The viscosity was measured according to Analysis 4 and the astringency and sourness were determined as described PCT application WO 2020/002435 but not diluted prior to sensory testing.

Results

The inventors found that an acidic, high energy beverage could be prepared and characterized by a surprisingly low viscosity of 11.3 cP. In contrast, it was found that replacing protein in form of nanogels with equal protein mass from an acidic, unfractionated whey protein isolate led to clogging and blocking of the UHT equipment. The low viscosity, acidic, high energy nutritional composition was prepared comprising 10% protein, 4% fat and 16% carbohydrate to provide a high energy density of 140 kcal/100 mL in a small package.

Tasting of the nanogel composition revealed a surprisingly low level of astringency with a score of only 1 on a the scale from 0-15 (low-high) compared to a score of 5 from the evaluation of the 10% BLG reference beverage in Example 8. Further, the pH 3.5 nanogel beverage composition surprisingly had a sourness of only 2 on a scale from 0-15 despite of the high protein concentration (10%) and no sample dilution (compare e.g. with FIG. 15 of PCT application WO 2020/002435).

Conclusions

UHT treated, low viscosity, high-energy nutritional nanogel preparations with excellent sensory properties (low perceived astringency and sourness/acidity) were successfully prepared by combining nanogels with sources of fat and carbohydrate under acidic conditions. An attempt to

Results

Nutritional nanogel compositions were prepared comprising a source of carbohydrate (range 8-17 w:w % sucrose), fat (rapeseed oil; range 4-9 w:w %) and nanogels (range 10-15 w:w %). Surprisingly, all nanogel compositions evaluated remained liquid and free-flowing even after extensive thermal heating at 150° C. for a prolonged duration of 10 minutes irrespective of the evaluated protein, fat and carbohydrate contents.

The viscosity remained remarkably low even at the highest protein dosages of 15% evaluated and the nanogels even allow preparation of sterilized nutritional compositions with an energy content of at least 200 kcal/00 mL by combining 15% protein, 8% fat and 17% carbohydrate as evidenced by the liquid state and low measured viscosity after heating at 150° C. for 10 minutes.

TABLE 16

Composition and characteristics of the sterilised nutritional compositions.

| Protein w:w % | Fat w:w % | Carbohydrate w:w % | Protein:fat:carbohydrate energy contribution in percent | Energy kcal/100 mL | pH | Characteristics | Beverage viscosity, cP |
|---|---|---|---|---|---|---|---|
| 10 | 4 | 17 | 28:25:47 | 144 | 7.06 | Liquid | 3.99 |
| 10 | 9 | 10 | 25:50:25 | 125 | 7.16 | Liquid | 3.48 |
| 15 | 4 | 8 | 47:28:25 | 128 | 7.16 | Liquid | 3.56 |
| 10 | 6 | 12 | 28:38:34 | 142 | 7.12 | Liquid | 5.28 |
| 15 | 8 | 17 | 30:36:34 | 200 | 7.03 | Liquid | 6.71 | produce a reference product based on a comparable, yet unfractionated, native whey protein isolate resulted in a blocked UHT-apparatus due to uncontrolled aggregation upon heating.

Example 10: Use of Nanogels for Preparation of High Energy PH Neutral Beverages The feasibility of using nanogels for the preparation of UHT-treated high-energy liquid nutritional compositions at neutral pH conditions was evaluated.

Methods

A whey protein nanogels powder was prepared as described in Example 8 and used to prepare an 18% whey protein nanogel solution which was allowed to hydrated overnight at 4° C. and subsequently homogenized at 200 bar. The homogenate was adjusted to pH 7.0 using 3 M NaOH and preheated to 50° C. in water bath. 0.5 g/L Grindsted Citrem LR10, rapeseed oil, sucrose and remaining water to create the nutritional nanogel compositions shown in Table 16 were mixed into samples of the the homogenate. Weight fractions are provided relative to the final liquid nutritional composition.

Finally, the nutritional compositions were homogenized at 150 bar.

1 mL of each nutritional composition was transferred to a HPLC vial which was crimp sealed and heated by incubation of vials in an aluminum block at 150° C. for 10 minutes. The heated samples were analyzed for the ability to flow upon inversion of the sample and the viscosity was measured according to Analysis 4 after decapping of vials.

Conclusions

Low viscosity, free-flowing high-energy nutritional nanogel compositions that resist thermal treatment at temperature of at least 150° C. for up to at least 10 minutes can be prepared by thermal treatment with energy contents of up to at least 200 kcal/100 mL. High protein beverage based on the present whey protein nanogels can therefore sufficiently heat-stable to withstand retort type heat-treatment, even at high protein concentration.

Example 11: Acidic and PH-Neutral Whey Protein Nanogel Poweder and use for Preparation of High Protein Beverages Whey protein nanogel powders of acidic pH (pH 3.5) and neutral pH (pH 7.0) were prepared and used for preparing high protein beverages.

Methods

Nanogel powders were produced essentially as described in Example 8 with the following modifications:

The nanogel preparation was concentrated to 16% protein split into three aliquots of which two were adjusted to pH 3.5 and 7.0 using 4.5% HCl and 2% NaOH, respectively. The three feeds were spray dried individually to make nanogel powders.

20% nanogel dispersions of each nanogel powders (pH 3.5, 6.6 and 7.0) were rehydrated in demineralized water and homogenized at 150 bar. The homogenates were diluted to 10-20% in demineralized water and pH was readjusted if necessary. 1 mL sample transferred to HPLC injection vial (Mikrolab, part no ML33003V) and crimp sealed. The samples were inserted into the aluminium block at 170° C. with holes drilled to fit exactly the dimensions of the vials ensuring efficient heat transfer. The samples were kept at 170° C. for 120 seconds or at 90° C. for up to 10 min and immediately cooled.

The first indication on flow properties (liquid/gel) was determined by the ability to flow upon inversion of the vial and the viscosity was determined using Analysis 4.

The particle size after heating determined using a Malvern Mastersizer 3000 equipped with a HydroLV liquid dispersion unit. Heated nanogel solutions were dripped into the dispersion unit containing water under stirring at 1500 rpm until reaching an obscuration of 8-10%. The particle size was estimated using an RI of 1.4, absorption index of 0.01 and refractive index of solvent (water) of=1.33 with the assumption of spherical particles when calculating the particle size in the Mastersizer 3000 software version 3.62.

Results

A nanogel preparation characterized by a particle size of 0.424 micron was successfully prepared followed by pH adjustment, concentration and drying to produce pH 3.5, 6.6 and 7.0 to produce nanogel powders of the following composition (% w/w of total powder):

|  | pH 3.5 | pH 7.0 | pH 6.6 |
|---|---|---|---|
| Ash | 0.870 | 1.340 | 0.880 |
| Ca | 0.195 | 0.199 | 0.199 |
| K | 0.041 | 0.041 | 0.042 |
| Mg | 0.024 | 0.024 | 0.024 |
| Na | 0.118 | 0.276 | 0.120 |
| Pho | 0.007 | 0.008 | 0.008 |
| Protein | 92.1 | 93.0 | 94.5 |
| Dry matter | 96.5 | 96.0 | 96.3 |
| Ca:P w:w ratio | 0.0021 | 0.0021 | 0.0021 |

The nanogel preparations were used to evaluate the accessible protein range for heat-treated, low viscosity yet protein-rich nanogel beverages:

TABLE 17

Characteristics and process parameters of the heat-treated beverages.

| Protein concentration, % | pH | Nanogel- % | Thermal treatment | Viscosity after heating, cP | Free flowing with inversion | Particle size after heating, D[4.3] |
|---|---|---|---|---|---|---|
| 10 | 7.0 | 11% | 170° C./120 sec | 2.13 | yes | 0.445 |
| 12 | 7.0 | 11% | 170° C./120 sec | 2.44 | yes | n.d. |
| 14 | 7.0 | 11% | 170° C./120 sec | 2.98 | yes | 0.453 |
| 16 | 7.0 | 11% | 170° C./120 sec | 3.71 | yes | n.d. |
| 18 | 7.0 | 11% | 170° C./120 sec | 5.25 | yes | 0.462 |
| 10 | 3.5 | 11% | 170° C./120 sec | 2.36 | yes | 0.483 |
| 12 | 3.5 | 11% | 170° C./120 sec | 2.86 | yes | n.d. |
| 20 | 6.6 | 11% | 90° C./10 min | 19.6 | yes | 0.434 |
| 20 | 7.0 | 11% | 90° C./10 min | 18.5 | yes | 0.444 |
| 20 | 7.0 | 11% | 90° C./5:38 min:sec | 14.1 | yes | 0.437 | n.d. = not determined

Conclusion

Powders at pH 3.5, 6.6, and 7.0 were successfully prepared and used for producing both acidic and pH-neutral high protein beverages.

Nutritional high protein beverages were prepared by thermal treatment of nanogel-containing beverages at:

Up to at least 18% at pH 7.0 with heating at 170° C. for up to at least 120 seconds Up to at least 20% at pH 7.0 with heating at 90° C. for up to at least 10 minutes.

Up to at least 20% at pH 6.6 with heating at 90° C. for up to at least 10 minutes.

Up to at least 14% at pH 3.5 with heating at 170° C. for 120 seconds.

The invention claimed is:

1. A whey protein nanogel composition in the form of a powder or a liquid comprising:

whey protein nanogels in an amount of at least 60% w/w relative to total protein, soluble whey protein aggregates in an amount of 15-30% w/w relative to total protein, total beta-lactoglobulin (BLG) in an amount of at least 50% w/w relative to total protein, and a total amount of protein of at least 30% relative to total solids, and wherein the particles of the whey protein nanogel composition in hydrated form have a z-average diameter measured by dynamic light scattering of 150-1000 nm.

2. The whey protein nanogel composition according to claim 1 comprising the whey protein nanogels in the amount of at least 70% w/w relative to total protein.

3. The whey protein nanogel composition according to claim 1 comprising the total protein in the amount of at least 70% w/w relative to total solids.

4. The whey protein nanogel composition according to claim 1 comprising the total BLG in the amount in the range of 50-80% w/w relative to total protein.

5. The whey protein nanogel composition according to claim 1 in the form of a powder.

6. The whey protein nanogel composition according to claim 1 having a pH in the range of 6.5-8.0.

7. The whey protein nanogel composition according to claim 1 wherein the particles of the whey protein nanogel composition in hydrated form have a z-average diameter measured by dynamic light scattering of 150-800 nm.

8. A whey protein nanogel composition in the form of a powder and having a pH in the range of 6.5-8.0, comprising:

the whey protein nanogels in the amount of at least 60% w/w relative to total protein, the soluble whey protein aggregates in the amount of 15-30% w/w relative to total protein, the total BLG in the amount of 50-80% w/w relative to total protein, and a total amount of protein of at least 70% relative to total solids, and wherein the particles of the whey protein nanogel composition in hydrated form have a z-average diameter measured by dynamic light scattering of 150-800 nm.

* * * * *